United States Patent [19]

Parameswaran Nair et al.

[11] Patent Number: 5,724,356
[45] Date of Patent: Mar. 3, 1998

[54] ADVANCED BRIDGE/ROUTER LOCAL AREA NETWORK MODEM NODE

[75] Inventors: Vidyasagaran Parameswaran Nair; Damodar Bhat, both of Bangalore, India; Hung S. Ngo, Spring Lake Park, Minn.; Narasimhan Sundarraajan, Bangalore, India

[73] Assignee: Multi-Tech Systems, Inc., Mounds View, Minn.

[21] Appl. No.: 431,715

[22] Filed: Apr. 28, 1995

[51] Int. Cl.⁶ .................................................. H04J 3/02
[52] U.S. Cl. .......................... 370/401; 370/402; 370/465; 375/222
[58] Field of Search ........................ 370/85.13, 32.1, 370/94.1, 95.1, 60, 401, 402, 403, 289, 389, 394, 422, 437, 465; 375/222, 223; 379/93, 88

[56] References Cited

U.S. PATENT DOCUMENTS

| | | | |
|---|---|---|---|
| 4,406,004 | 9/1983 | Hall et al. | 370/15 |
| 4,610,022 | 9/1986 | Kitayama et al. | 381/36 |
| 4,625,081 | 11/1986 | Lotito et al. | 379/88 |
| 4,794,595 | 12/1988 | Ohyama | 370/110.1 |
| 4,866,704 | 9/1989 | Bergman | 370/858.5 |
| 4,873,715 | 10/1989 | Shibata | 379/93 |
| 4,901,312 | 2/1990 | Hui et al. | 370/85.14 |
| 4,996,707 | 2/1991 | O'Malley et al. | 379/94 |
| 5,202,899 | 4/1993 | Walsh | 375/8 |
| 5,220,560 | 6/1993 | Ogasawara | 379/94 |
| 5,355,365 | 10/1994 | Bhat et al. | 370/85.13 |
| 5,390,239 | 2/1995 | Morris et al. | 375/222 |
| 5,406,557 | 4/1995 | Baudoin | 370/85.13 |
| 5,416,776 | 5/1995 | Panzarella et al. | 379/93 |
| 5,452,289 | 9/1995 | Sharma et al. | 370/32.1 |
| 5,477,547 | 12/1995 | Sugiyama | 370/94.1 |
| 5,479,407 | 12/1995 | Ko et al. | 370/94.1 |
| 5,550,816 | 8/1996 | Hardwick et al. | 370/60 |

FOREIGN PATENT DOCUMENTS

| | | |
|---|---|---|
| 3504064 | 8/1986 | Germany . |
| 3630469 | 3/1988 | Germany . |
| 3409532 | 4/1989 | Germany . |
| 193489 | 7/1990 | Japan . |
| 257748 | 10/1990 | Japan . |

OTHER PUBLICATIONS

S. Apiki et al., "Network Modems Dial In, Dial Out, and Router Packets", *Byte*, 12, pp. 269–270, 272, 274 (1992).

J.T. Johnson, "Lan Modems: The Missing Link for Remote Connectivity", *Data Communications*, pp. 101–104, 106, Mar. 1993.

"Video Calls Use Basic Phone Lines", Mitch Radcliffe, *MacWeek*, (Aug. 3, 1992).

"Radish System Lets Phones Users Send Voice, Data Simultaneously", *PC Week*, 9, 19, p. 53, (May 11, 1992).

"Don't Just Tell Them, Show Them!", Glenn A. Pierce, Jr., *Automation*, (Aug. 1990).

"Mitsubishi Still Color Picture TV Phone", *Techno Japan*, 23, 6, (Jun. 1990).

"The Photophone", (Product Brochure) GTE (Feb. 15, 1990).

"Wrist TVs Still Fiction, but Police Videophones Take Hold", Ray Smith, *TE&M*, (Dec. 15, 1987).

(List continued on next page.)

*Primary Examiner*—Douglas W. Olms
*Assistant Examiner*—Shick Hom
*Attorney, Agent, or Firm*—Schwegman, Lundberg, Woessner & Kluth, P.A.

[57] ABSTRACT

An intelligent LAN modem node is used in a bridge system which provides transparent internetwork communications over a plurality of channels. The LAN modem node is protocol independent and has a packet load distribution system which shares packet traffic across the channels using optional user-defined channel preferences. The LAN modem nodes used in the bridge system provides compression for increasing bridge transmission speed. The bridge system provides a filtering system to control access over the bridge and restrict unnecessary bridge traffic. Additionally, the bridge system provides automatic redial in the event modem communications are lost.

13 Claims, 81 Drawing Sheets

OTHER PUBLICATIONS

"Audiographic Terminal", M. Laube, *Electrical Communication*, 60, 1, (1986).

"Comparison of Coding Schemes for Telewriting Systems", Tominaga et al., *ICCC*, (1986).

"Simultaneous Transmission of Voice and Handwriting Signals: Sketchphone System", Kishimoto et al., *IEEE*, (1981).

"Telewriting Terminal Equipment" (Recommendation T.150) *CCITT*, (1988).

"A Family of 2–Wire, Duplex Modems Operating at Data Signalling Rates . . . ", *Facsimile Recommendation V.32 CCITT*, (1988).

"* * * Picfon Card Brochure", *Specom Technologies Corp.*, (Published Prior to Applicant's Invention).

"Pen Telephone Brochure", Shimadzu, (Published Prior to Applicant's Invention).

"Telewriter Product Description", *Optel Communications, Inc.*, (Published Prior to Applicant's Invention).

"Videowriter '91 Product Description", *Optel Communications, Inc.*, (1991).

Fig. 4C

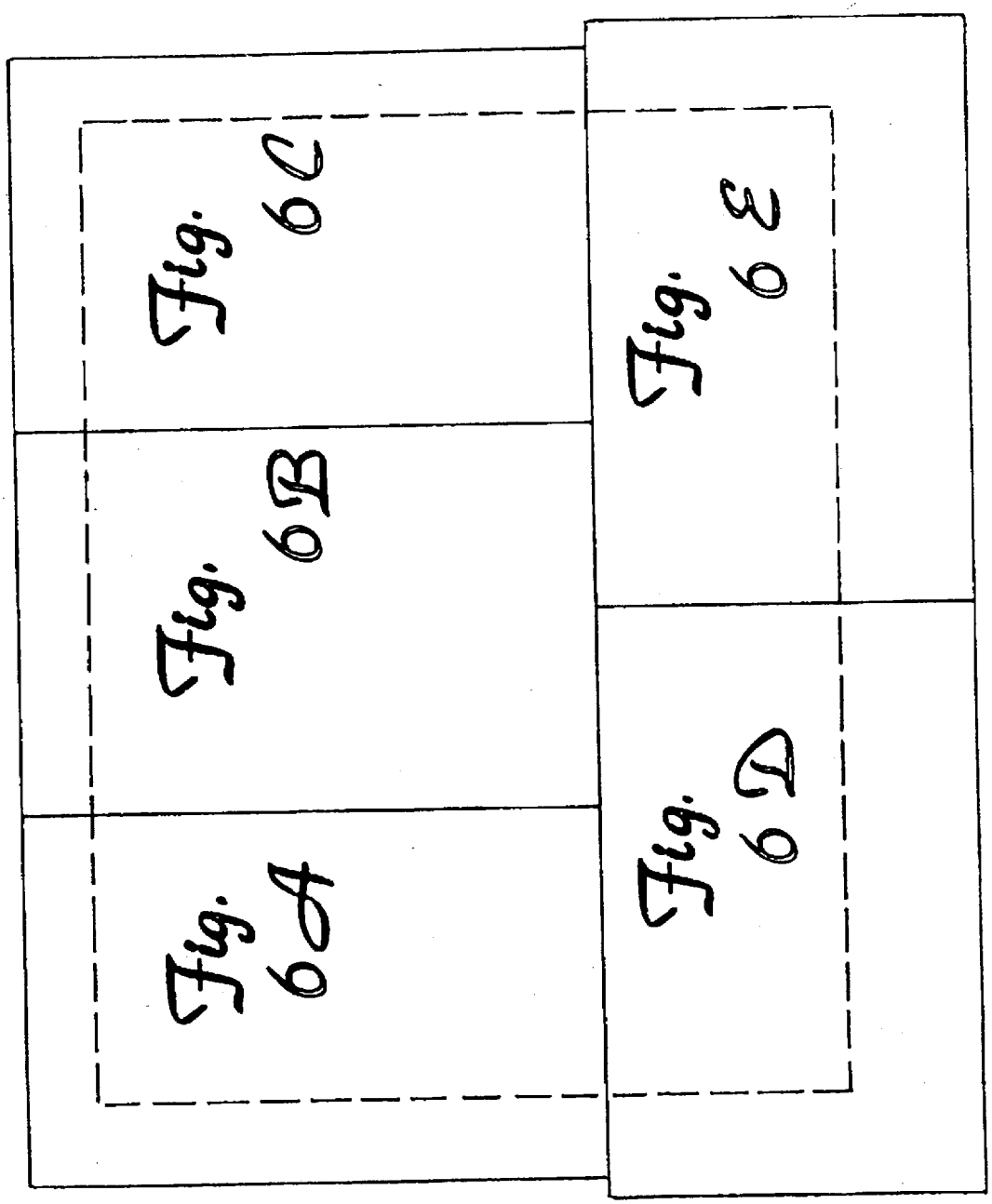

Fig. 6C
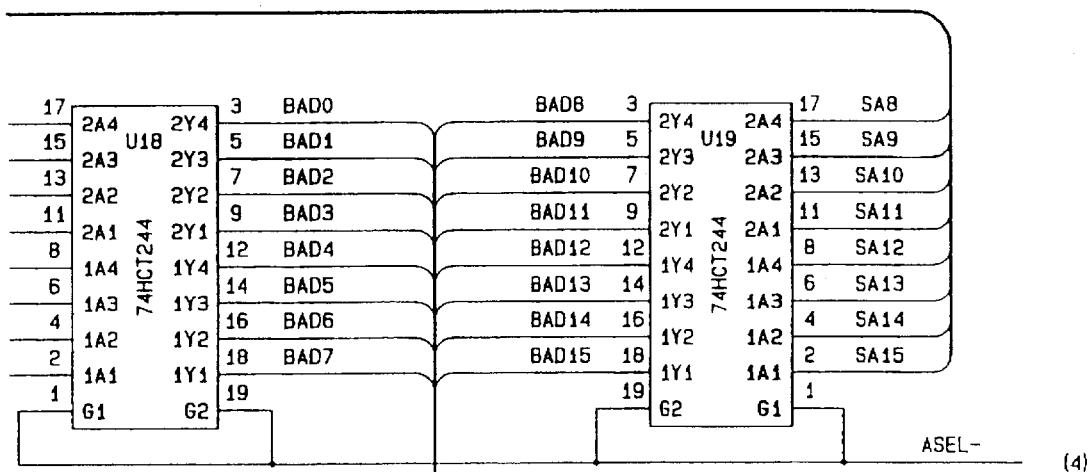
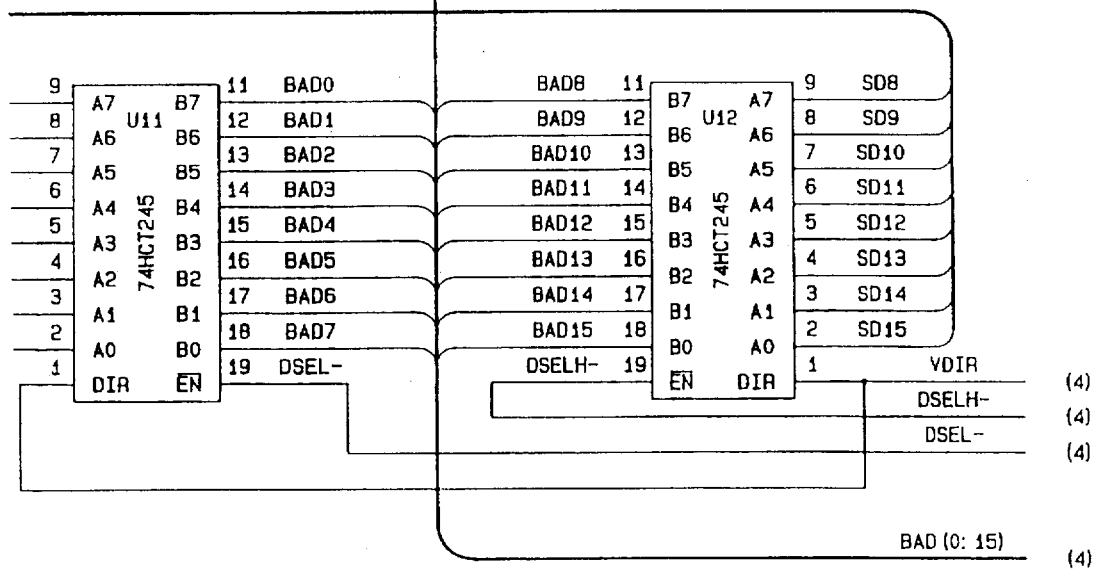

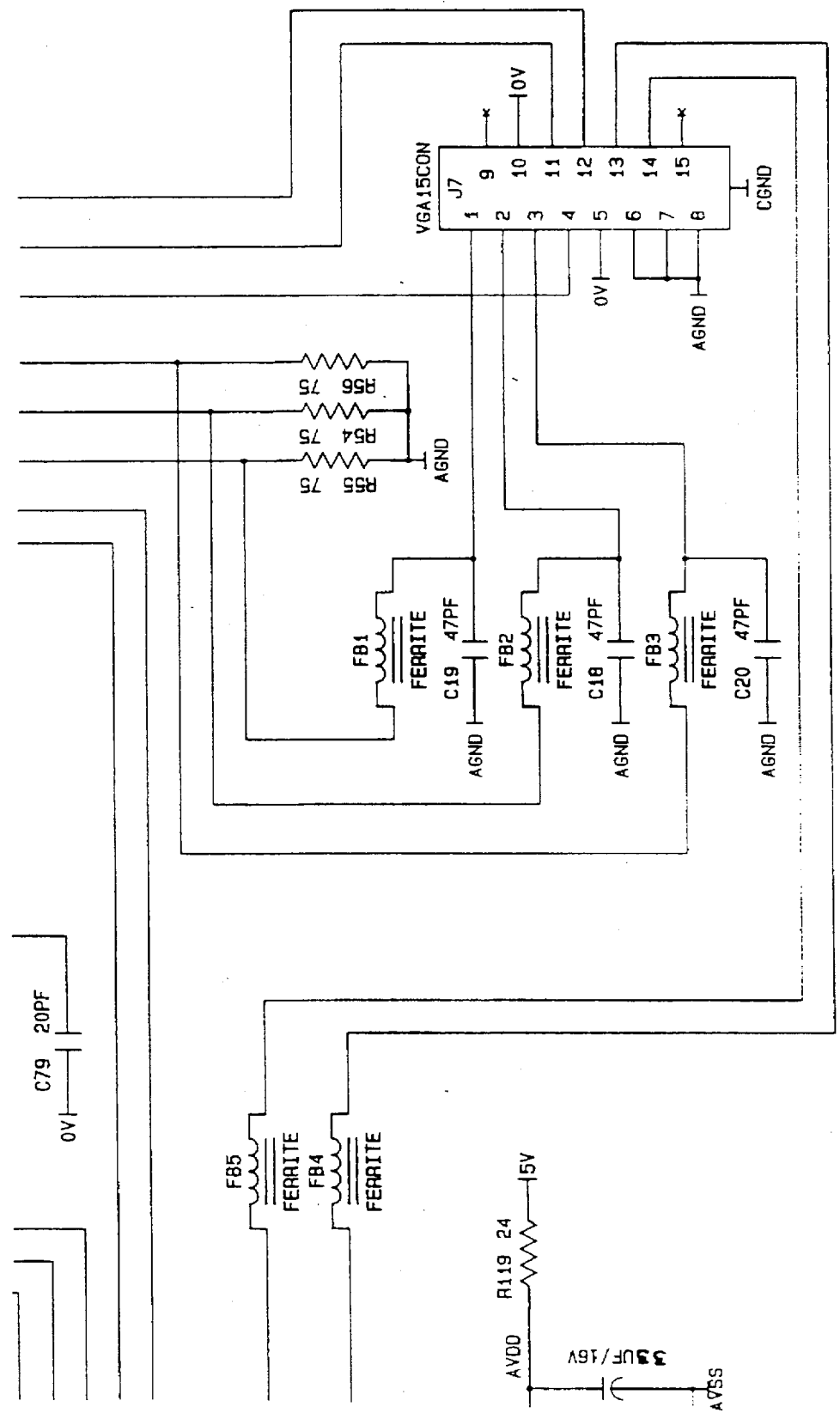

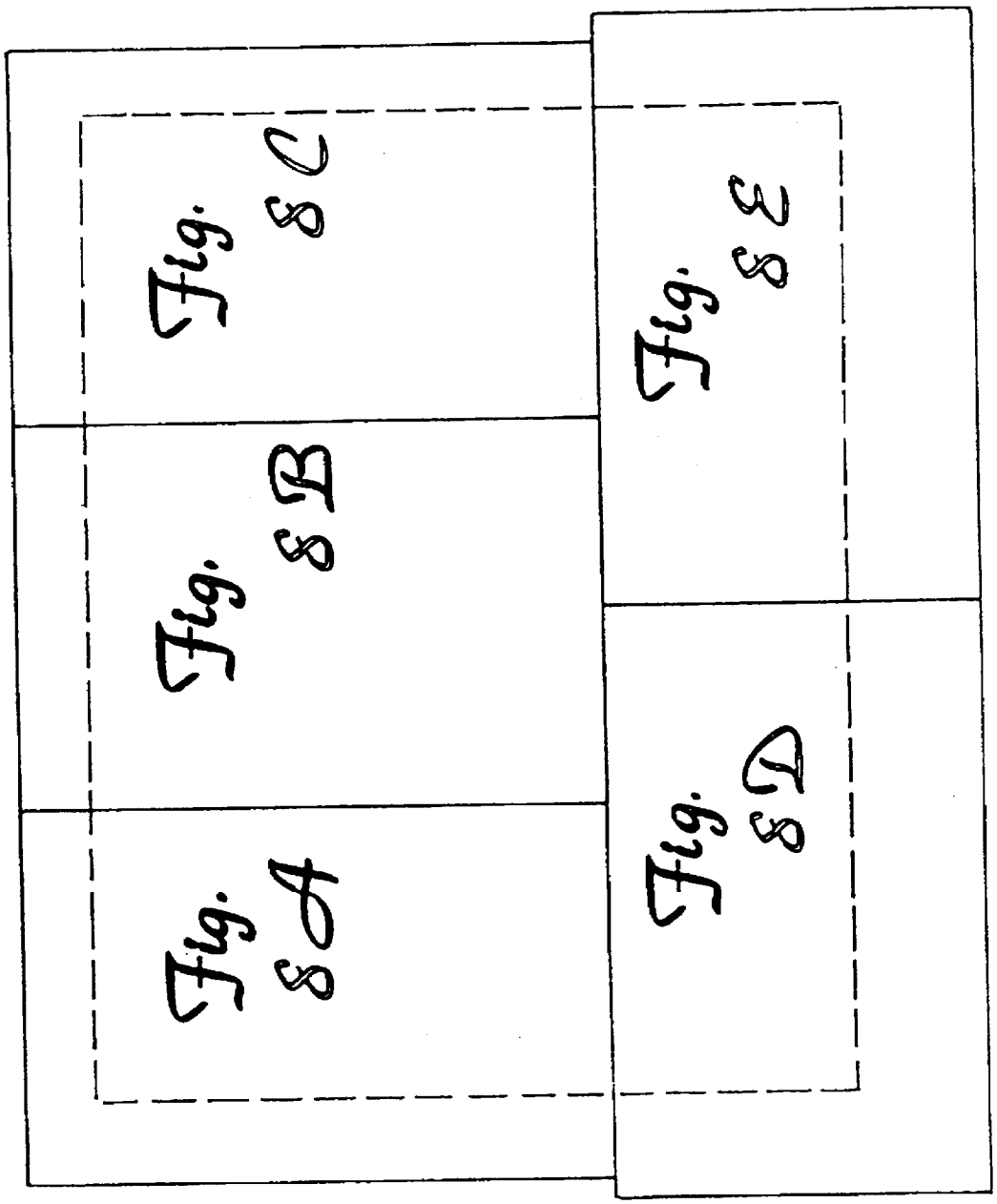

Fig. 8B
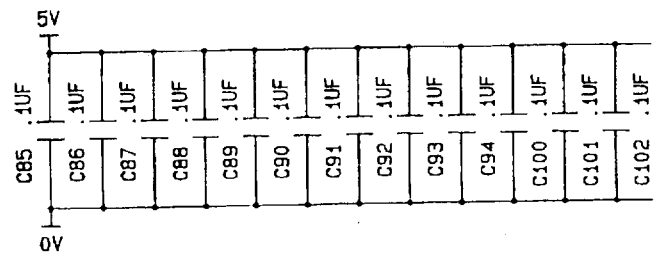
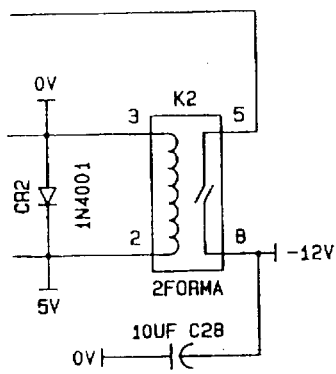
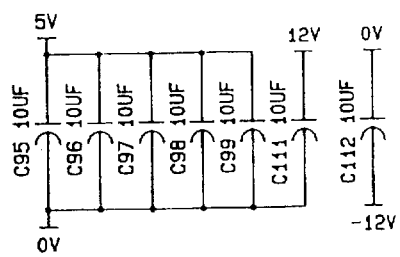
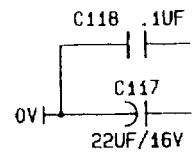
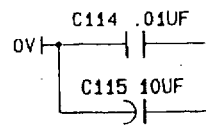
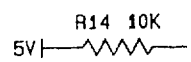
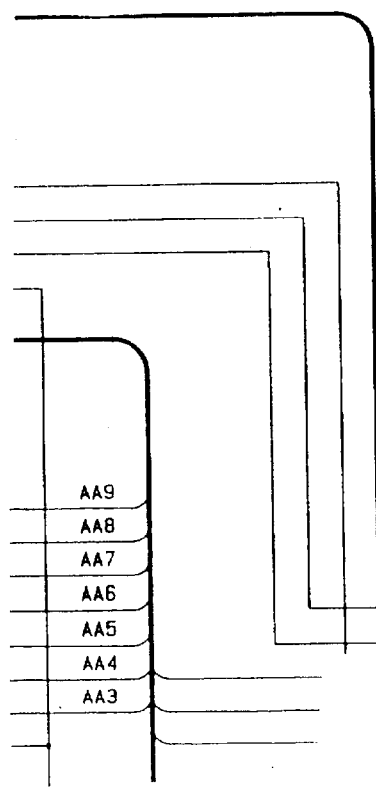
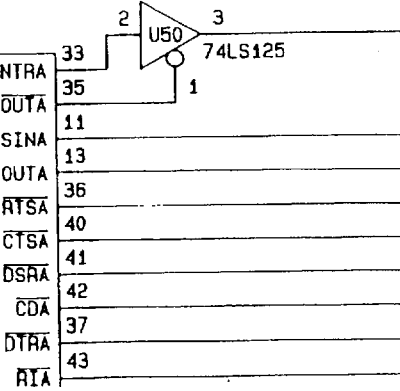

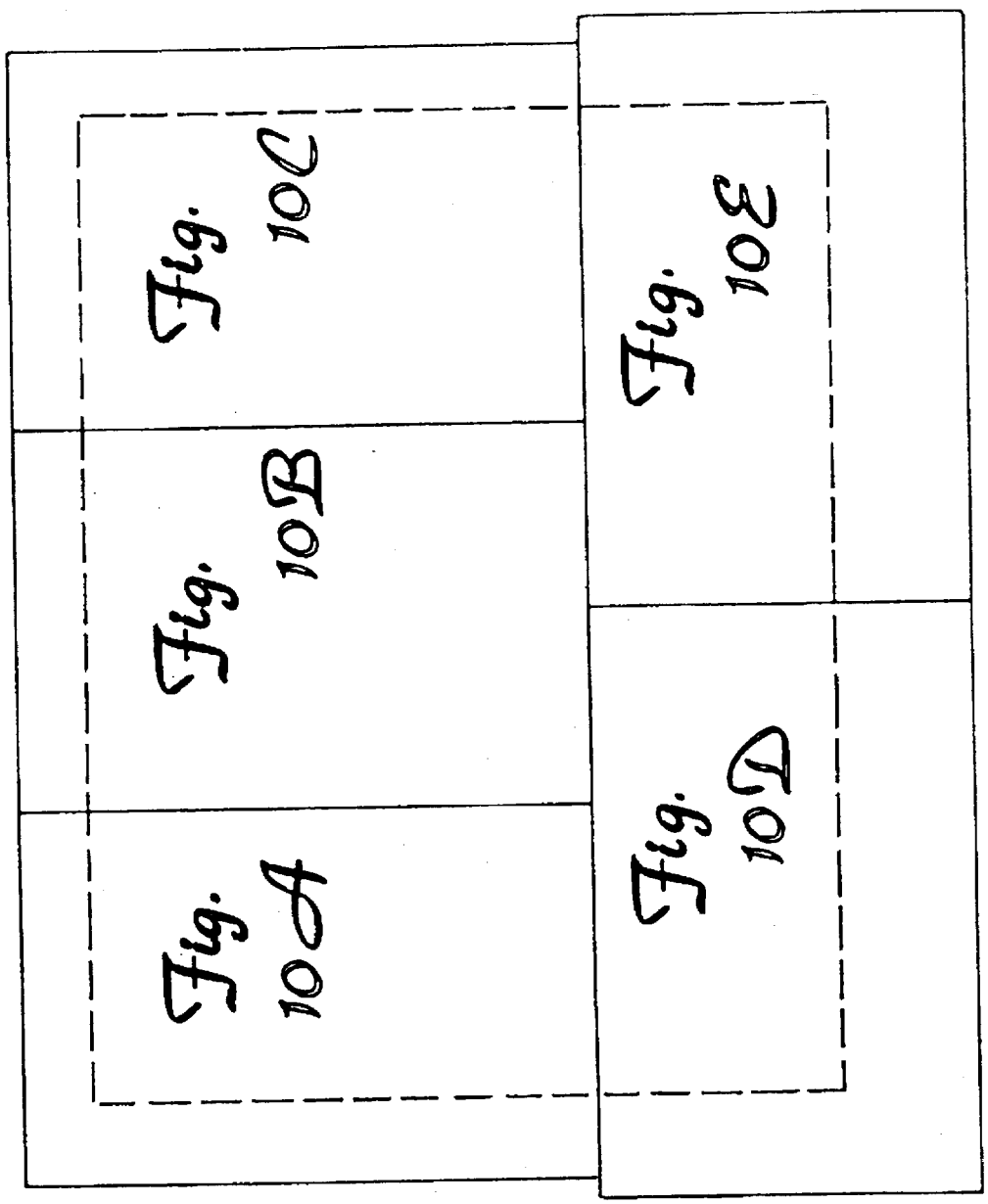

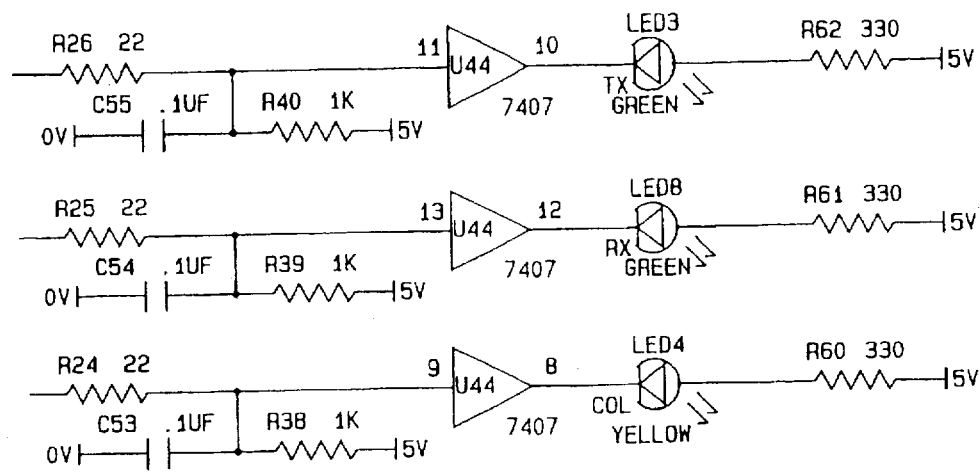
Fig. 10B
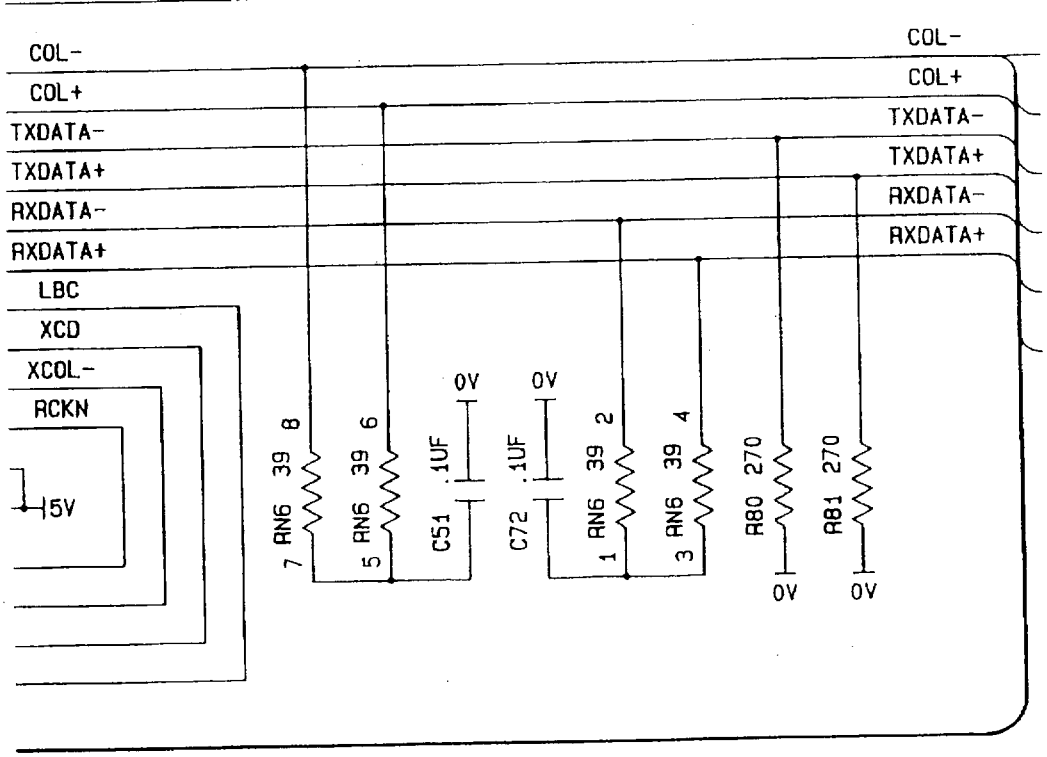

| | C81 | C82 | C83 | CR10 CR11 | | R76 |
|---|---|---|---|---|---|---|
| DOMESTIC | OMIT | | .47UF | 1N5256 | | |
| INT'L (I) | OMIT | | .47UF | 1N5256 | | |
| DENMARK | I | | I | I | | |
| FINLAND | I | | I | I | | |
| HOLLAND | 3.3UF | | I | I | | |
| IRELAND | I | | 2.2UF | I | | |
| ITALY | I | | I | I | | |
| JAPAN | I | | I | I | | |
| NORWAY | 1.0UF | | I | I | | |
| SWEDEN | 2.2UF | | I | I | | |
| AUSTRALIA | 2.2UF | .082 UF | I | I | | 10 K |

(7) RIO
(7) DTR0
(7) DCD0
(7) DSR0

| R77 | U55 | R92 | R50 | R72 |
|-----|-----|-----|-----|-----|
|  | OMIT |  | 22K | 10K |
|  | LH1504 |  | 22K | 10K |
|  | I |  | I | I |
|  | I |  | I | I |
|  | LH1503 |  | I | I |
|  | I |  | I | I |
|  | I |  | I | I |
|  | I |  | I | I |
|  | LH1503 |  | I | I |
|  | LH1503 |  | I | I |
| 68 OHM | LH1503 AB | 294 OHM | I | I |

1. DRAWING IS FOR STANDARD INT'L VALUES
2. "I" ON CHART BELOW MEANS TO FOLLOW

1. FOR BABT, U55=LH1503, AND CR10, 11 = 1N5256,

2. FOR INSTALL

OMIT

INSTRUCTIONS FOR STANDARD INT'L.

BABT CHANGES :

INSTALL R111, R112, R113, R116,
OMIT R110, R114, R115
R50=4.7K, R72=68K
   ALL OTHER MODELS,
   R110, R114, R115

R111, R112, R113, R116

RING

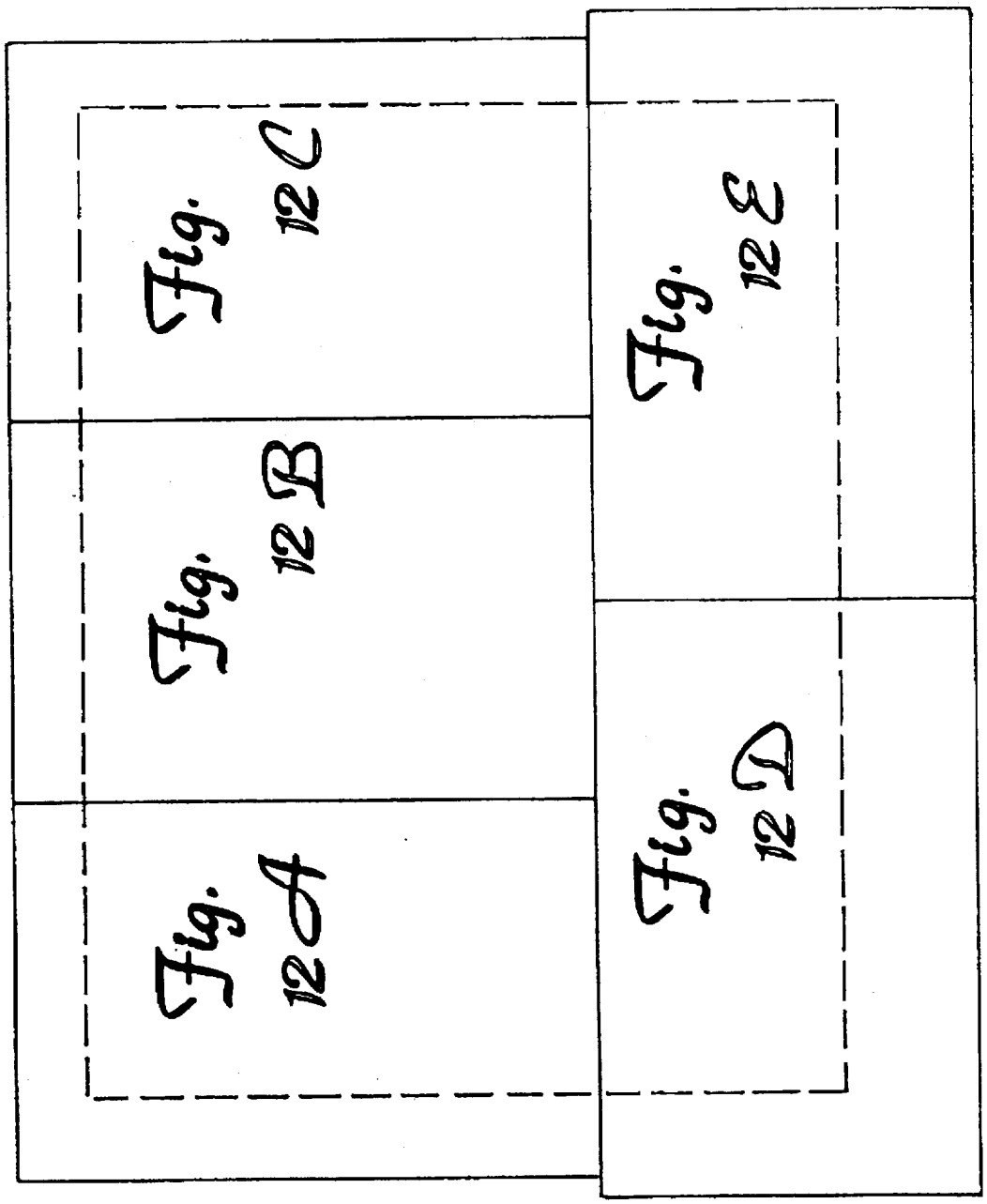

Fig. 12C
```
WR-     (1)
RD-     (1)
A12     (1)
A11     (1)
A10     (1)
A9      (1)
A8      (1)
50H     (1)
54H     (1)
RDCLK-  (1)
RWRXD   (1)
TDCLK   (1)
RWTXD   (1)
XCLK    (2)
```
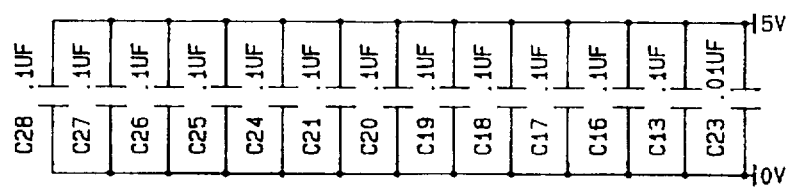
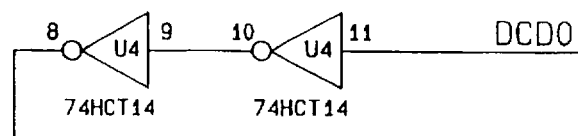
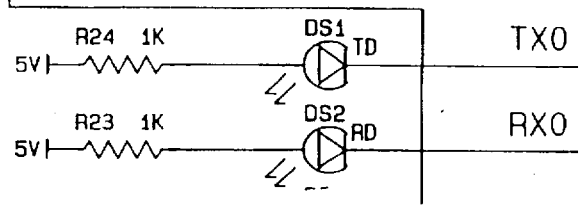

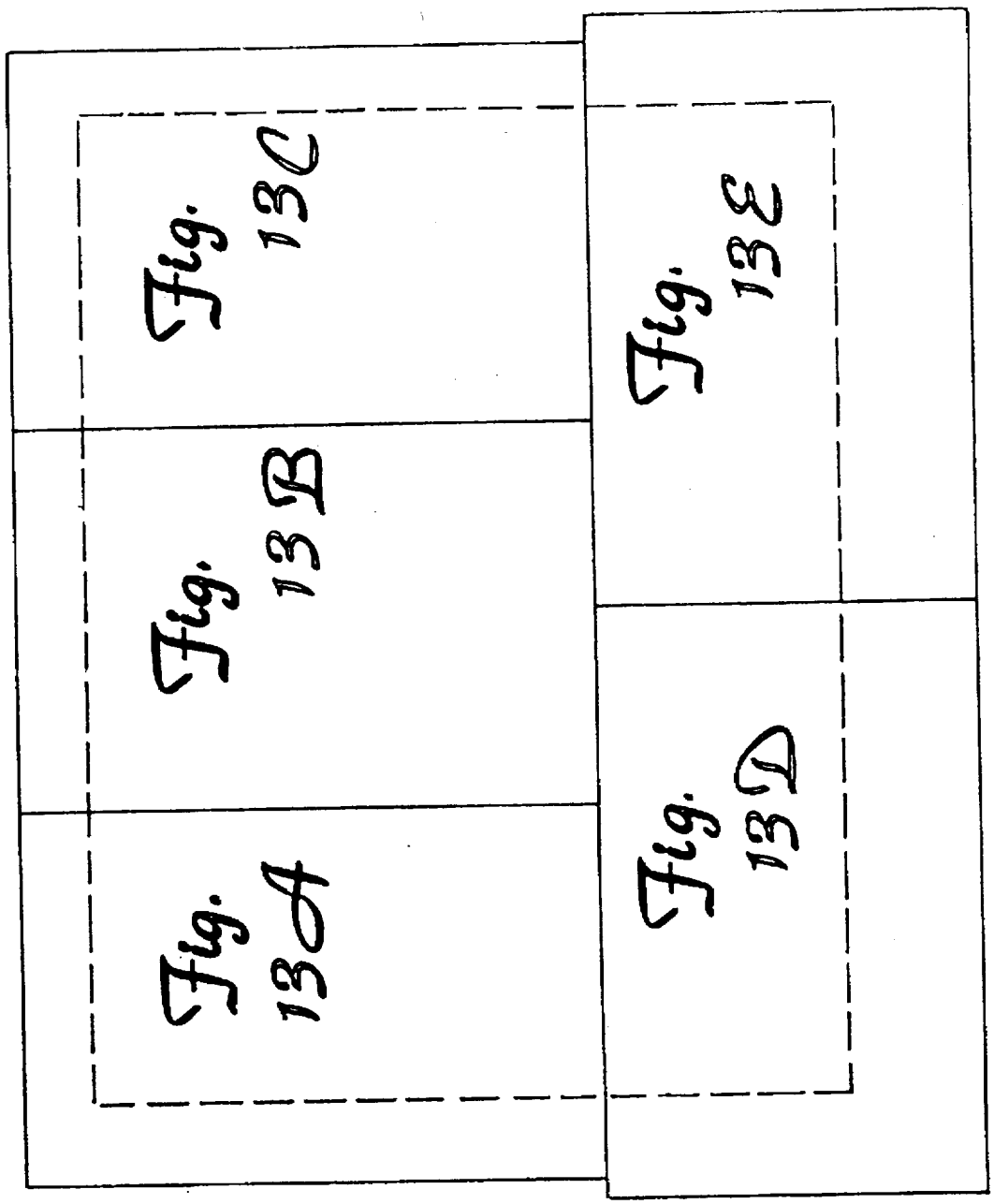

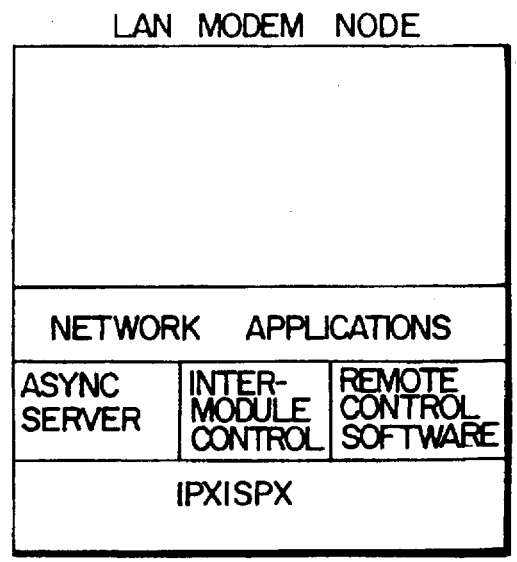
Fig. 14A
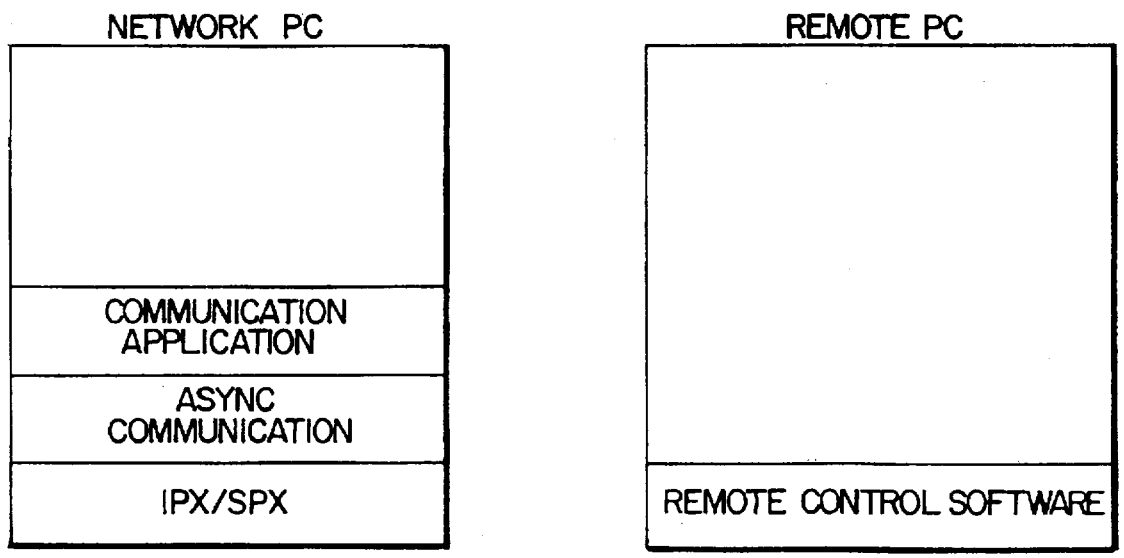
Fig. 14B
Fig. 14C

LEARN TABLE
ADDRESS
ADDR X

LEARN TABLE
ADDRESS
ADDR X
ADDR Y

| LEARN TABLE |
|---|
| 123456 |
| 254621 |
| 343532 |
|  |

FIG. 21A

| SOURCE ADDRESS TABLE/DATABASE | |
|---|---|
| 212321 | DROP |
| 212221 | CHAN 1 |
|  |  |
|  |  |

FIG. 21B

| DESTINATION ADDRESS TABLE/DATABASE | |
|---|---|
| 313233 | CHAN 1 |
| 332122 | CHAN 2 |
|  |  |
|  |  |

FIG. 21C

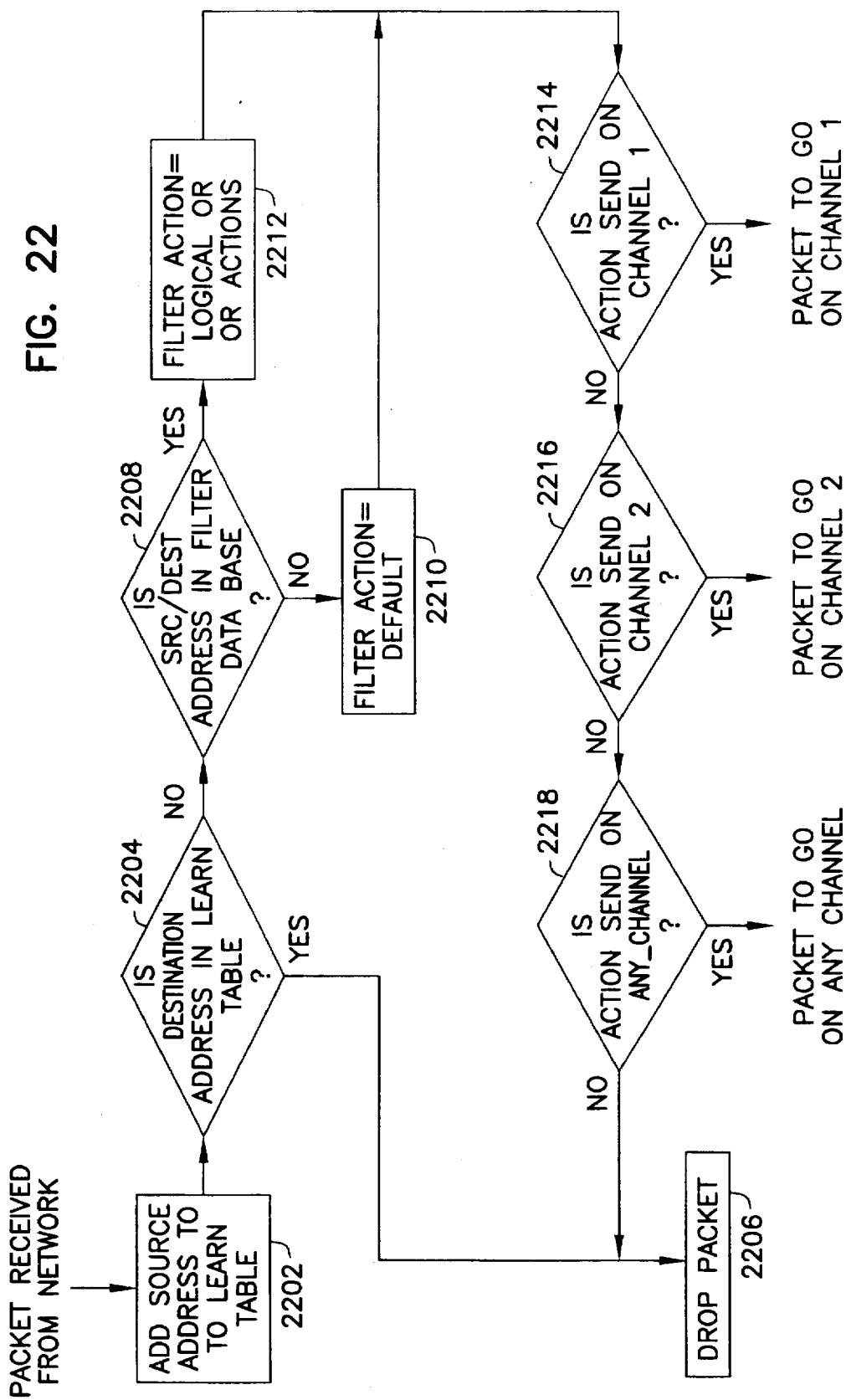

FLOW OF PACKETS RECEIVED FORM NERWORK SIDE.
X STANDS FOR CH1 OR CH2.

ADVANCED BRIDGE/ROUTER LOCAL AREA NETWORK MODEM NODE

FIELD OF THE INVENTION

The present Invention relates to apparatus and methods for implementing a bridge/router modem node on a local area network, and in particular, to a local area network modem node which is directly accessible by other nodes on the network for asynchronous communication to off-network devices or to another network.

BACKGROUND OF THE INVENTION

Modem (modulator/demodulator) communications is a well known method of asynchronous serial data communications between two computers or other types of electronic equipment. In a typical environment, a modem modem is connected to a local personal computer (PC) through a serial communications link. The modem is then connected through a public telephone network to a remote location in which a corresponding modem is also connected. The corresponding modem is also connected to a remote computer such as a personal computer through a serial communications link. This allows direct communication between the local personal computer and the remote personal computer over the telephone network. The two modems handle the conversion of digital data into voice band signals for transmission through the telephone network in a full duplex fashion following a variety of CCITT telecommunications standards.

A local area network (LAN) connects a number of personal computers and peripherals together for sharing information and resources. LANs can be connected in a variety of topologies (star, bus, token ring, etc.), operate at different speeds and protocol levels (Ethernet, Arcnet, etc.) use a variety of packet protocols IPX (Internetwork Packet Exchange), TCP/IP (Transmission Control Protocol/Internet Protocol), etc.), all under the control of a variety of network operating systems (Novell Netware, UNIX, etc.).

Isolated LANs require modem communications to provide internetwork access between remote networks. Transmissions may require very high baud rate modem communications which result in a throughput bottleneck at the dedicated modem. Internetwork packet transfer incurs slower throughput over serial channels than is available over the LAN. Packet communications between networks are further complicated by modem failures requiring re-establishment of the links.

There is therefore a need in the art for special purpose intelligent LAN modem nodes which allow users on a LAN to share modem resources for off-LAN communications and which also allows remote users access to network resources without tying up any PCs on the network. There is further a need in the art for an efficient network modem node for interconnecting networks. There is also a need for an intelligent network modem node which limits internetwork traffic and which provides packet protocol translation between networks.

SUMMARY OF THE INVENTION

The present invention solves these shortcomings in the art described above. The present invention also solves other shortcomings in the art which will become apparent to those skilled in the art upon reading and understanding the present specification.

A method and apparatus which provides an integrated, intelligent node for a local area network device which provides modem communication both to and from the network for both remote computers and other network nodes is presented. The LAN modem node operates as a standalone node on a LAN to allow the shared resources of modem, communication for the nodes on the network and for remote computers and networks without tying up any PCs on the network. The LAN modem node allows the node on the LAN to communicate with off-LAN devices such as mainframe computers, off-site printers, minicomputers, other local area networks and the like. The LAN modem node also gives off-LAN personal computers access to network resources. Dual LAN modem nodes may be utilized to form a user-transparent bridge between networks with a plurality of internetwork channels. This embodiment of the LAN modem node utilizes load balancing for improved channel utilization and a programmable filter for controlling which network users can access the bridge and for restricting local packet traffic to the LAN. The LAN modem node provides autodialing and autoanswering which is used to reestablish communications if one or more of the channels is lost. Another embodiment of the LAN modem node provides routing functionality to enhance the transparency of the bridge and router.

BRIEF DESCRIPTION OF THE DRAWINGS

In the drawings, where like numerals refer to like elements throughout the several views:

FIGS. 4, 4A–4E, 5, 5A–5E, 6, 6A–6E, 7, 7A–7E, 8 and 8A–8E show detailed schematic diagrams of the main controller portion of the local area network modem node;

FIGS. 9, 9A–9E, 10 and 10A–10E show detailed schematic diagrams of the network interface circuitry;

FIGS. 11, 11A–11E, 12, 12A–12E, 13 and 13A–13E show detailed schematic diagrams of the internal modem;

FIGS. 14A–14C show diagrams of the location of various software components of this system;

FIG. 21A is one example of a Learned Address Filter Table ("Learn Table");

FIG. 21B is one example of a Source Address Table;

FIG. 21C is one example of a Destination Address Table;

FIG. 22 is a flow diagram illustrating one embodiment of a filter module;

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice and use the invention and it is to be understood that other embodiments may be utilized and that structural or logical changes may be made without departing from the spirit and the scope of the present invention. For instance, a first embodiment of the LAN modem node is discussed which is protocol dependent, followed by a second embodiment of the LAN modem node which is used in a protocol independent bridge system. An embodiment of the LAN modem node providing routing functions is then discussed. These embodiments are not intended in an exclusive or limiting sense and the following detailed description is, therefore, not to be taken in a limiting sense, and the scope of the present invention is defined only by the appended claims and their equivalents.

A PROTOCOL DEPENDENT EMBODIMENT OF THE LOCAL AREA NETWORK MODEM NODE

Figure 1:
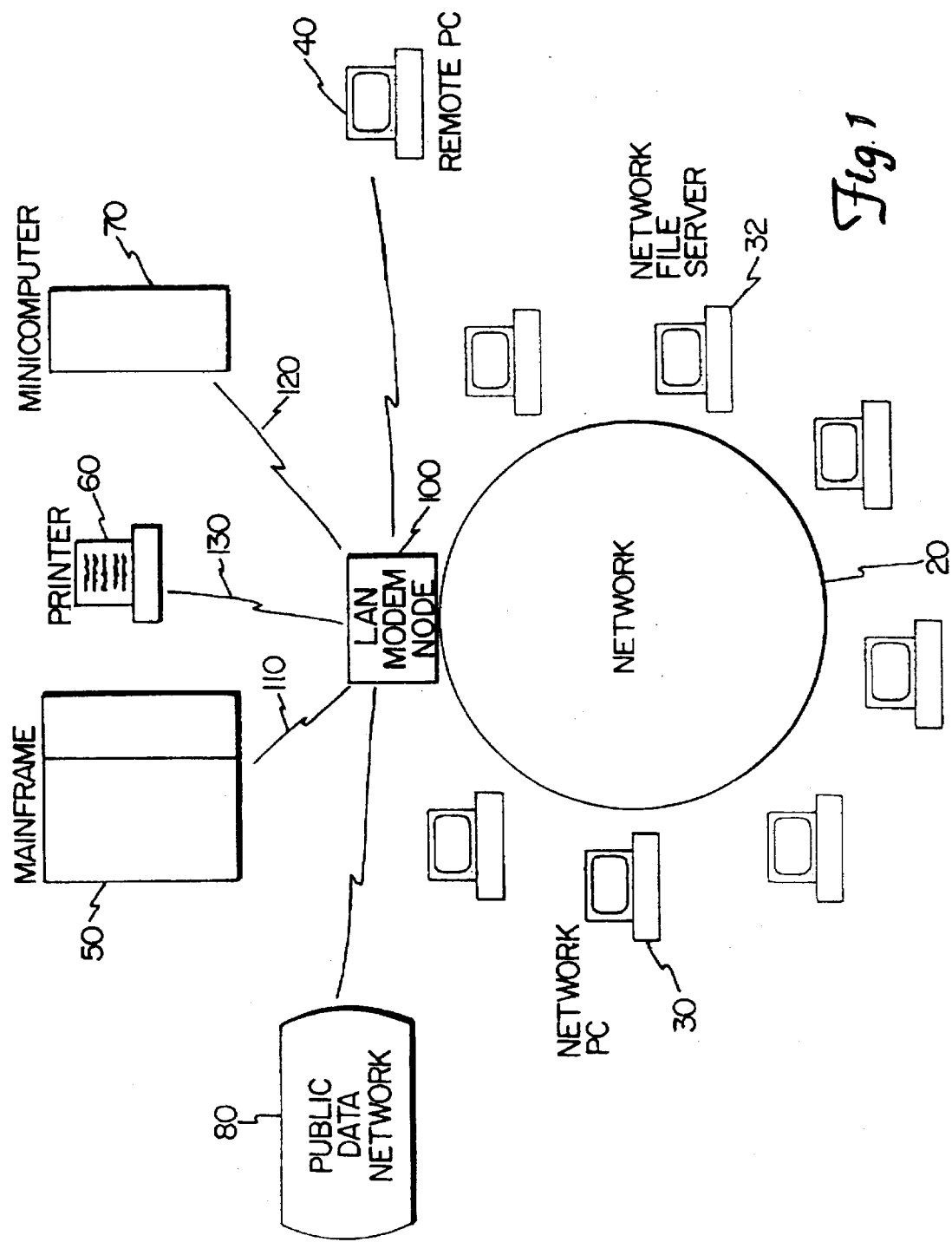
FIG. 1 shows one environment in which the local area network modem node may operate.

FIG. 1 shows a topological diagram of one communications environment in which the LAN modem node is used. The local area network modem node (hereinafter referred to as "LAN modem node") 100 is an intelligent node connected to local area network (LAN) 20 which allows the PCs 30 on the LAN 20 to communicate with off-LAN devices 40, 50, 60, 70, 80 through LAN modem node 100, and which allows off-LAN (remote) PCs access to network resources without tying up other PCs 30 on the LAN (hereinafter referred to as "network PCs").

LAN modem node 100 may communicate in a variety of styles to a variety of off-LAN devices through asynchronous communication links 110, 120, 130, to such remote resources as mainframe computer 50, printer 60, minicomputer 70 or any public data communications network 80, such as Compuserv, America Online, Genie, BIX (Bite Information Exchange), Dialog, Prodigy, Dow Jones, Mead Data Central and many others. The public data network 80 may also include public or private bulletin board services. An off-LAN device could also include another local area network, in which case the LAN modem node acts as a bridge to connect the two local area networks into a wide area network.

The LAN modem node 100 operates as an intelligent node on the network with all the capabilities one would find in a personal computer in a minimum hardware configuration.

The LAN modem node contains network interface circuitry which allows communication over the LAN using the IPX (Internetwork Packet eXchange) communication protocol which is used to initiate, maintain and terminate connections and communication between nodes on the network.

The LAN modem node 100 also includes a fully functioning computer including RAM and ROM memories. Initialization of the LAN modem node computer is accomplished through a power-up boot routine which downloads the initialization programs for starting the computer of the LAN modem node 100 through the network from the network file server 32. In this fashion, local disc storage is not required for the operation of LAN modem node 100. Upon power up of the LAN modem node 100, the LAN modem computer is initialized, the LAN modem node is logged onto the network and the boot routines are downloaded through the LAN to begin operation.

In order to provide ease of construction, maintenance and use, the computer of the LAN modem node 100 is preferably configured to be similar to the PC architecture such as the type promulgated by IBM in the PC-AT standard. Those skilled in the art will readily recognize, however, that the computer of the LAN modem node 100 may be constructed using any computer architecture without departing from the spirit and the scope of the present invention.

The LAN modem node 100 contains two dedicated modems which conform to the telecommunications specifications in CCITT recommendations V.34, V.32bis, V.32, V.22bis, V.22, V.23, V.21 and are compatible with the Bell 212A and 103 modems. Compliance with these specifications allows speeds of 28,800, 14,400, 9600, 4800, 2400, 1200, 600 and 300 bits per second. The data may be transmitted through the modems of the LAN modem node using error control protocol like MNP or V.42 with or without data compression (e.g. V.42bis).

The LAN modem node also includes software which enables the network PCs 30 to communicate over the LAN to LAN modem node 100 to initiate, maintain and terminate asynchronous communications over the public telephone lines 120 or other asynchronous lines 130 connected to LAN modem node 100. Communication between the network PCs 30 and the LAN modem node 100 is made possible through use of a special packet protocol for transferring data and control information between the network PCs 30 and the LAN modem node 100. This special packet protocol, described more fully below, is a packet protocol constructed by the software of the LAN modem node 100 which is then embedded within the IPX packet protocol which is used for communicating over the LAN 20. The IPX protocol merely transfers the packets as raw serial data without any knowledge of the content of those packets. The packets of the node are decoded by the software running at the LAN modem node and at the network PCs recipient site. The LAN modem node also includes software which enables remote PCs 40 to have access to network resources. Communication between remote PCs 40 and the LAN modem node is accomplished through remote control communications software.

A remote PC 40 accessing network resources through the LAN modem node 100 requires the use of a variety of packet and file transfer protocols. For example, to communicate between a network PC 30 and a remote PC 40, the information to be transferred is placed into the special packet protocol for communication between the network PC and the LAN modem node, which are then embedded in IPX packets for transfer to LAN modem node 100 over the LAN 20. LAN modem node 100 is also running the IPX and NETX driver routines in the background. Also, the software corresponding to the software running on LAN modem node 100 runs on the network PC 30. That is, this software includes a driver routine which will receive and decode the special packets embedded in the IPX packets received from the network. The special packets of the node are then decoded and determined if they are data or control packets. If they are data packets, they are reconstructed into the type of packets used by the remote control software package to be transmitted over the asynchronous communication link to the remote PC 40. This protocol, may take the form of the CCITT V.42 standard, as is well known in the industry and described in the CCITT Blue Book, Volume VIII, entitled "Data Communication Over the Telephone Network", 1989. The CCITT V.42 standard is hereby incorporated by reference. The remote PC 40, also operating from the remote control software, receives the packets over the asynchronous link from LAN modem node 100. The remote control software then decodes the information and makes it available to the user on the screen or store it as a file. In order for the remote control software and special packet protocol software to peacefully exist and operate in the LAN modem node, the LAN modem node also includes inter-module control software which coordinates access to the LAN modem node between the remote control software and the special packet protocol software. This inter-module control software allows the modems of the LAN modem node to be shared by network PCs 30 calling out, remote PCs 40 calling in, or both.

FUNCTIONAL DESCRIPTION OF THE HARDWARE COMPONENTS

Figure 2:
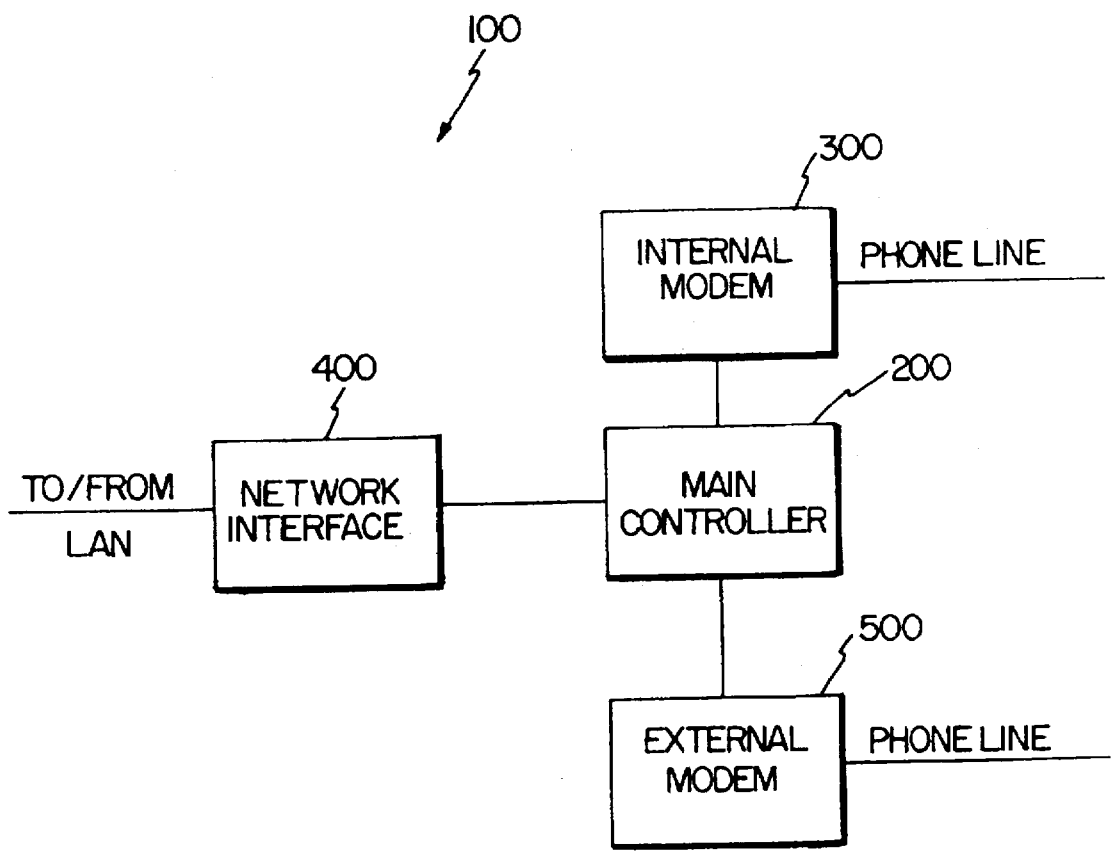
FIG. 2 shows a block diagram of the local area network modem node.

FIG. 2 is a block diagram of the main hardware components of the LAN modem node corresponding to reference number 100 of FIG. 1. These components form a link between network PCs 30 and various external devices 40, 50, 60, 70 and 80 such as those shown in FIG. 1. LAN modem node 100 also links remote PCs 40 to the network 20 to allow them access to network resources such as word processing, electronic mail, compilers, etc.

FIG. 2 shows the main hardware components of LAN modem node 100. These include a main controller 200, network interface 400, internal modem 300 and external modem 500. Main controller 200 controls communication over the modems 300 and 500 between the network PCs and the external devices, and also controls communication over the modems 300 and 500 between remote PCs and network resources. Internal modem 300 and external modem 500 provide two paths through which network PCs can gain access to external devices or through which remote PCs can gain access to network resources. Network interface circuitry 400 provides the communication interface between the LAN and main controller 200.

Figure 3:
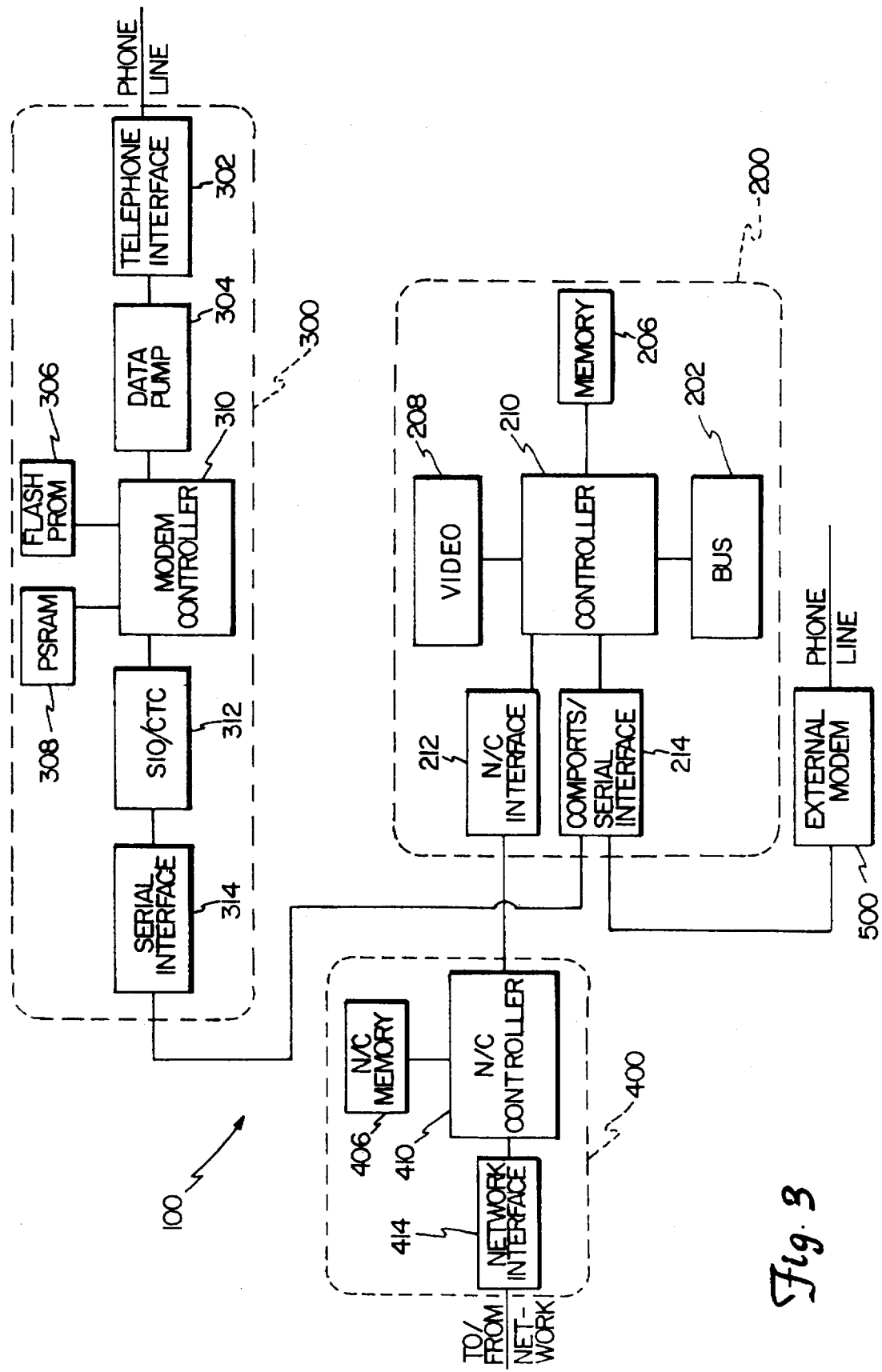
FIG. 3 shows a more detailed block diagram of the local area network modem node.

FIG. 3 shows a more detailed block diagram of the components of LAN modem node 100. The main controller represented by phantom line 200 includes controller circuitry 210 which executes control software stored in memory 206. Video circuitry 208 controls the display. Bus circuitry 202 provides the internal bus for communication between the hardware components of main controller 200 and also includes connectors for additional cards. The control software executed by controller circuitry 210 includes an async server software module for controlling communication between network PCs and the LAN modem node, and a remote control software module for controlling communication between a remote PC and the LAN modem node.

The internal modem represented by phantom line 300 includes telephone interface circuitry 302 which interfaces between internal modem 300 and a telephone line using any of a number of modem protocols known in the art. Data pump circuit 304 includes a digital telephone coder-decoder (CODEC) for communicating over the telephone line interface 302. Data pump circuit 304 also includes a digital signal processor (DSP) which performs functions such as modulation, demodulation and echo cancellation of any signals received from telephone interface circuitry 302.

Modem controller circuit 310 controls data pump circuit 304 in combination with serial input/output and clock timer control (SIO/CTC) circuit 312. Modem controller circuit 312 includes a microprocessor which controls the functions and operation of all of the hardware components of internal modem 300. The modem controller circuit 310 is connected to PSRAM circuit 308 and a programmable and electrically erasable read only memory (typically referred to as a flash PROM) 306. The flash PROM 306 includes non-volatile memory in which the executable control programs for the modem controller circuit 310 are stored. Modem controller circuit 310, in combination with SIO/CIC circuit 312, also controls communication over serial interface 314 to the COMM ports of the main controller 200.

External modem 500 is preferably the commercially available modem product Multi Modem II, described in detail in the publication entitled "MT1432 Series Intelligent Modem, Owners Manual", 1991, published by Multi-Tech Systems, Inc., the assignee of the present invention, which publication is incorporated herein by reference. The LAN modem node can be configured with or without the external modem; the external modem 500 provides an additional communication path between the network PCs and external devices or between remote PCs and the LAN.

The network interface circuitry indicated by phantom line 400 includes a network interface controller 410, network interface memory 406 and the network interface 414. Network interface controller 410 performs the format conversion of data to be transferred to or from the network to the appropriate network protocol.

DETAILED ELECTRICAL SCHEMATIC DIAGRAMS

Figure 4:
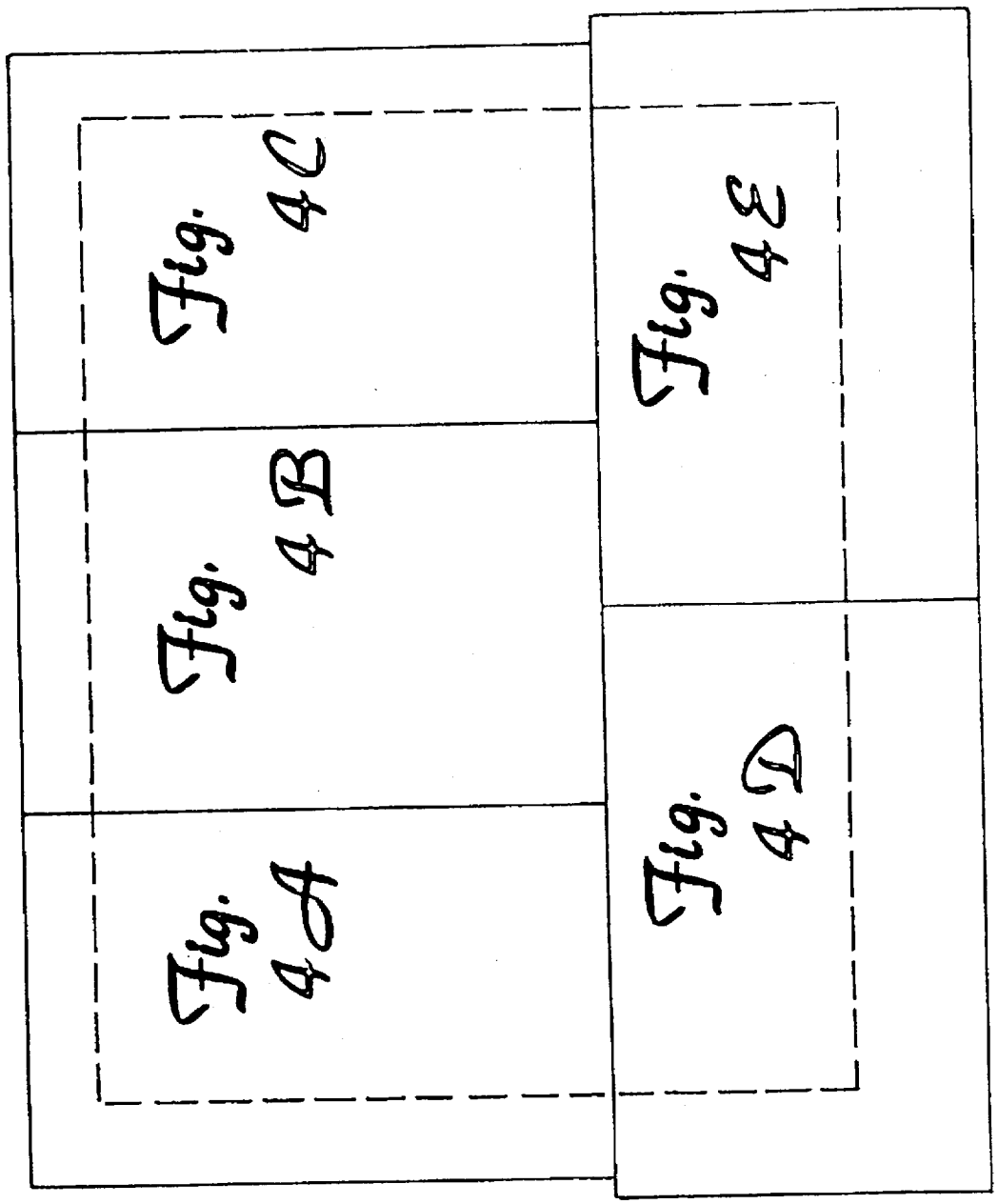
Figure 4A:
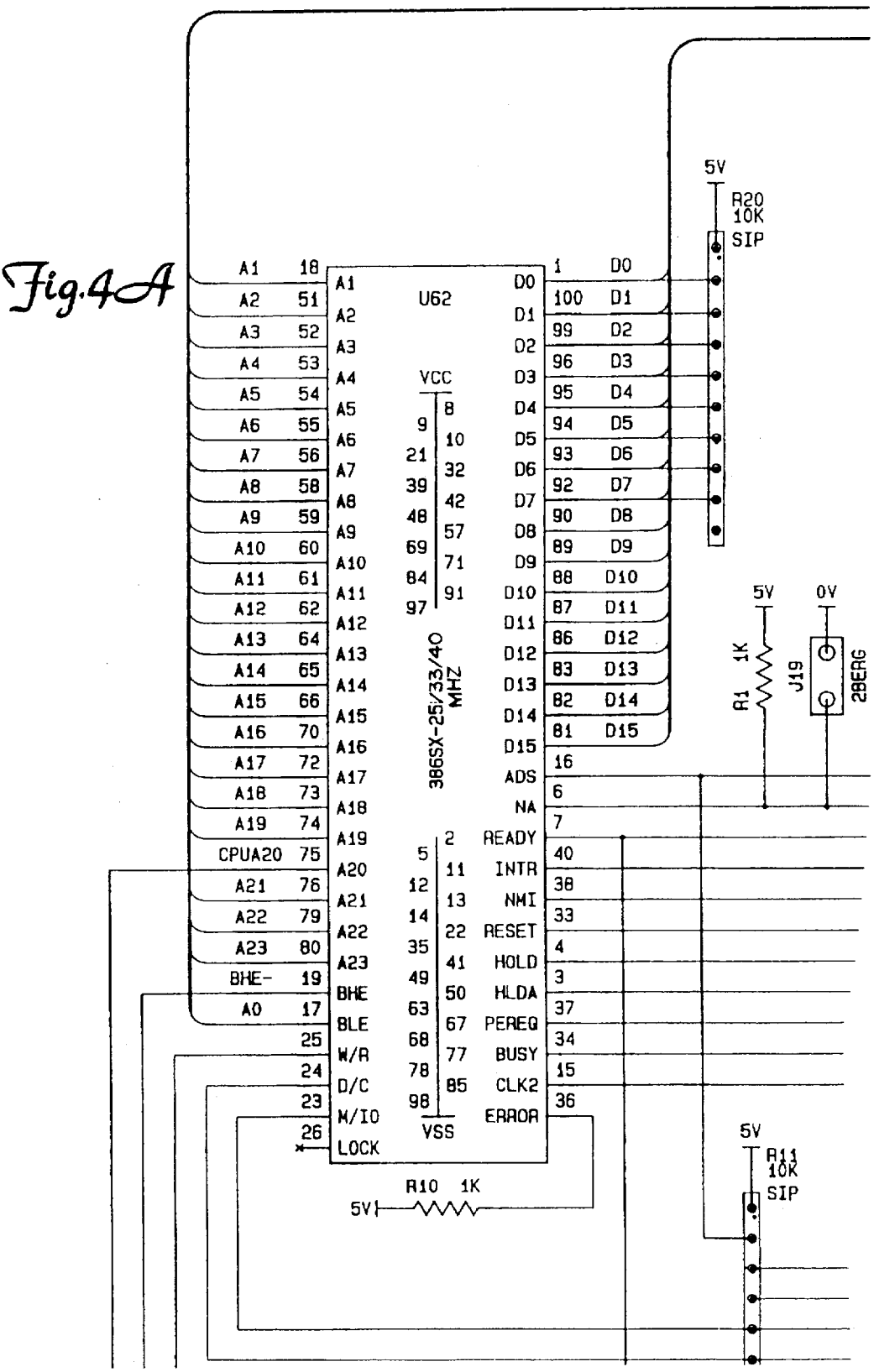
Figure 4B:
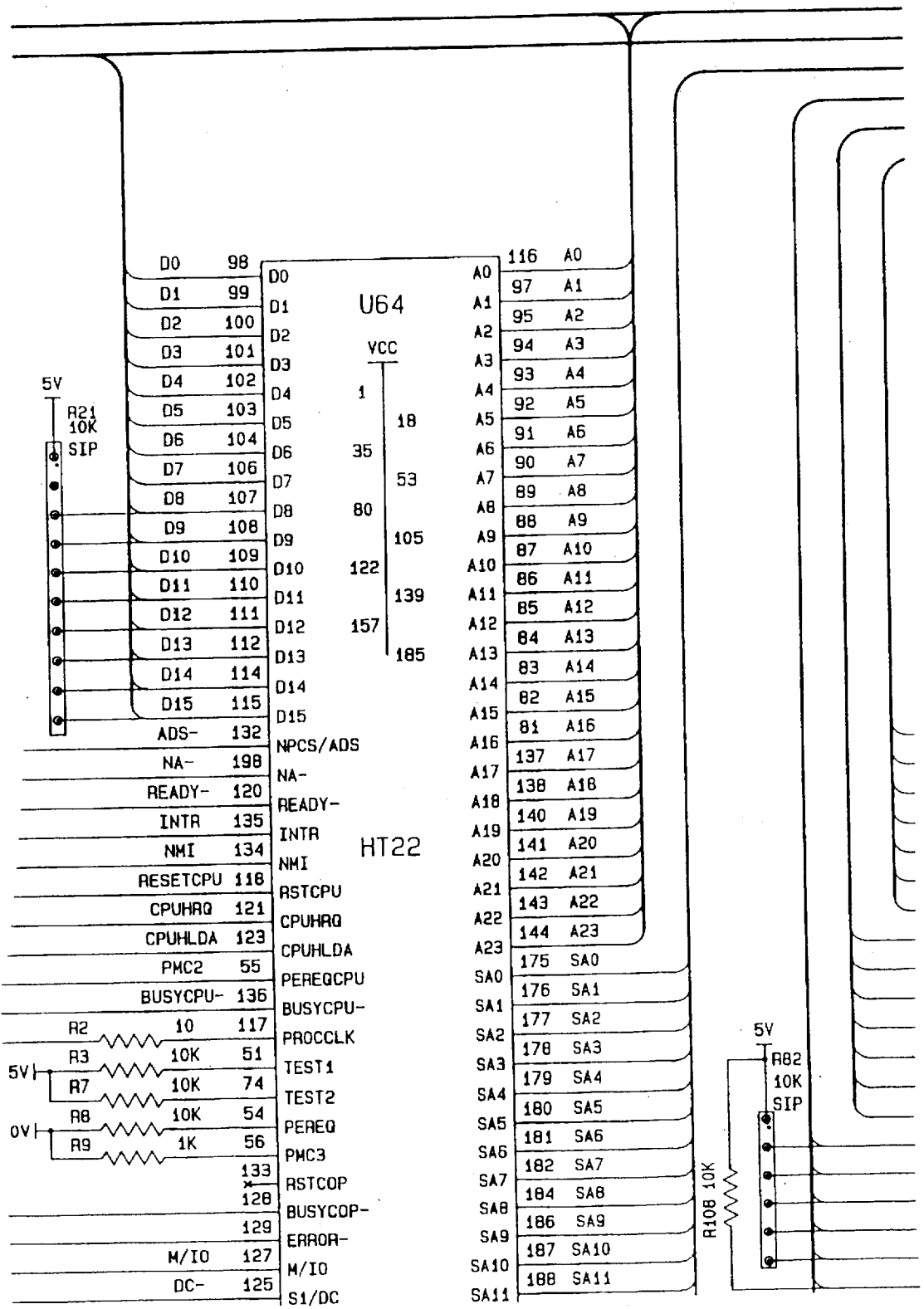
Figure 4C:
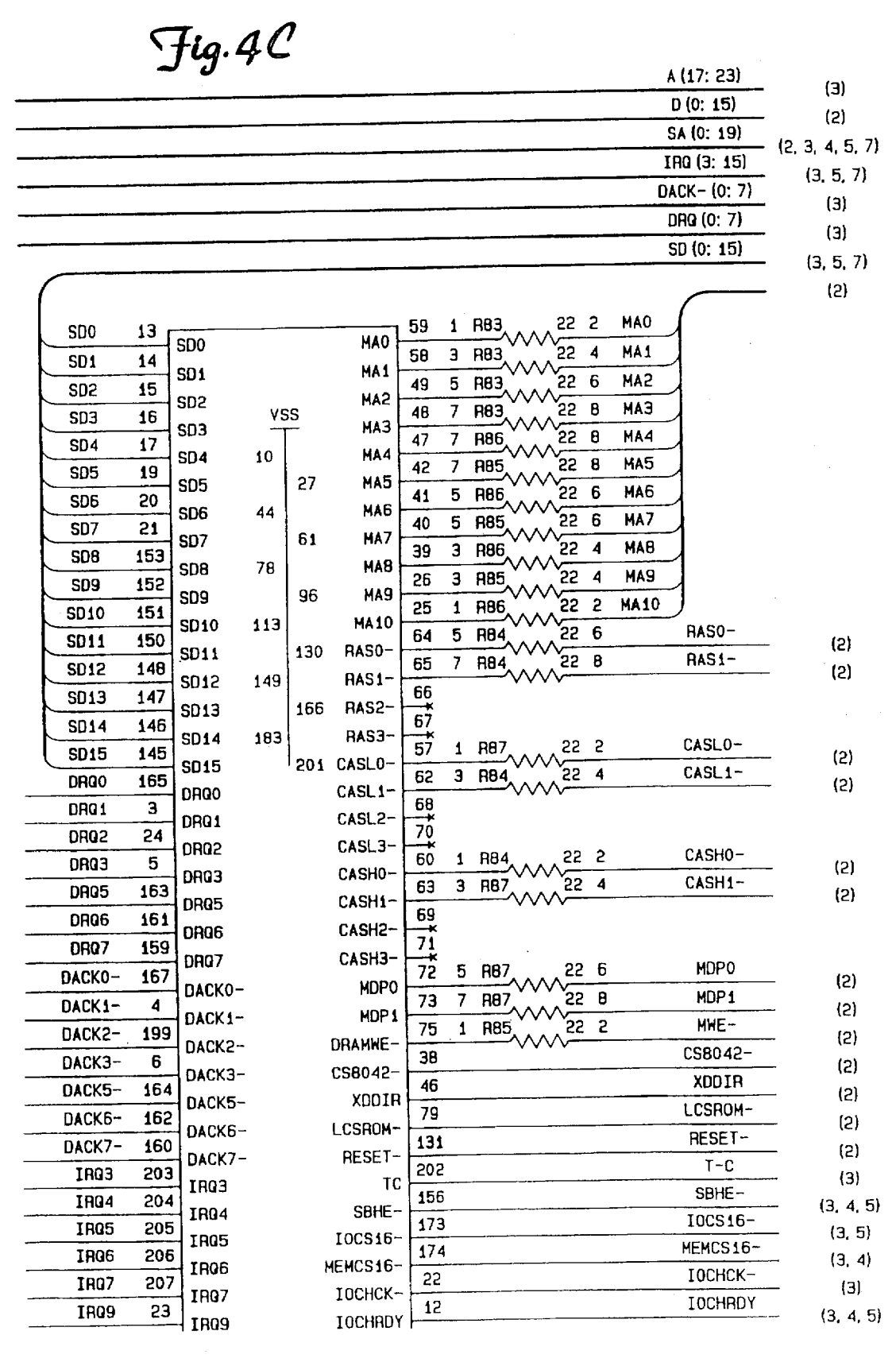
Figure 4D:
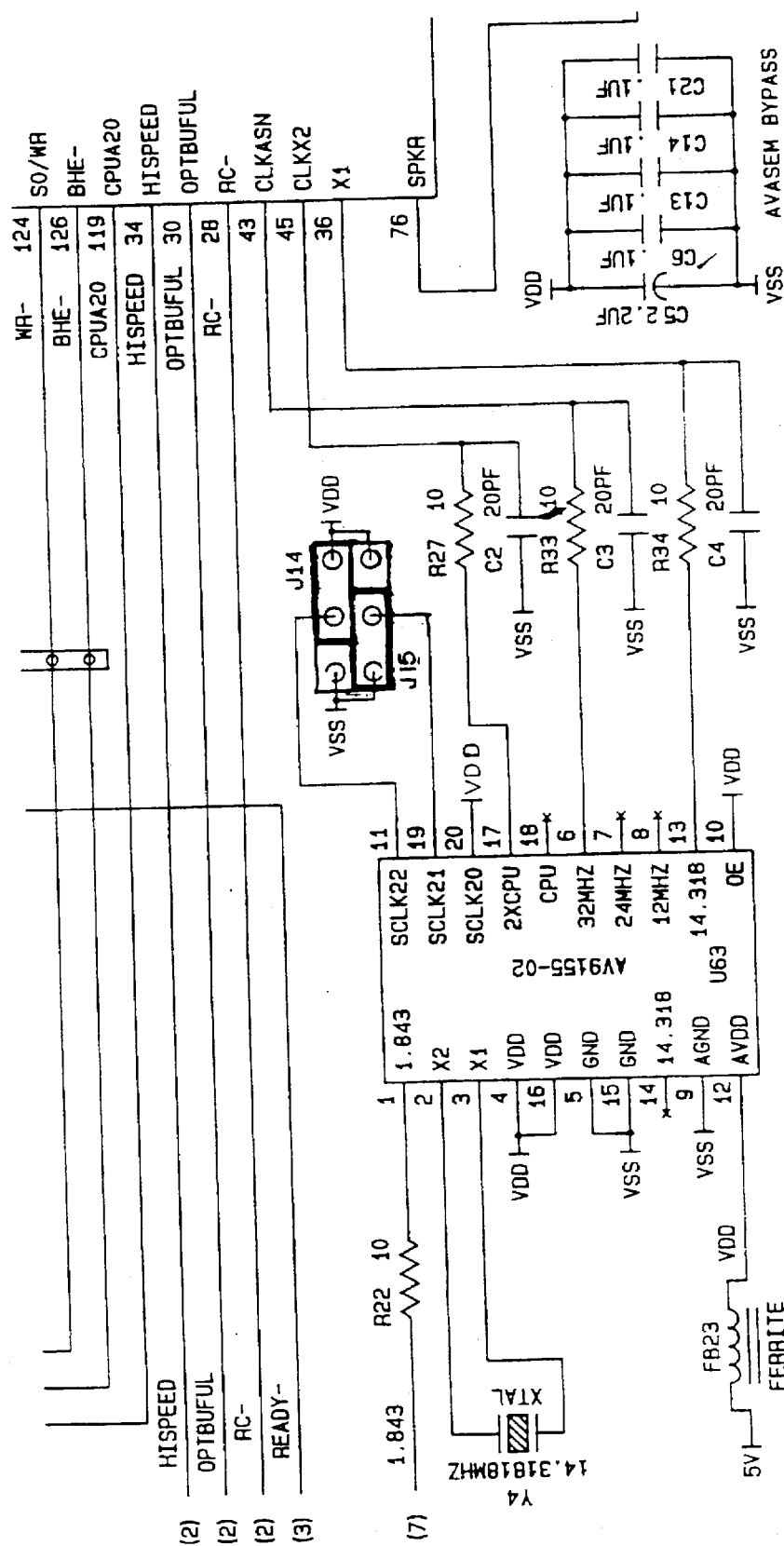
Figure 4E:
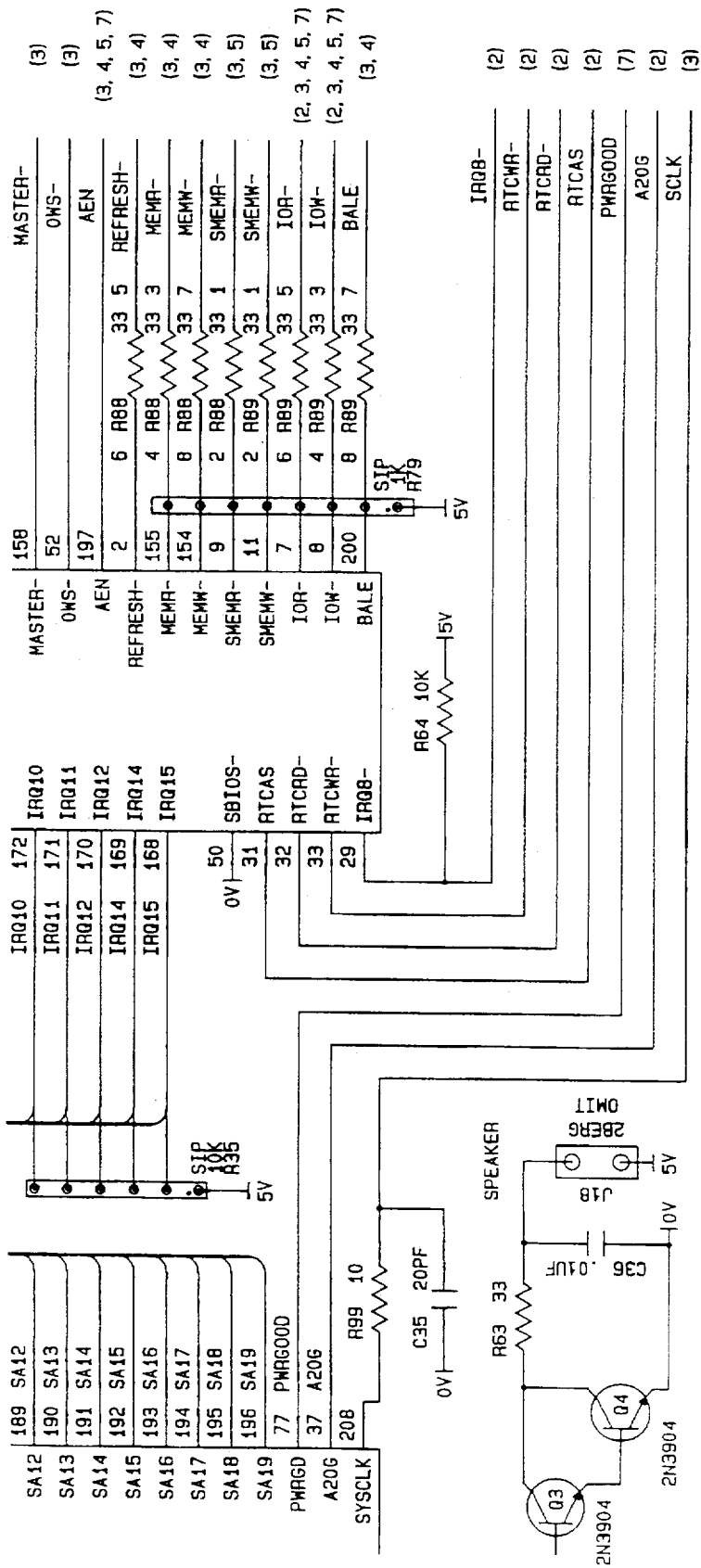
Figure 5:
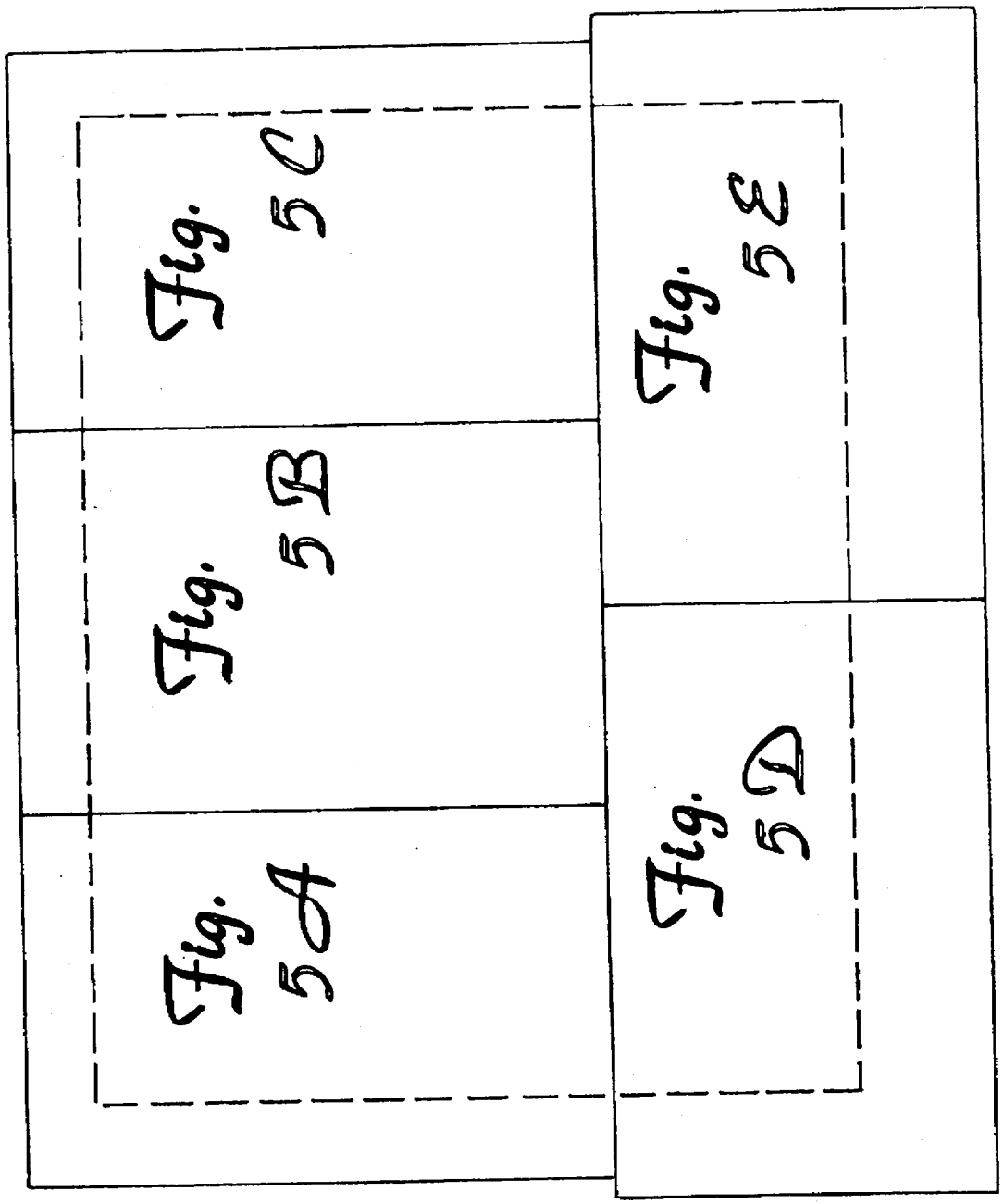
Figure 5A:
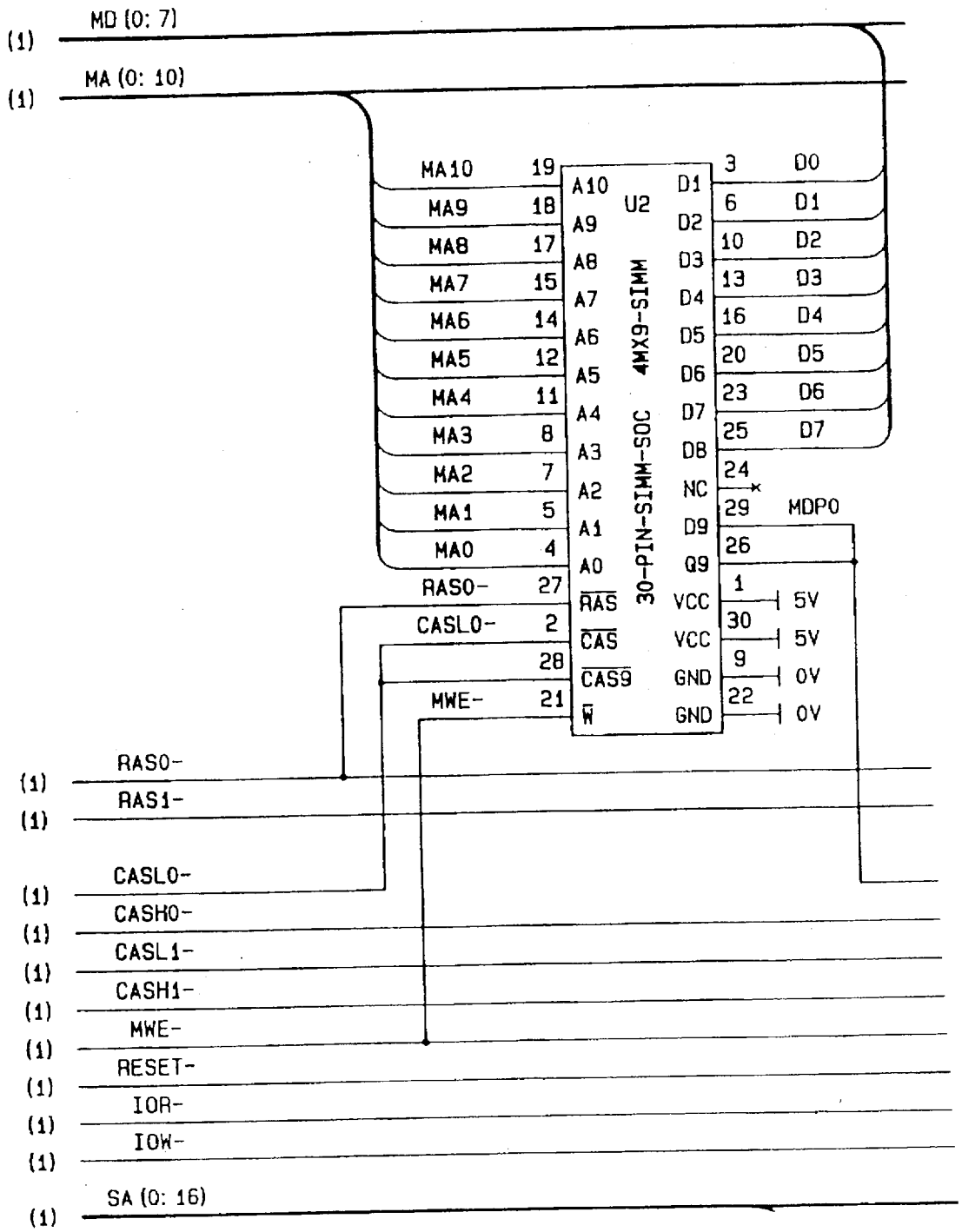
Figure 5B:
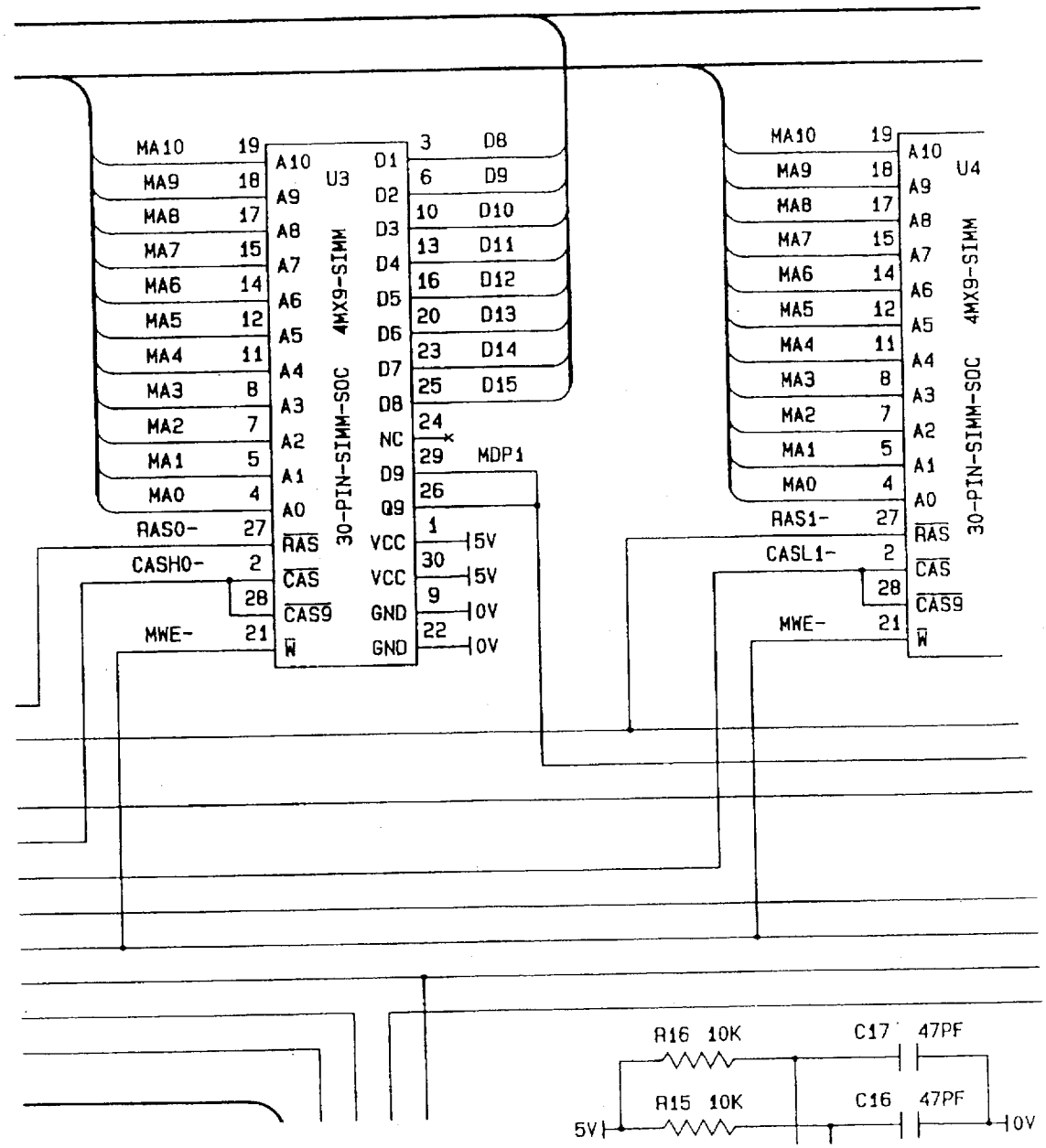
Figure 5C:
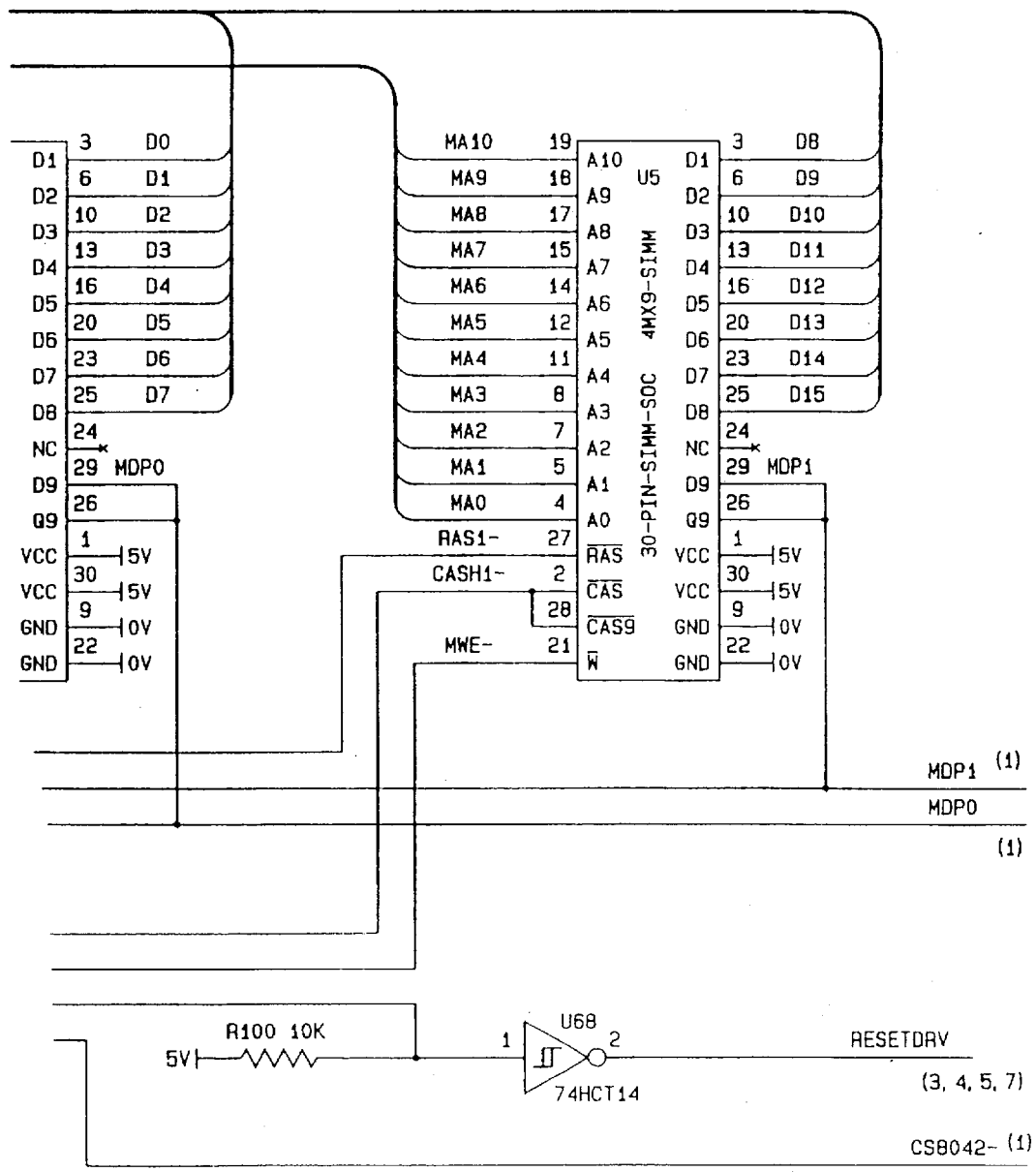
Figure 5D:
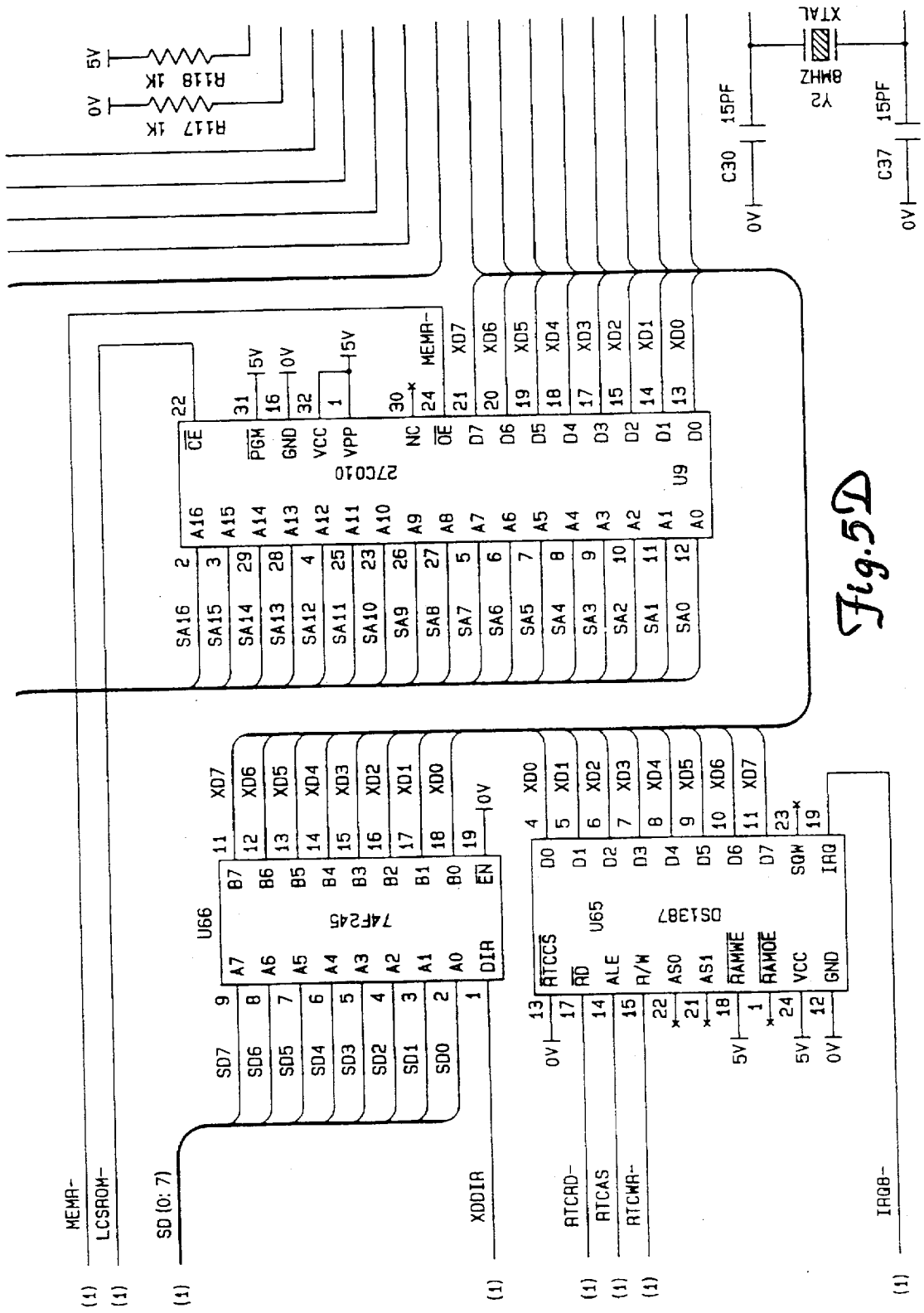
Figure 5E:
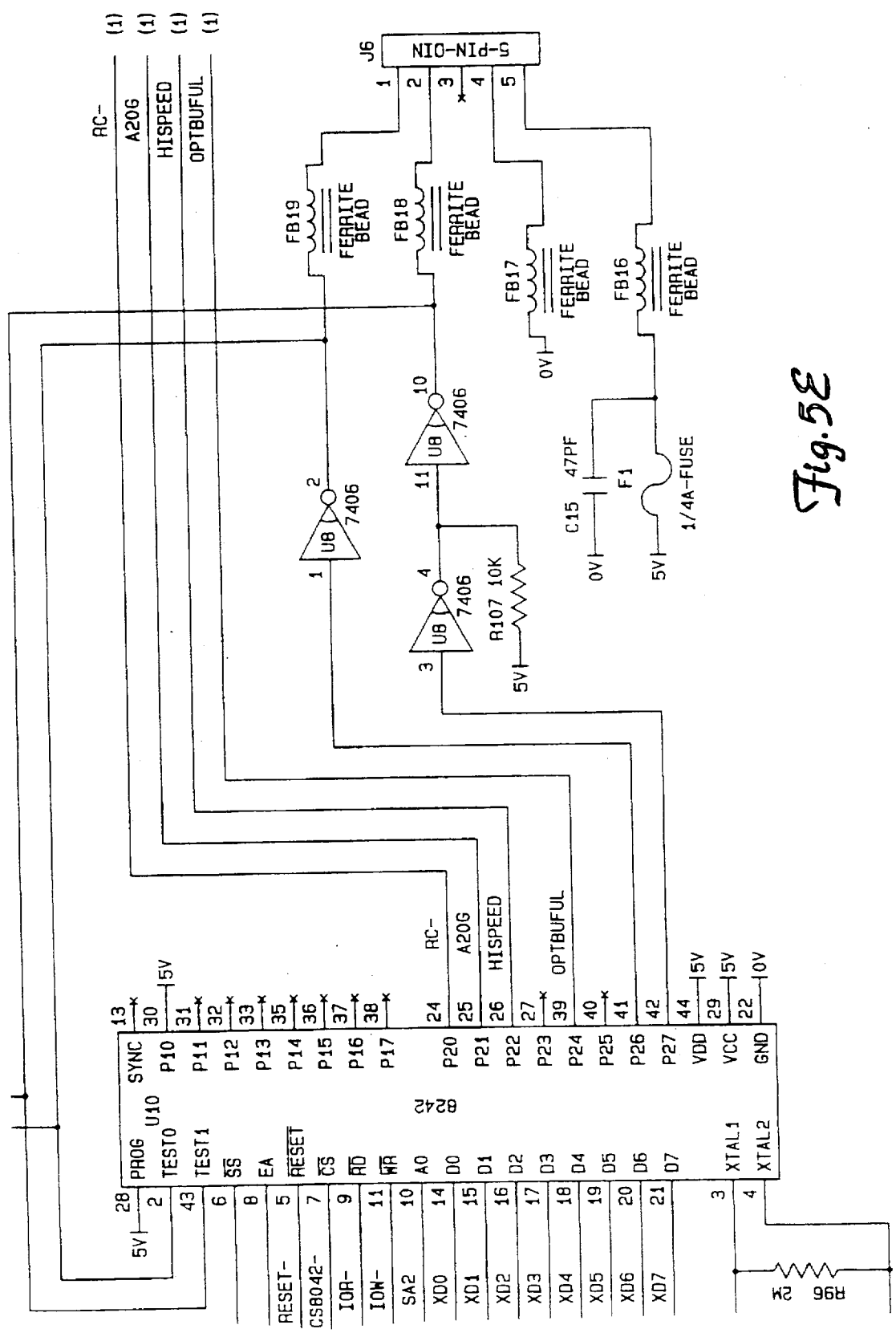
Figure 6A:
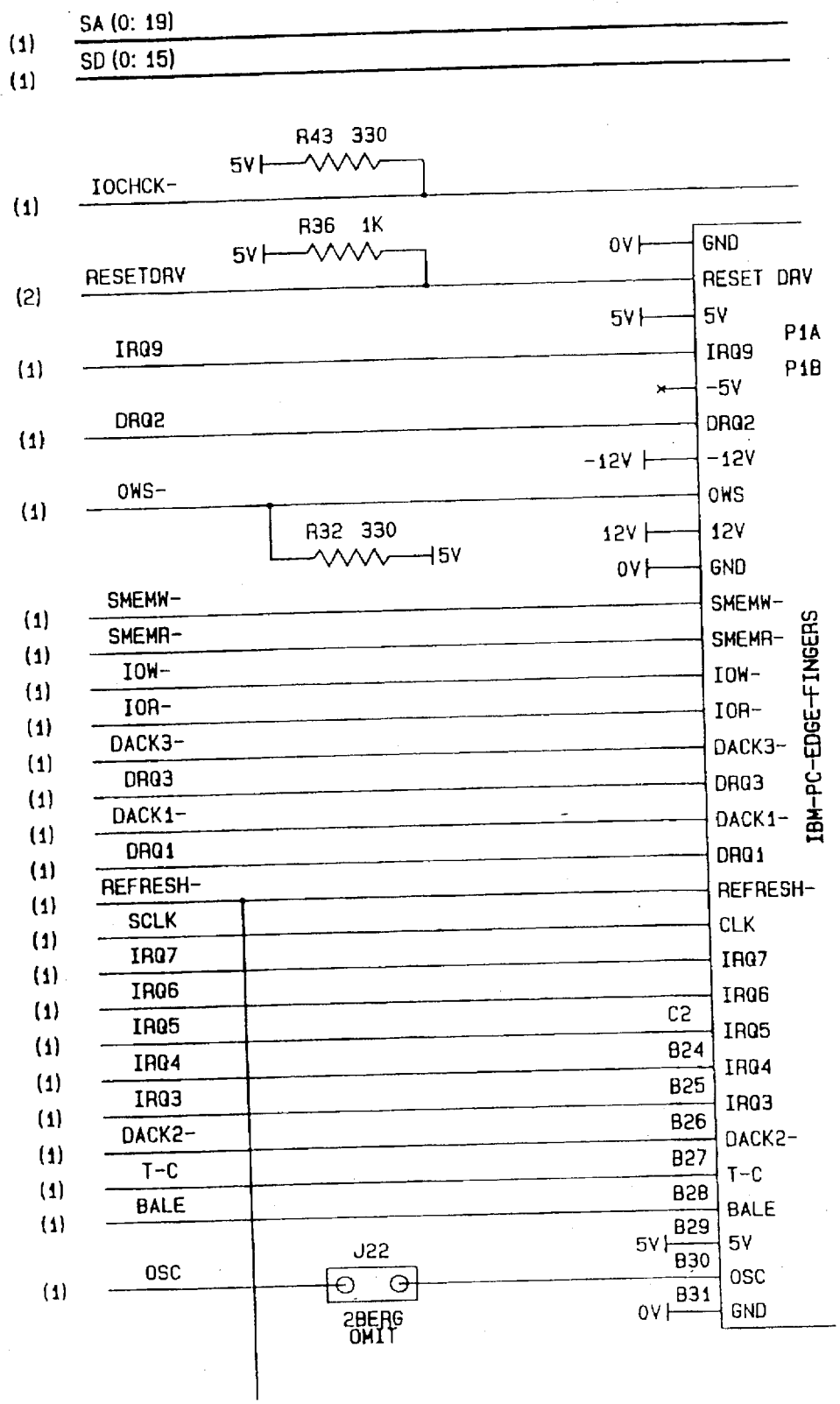
Figure 6B:
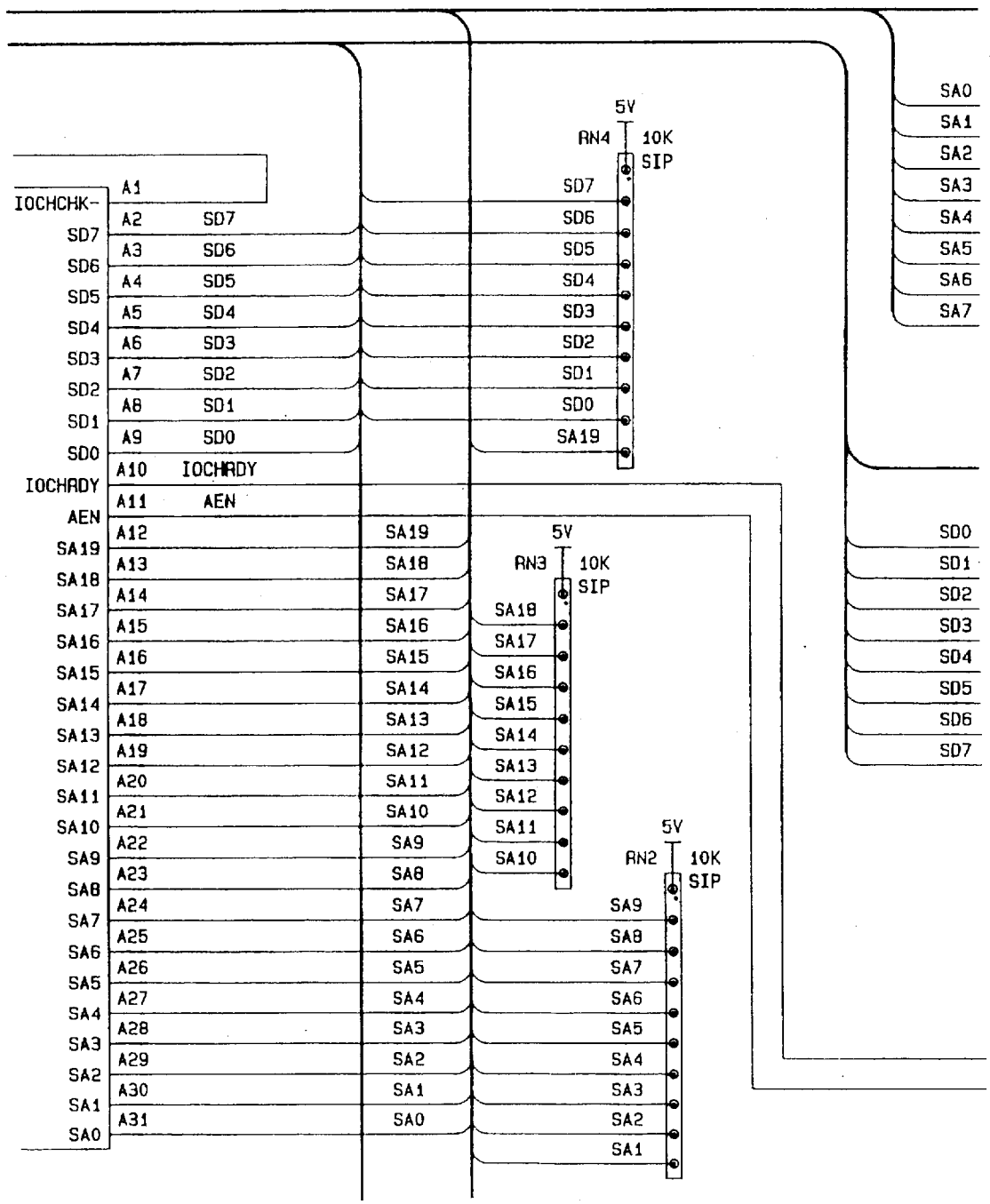
Figure 6D:
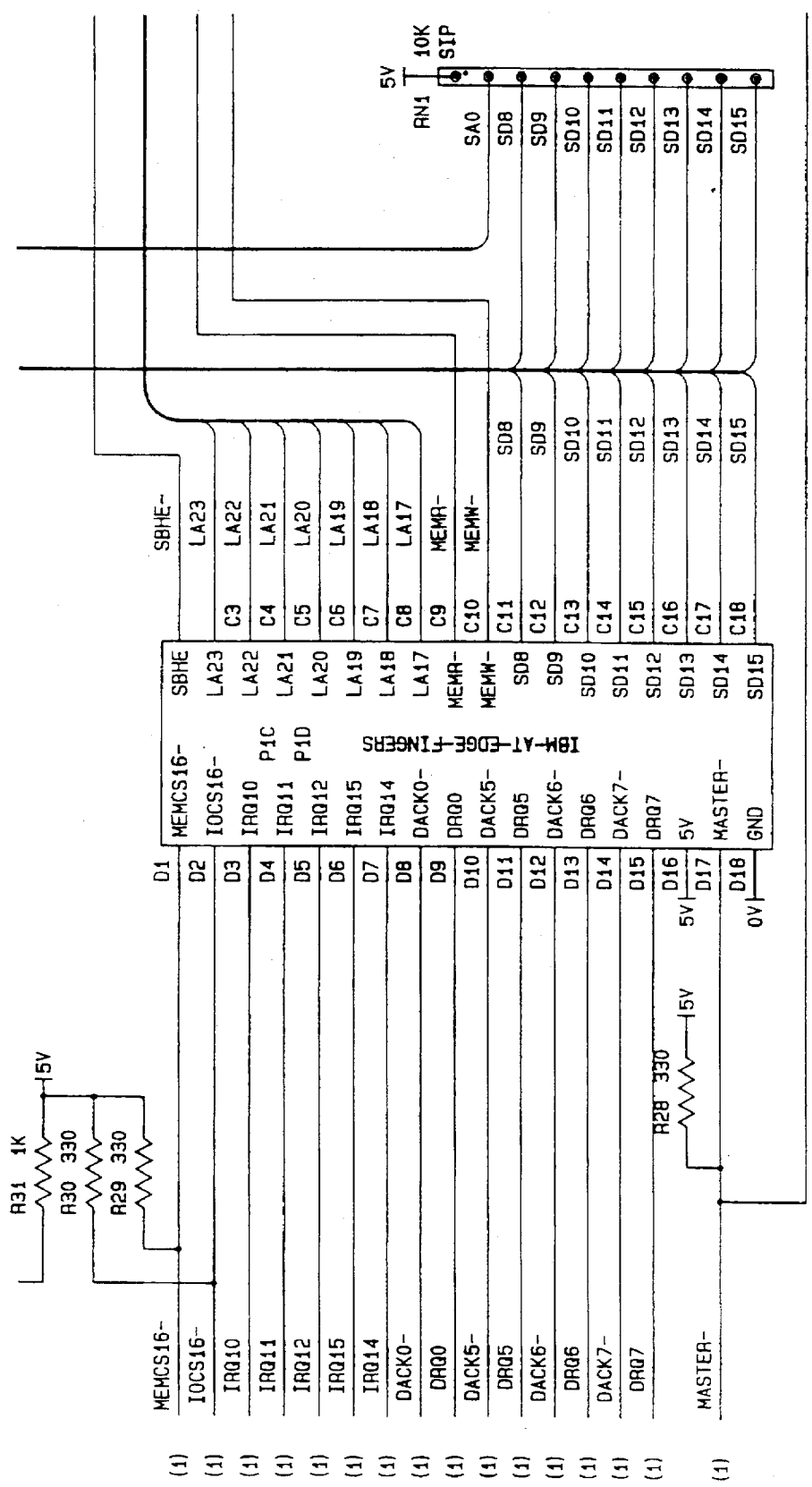
Figure 69:
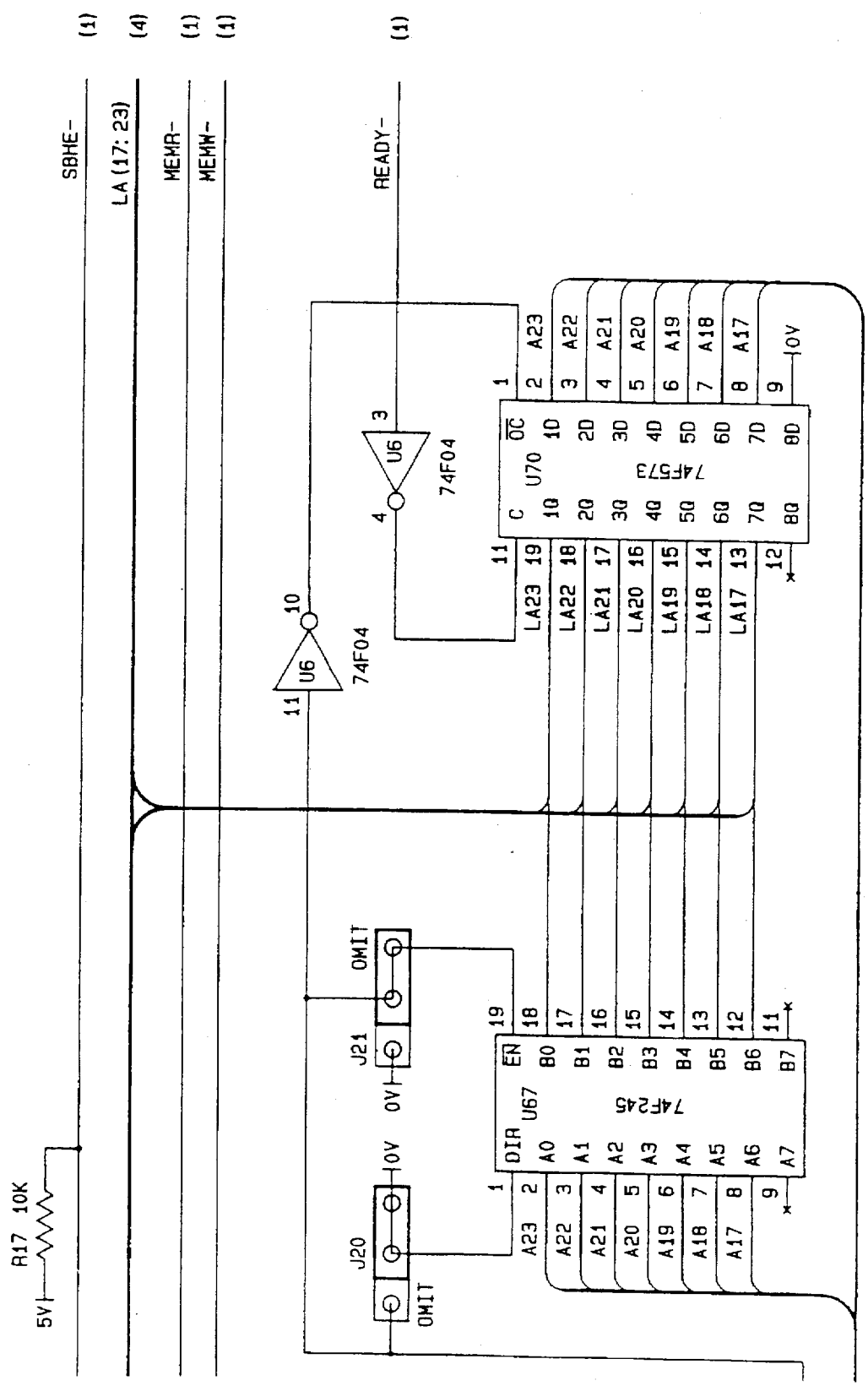
Figure 7:
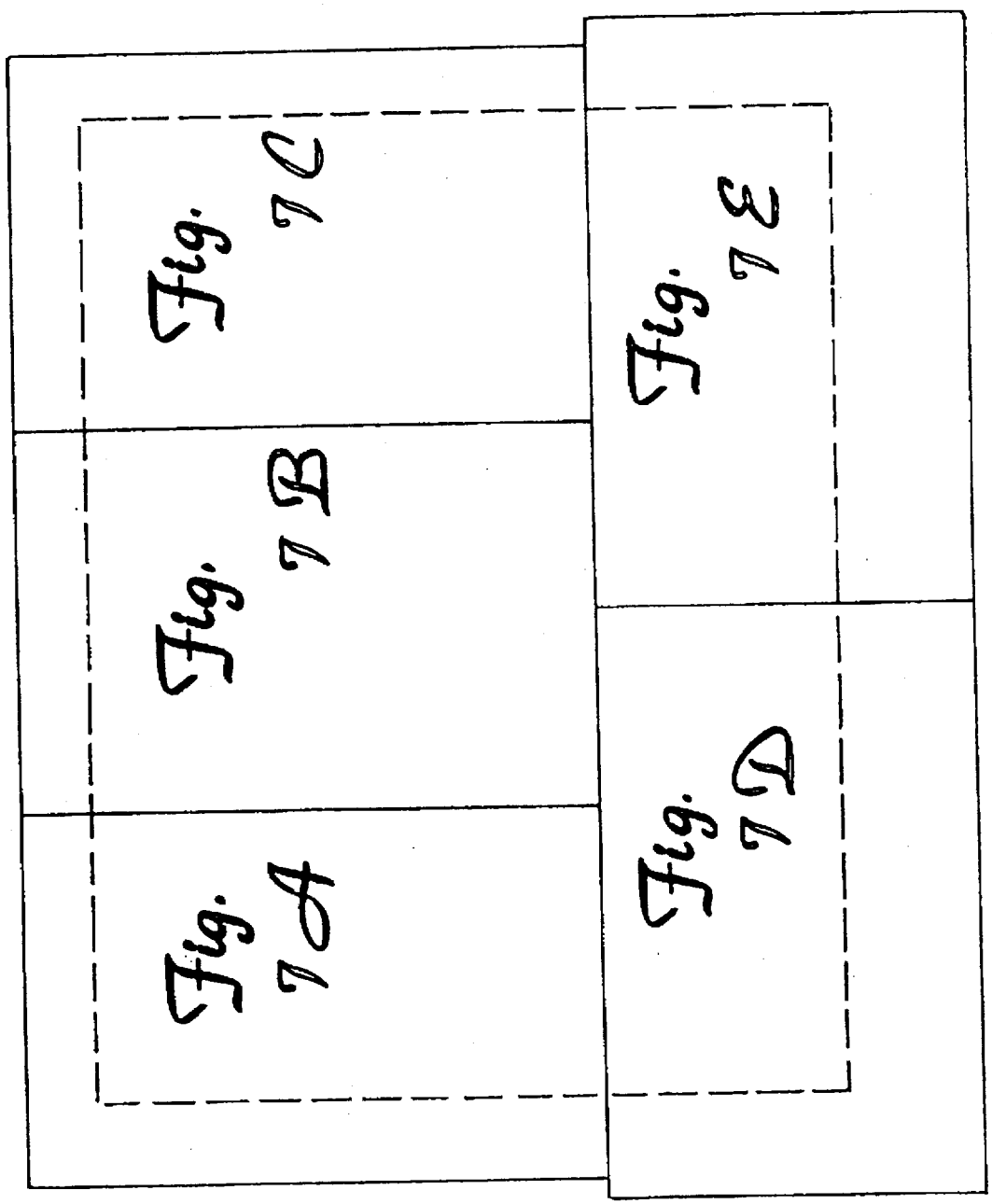
Figure 7A:
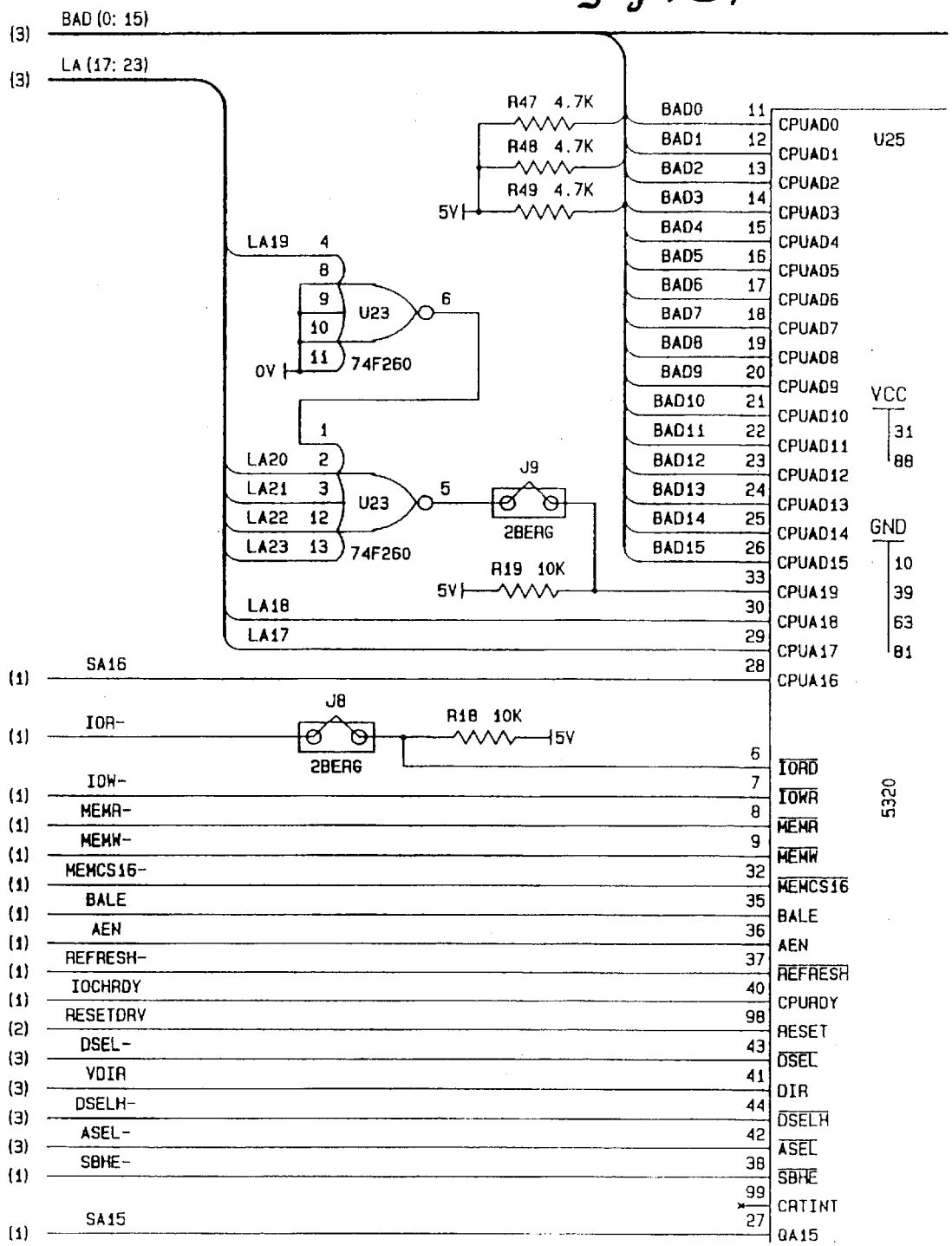
Figure 7B:
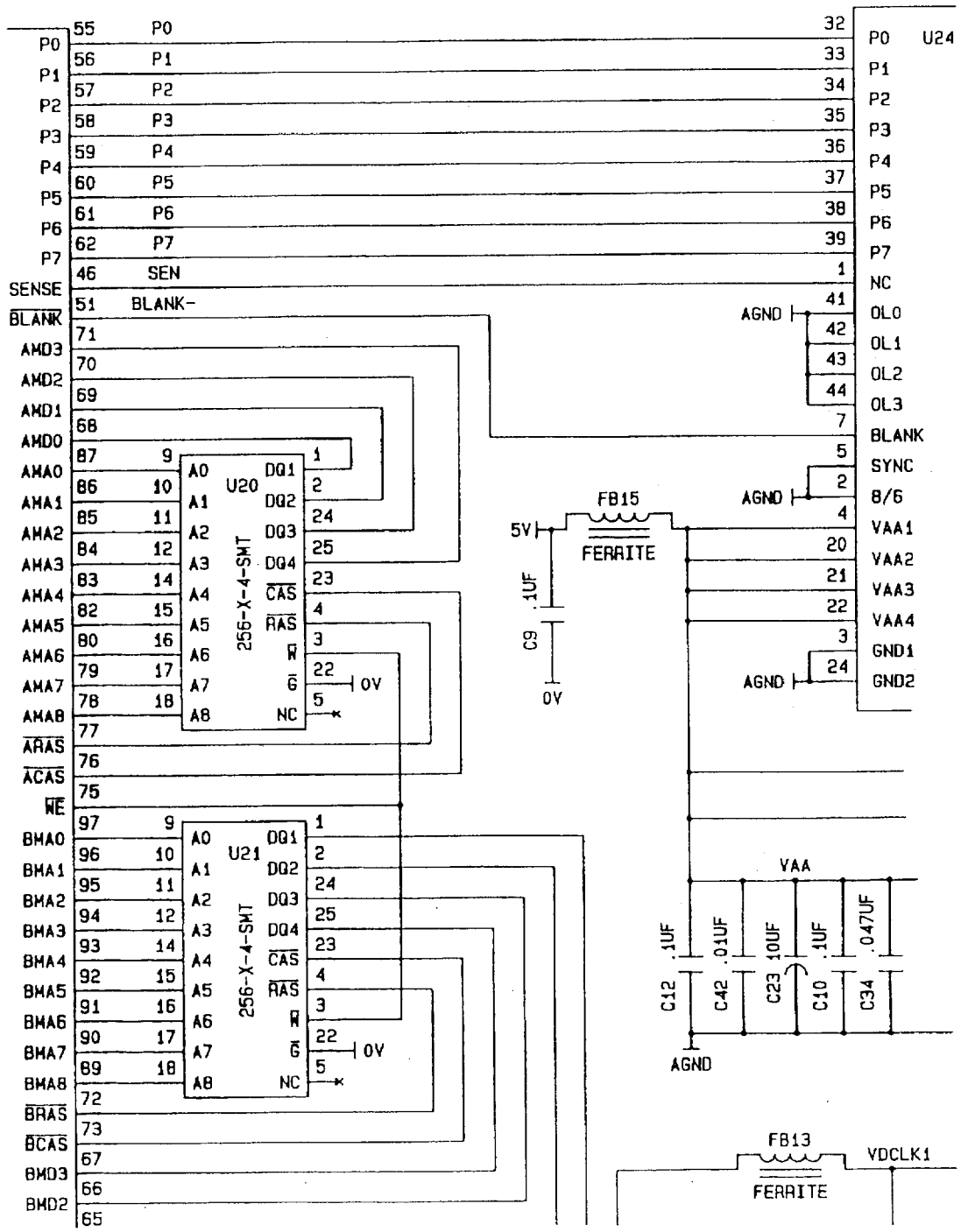
Figure 7C:
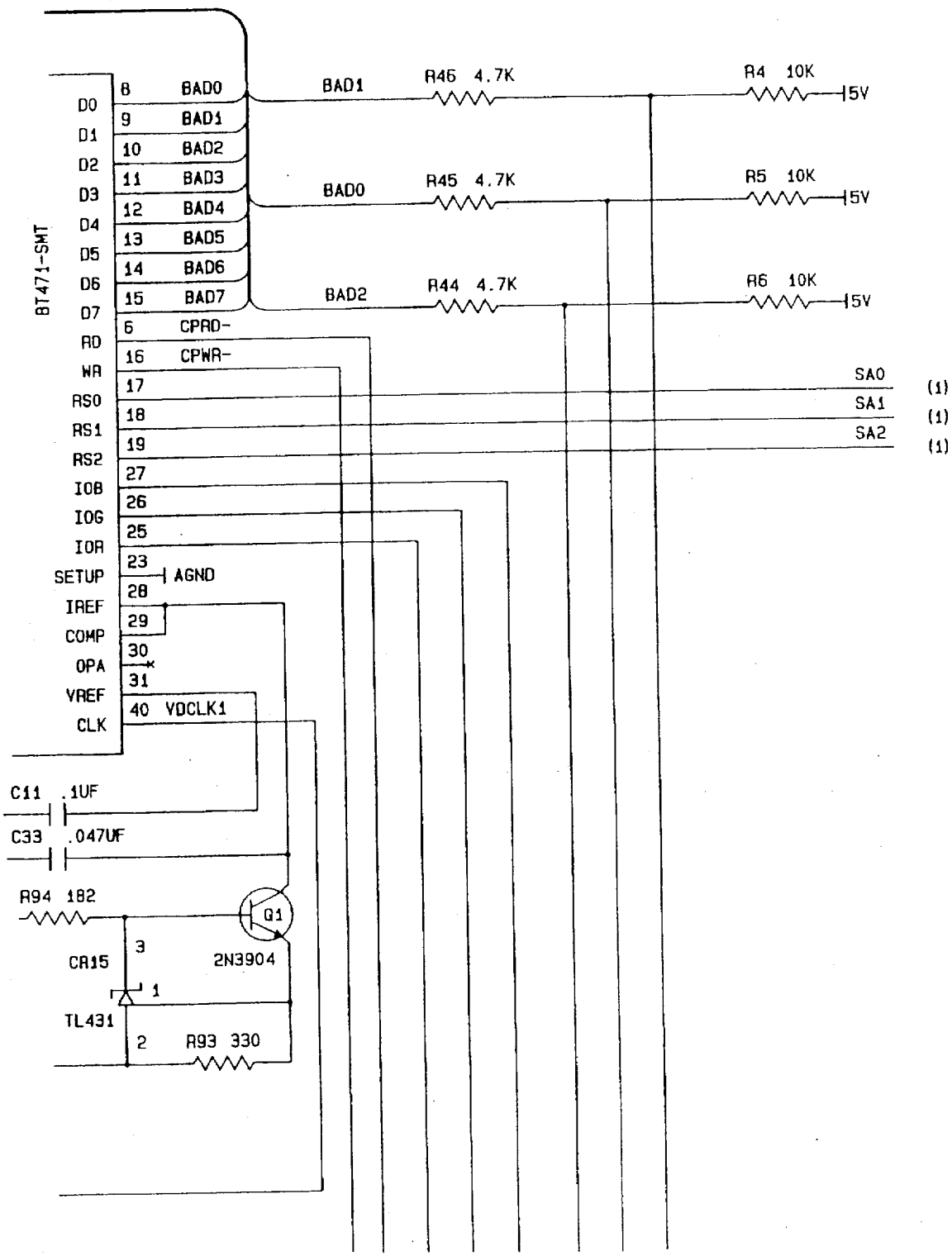
Figure 7D:
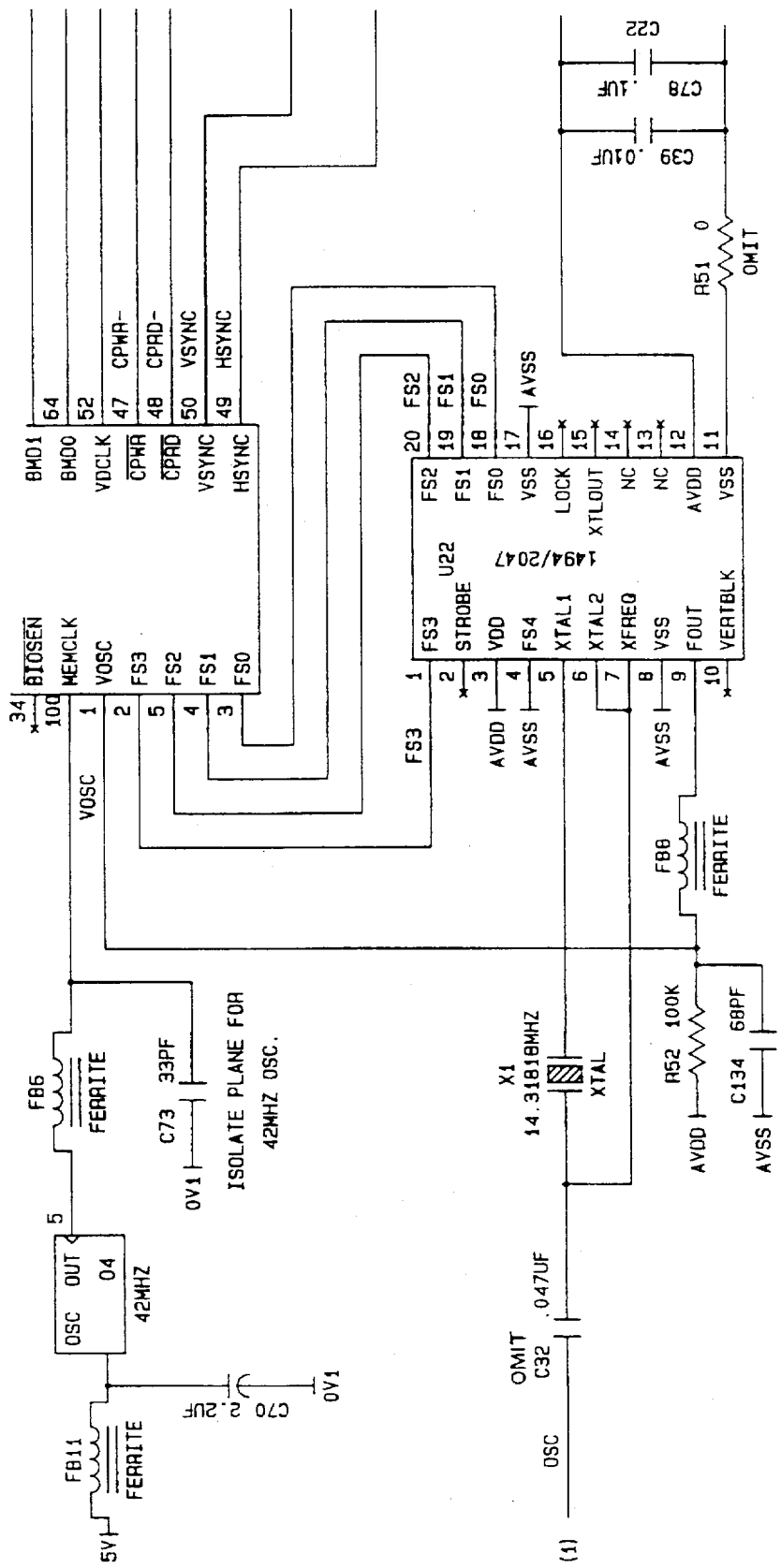
Figure 8A:
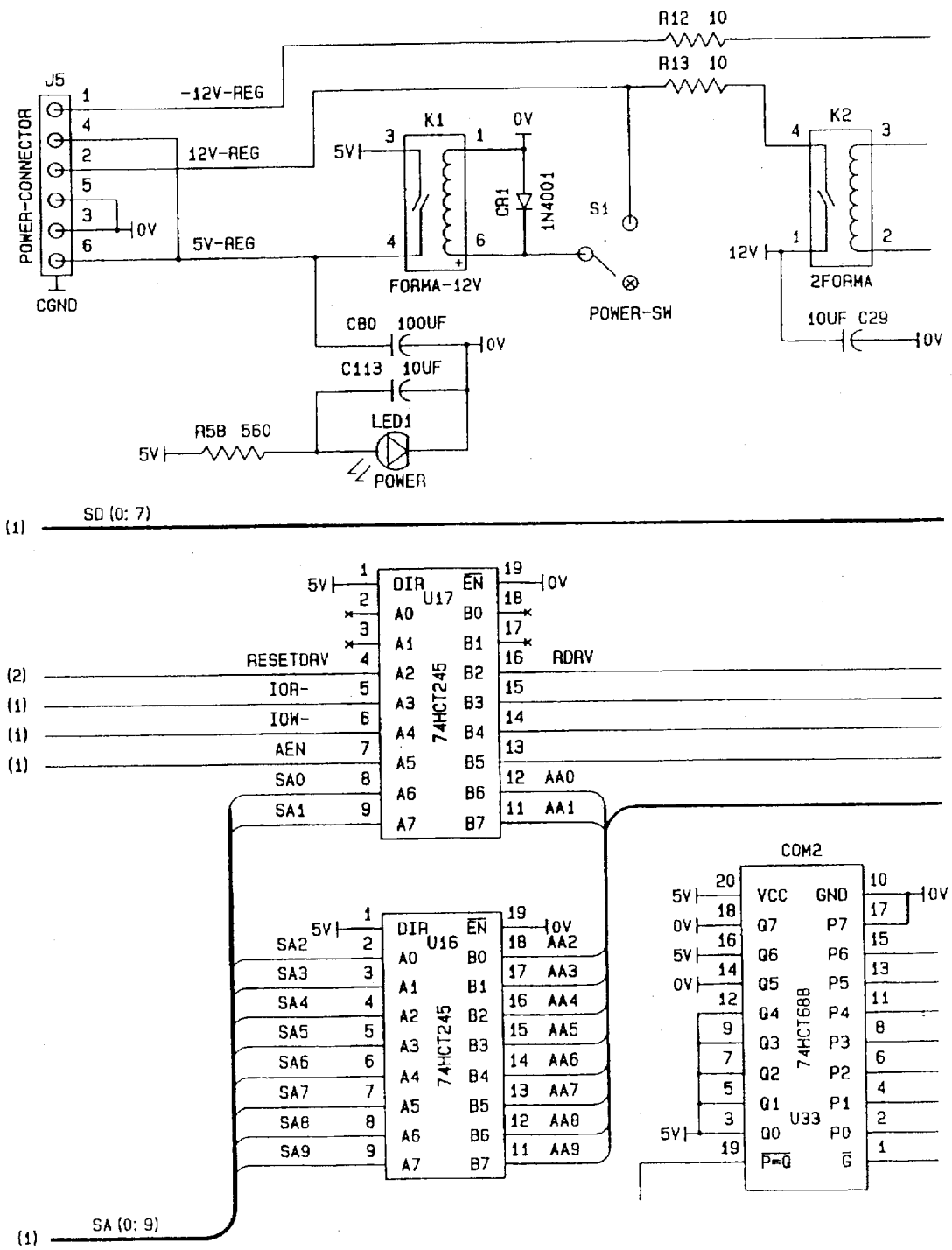
Figure 8C:
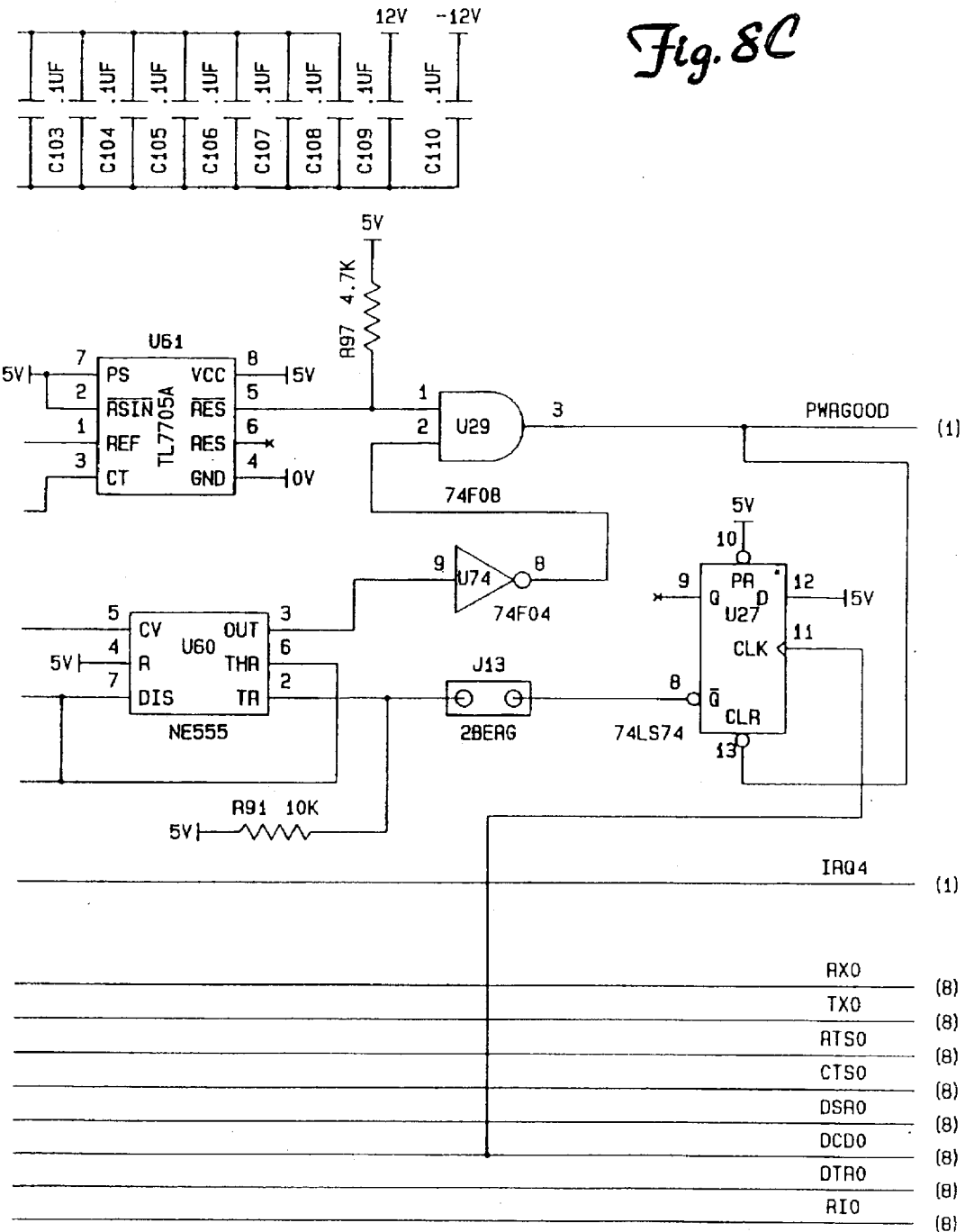
Figure 8D:
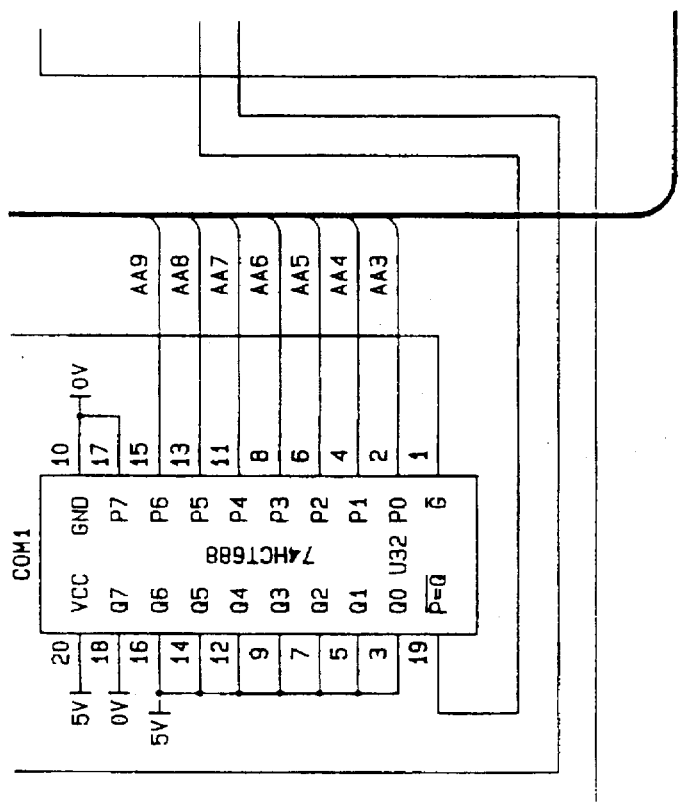
Figure 88:
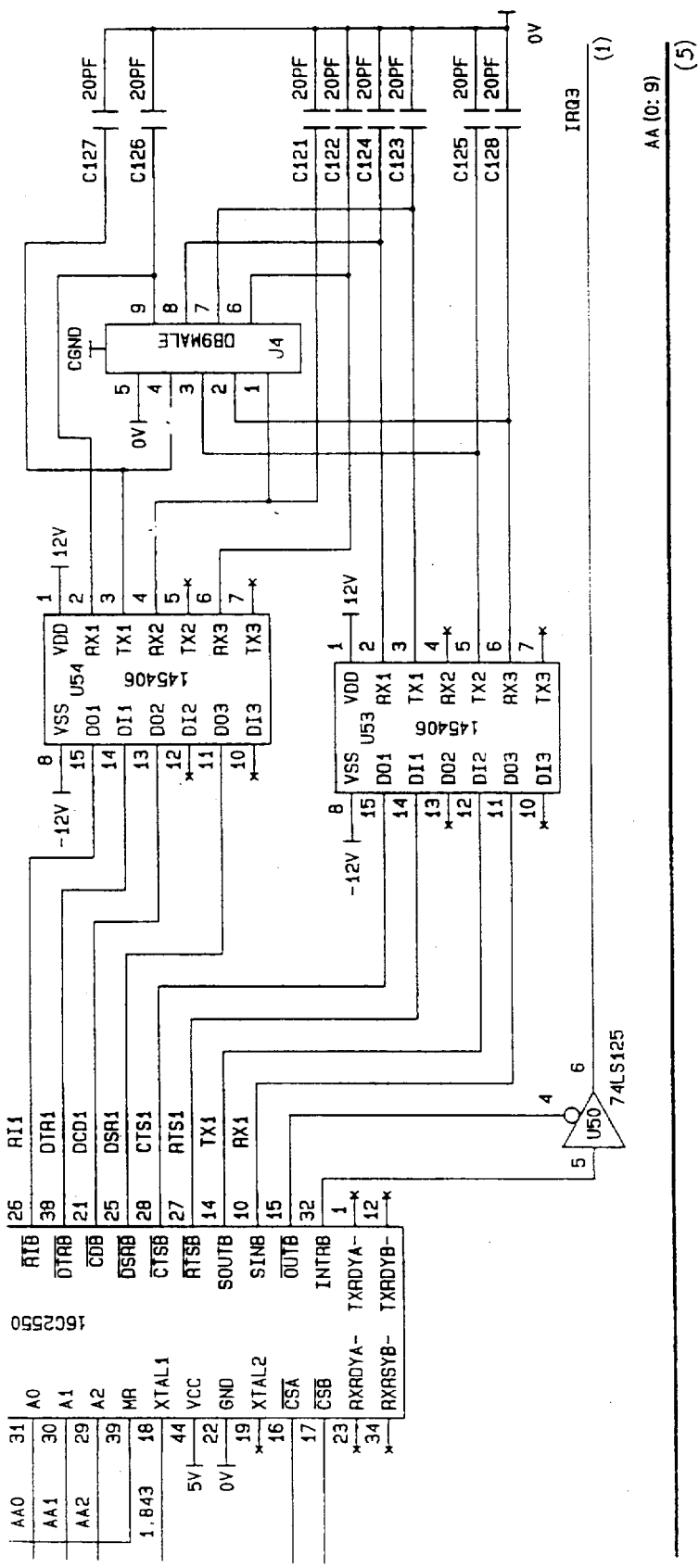
Figure 9:
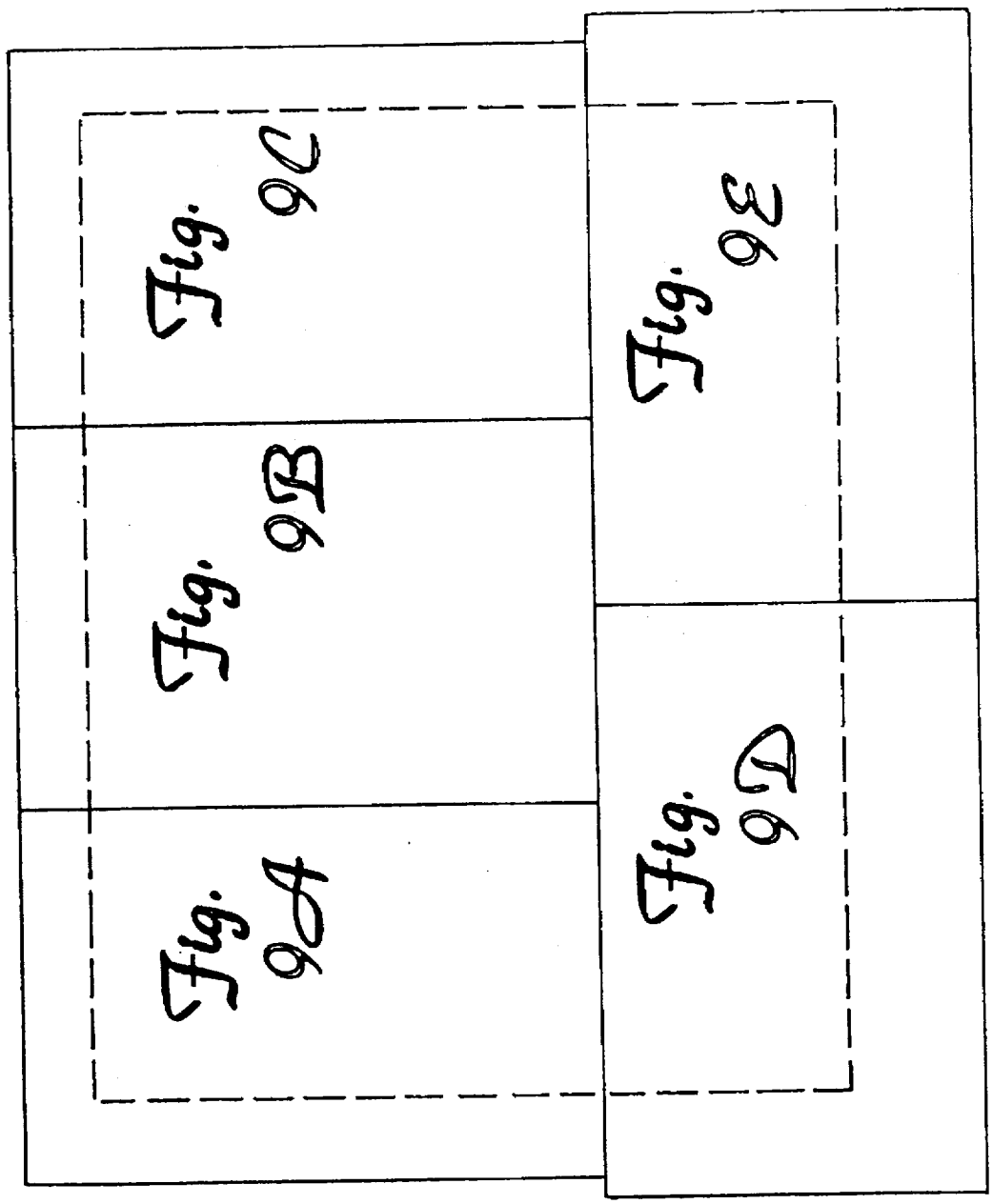
Figure 9A:
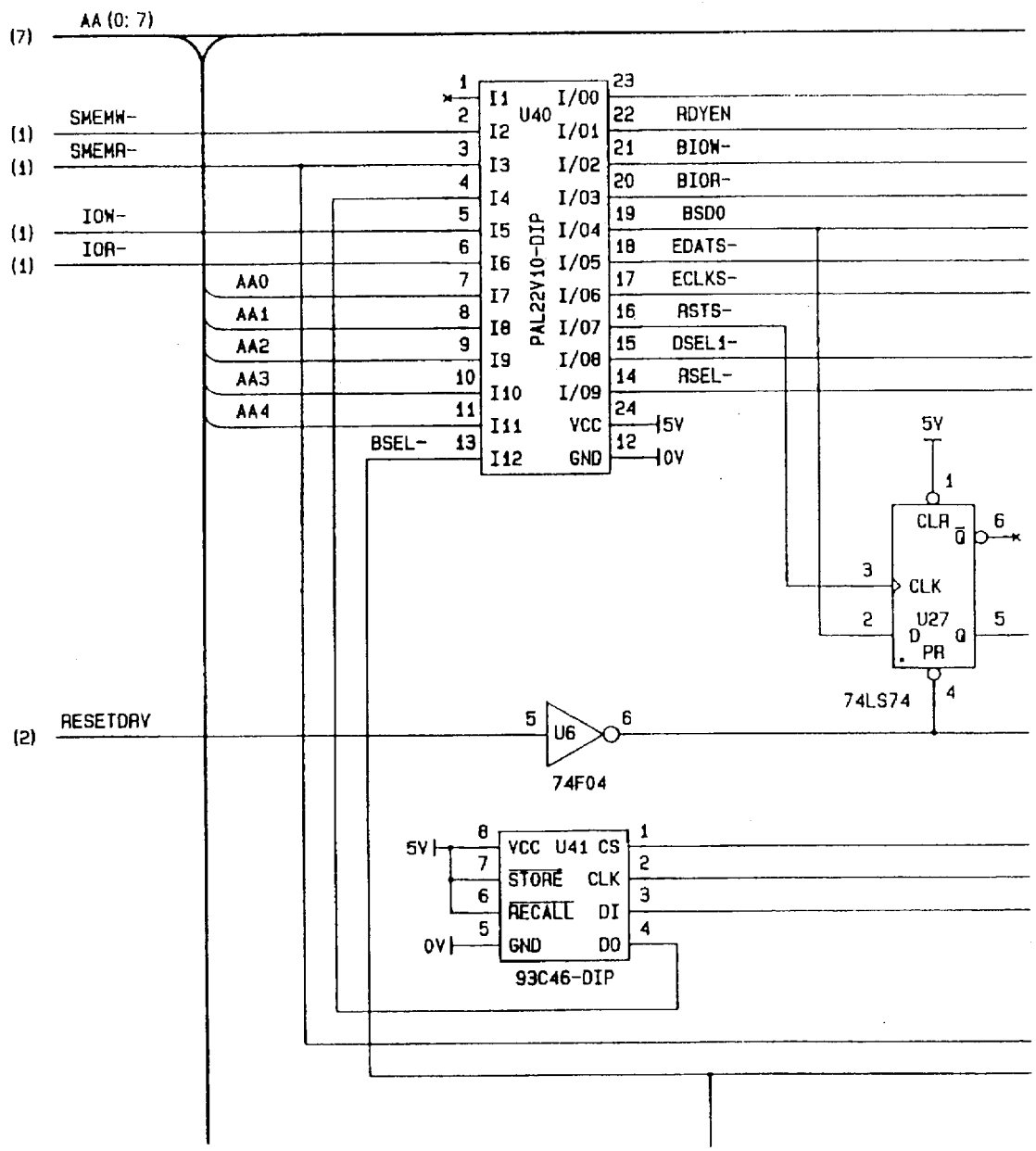
Figure 9B:
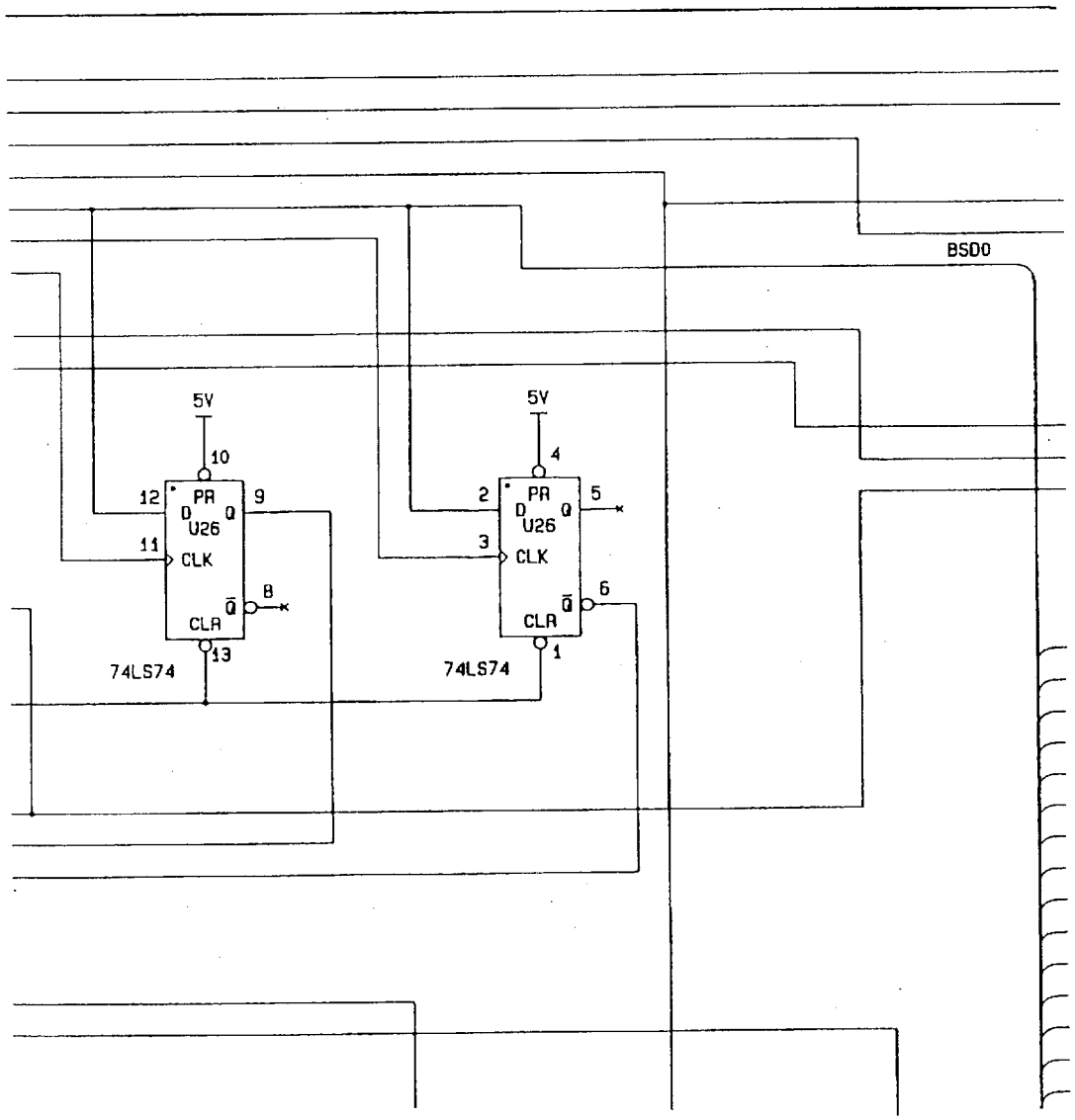
Figure 9C:
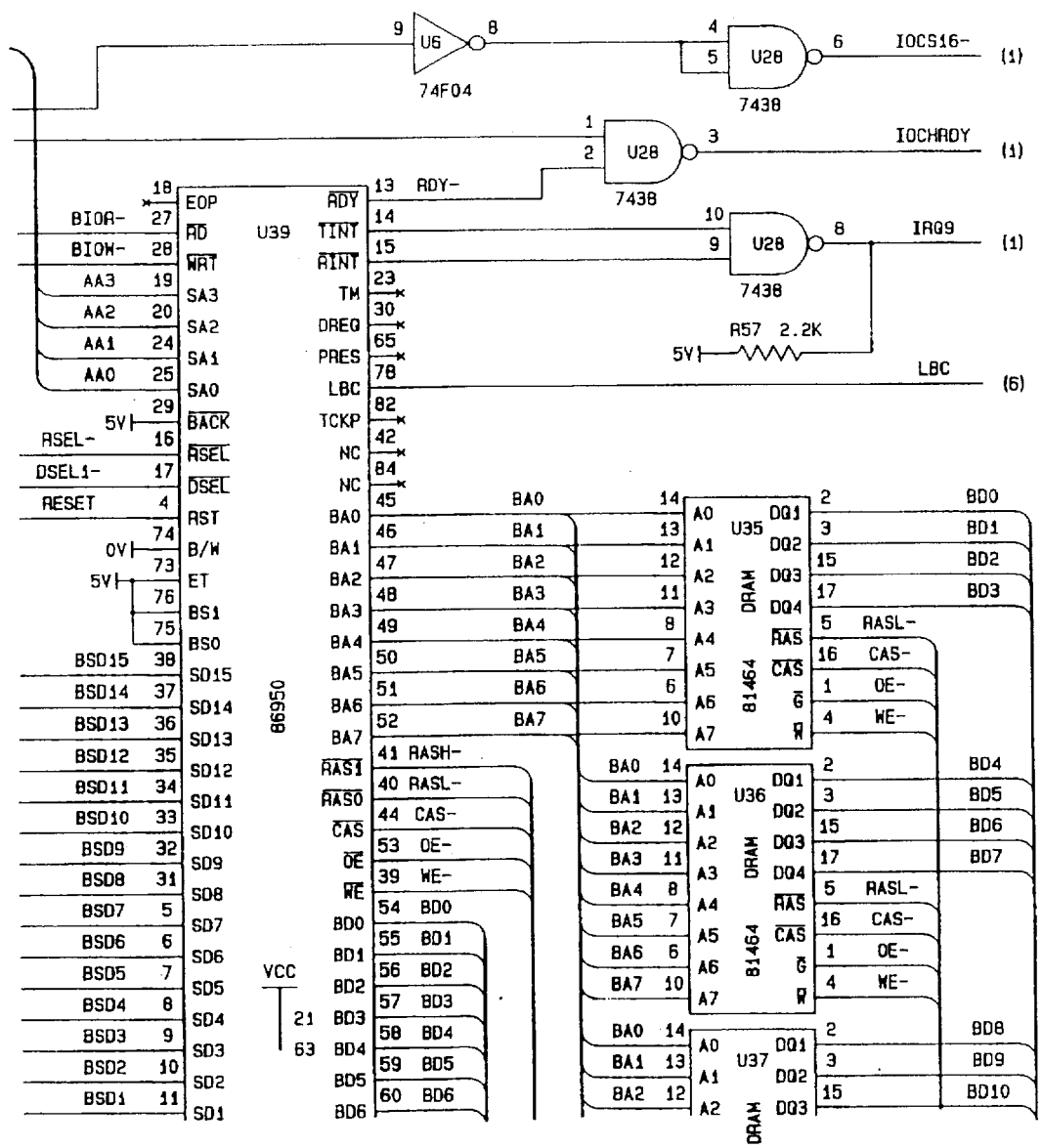
Figure 9D:
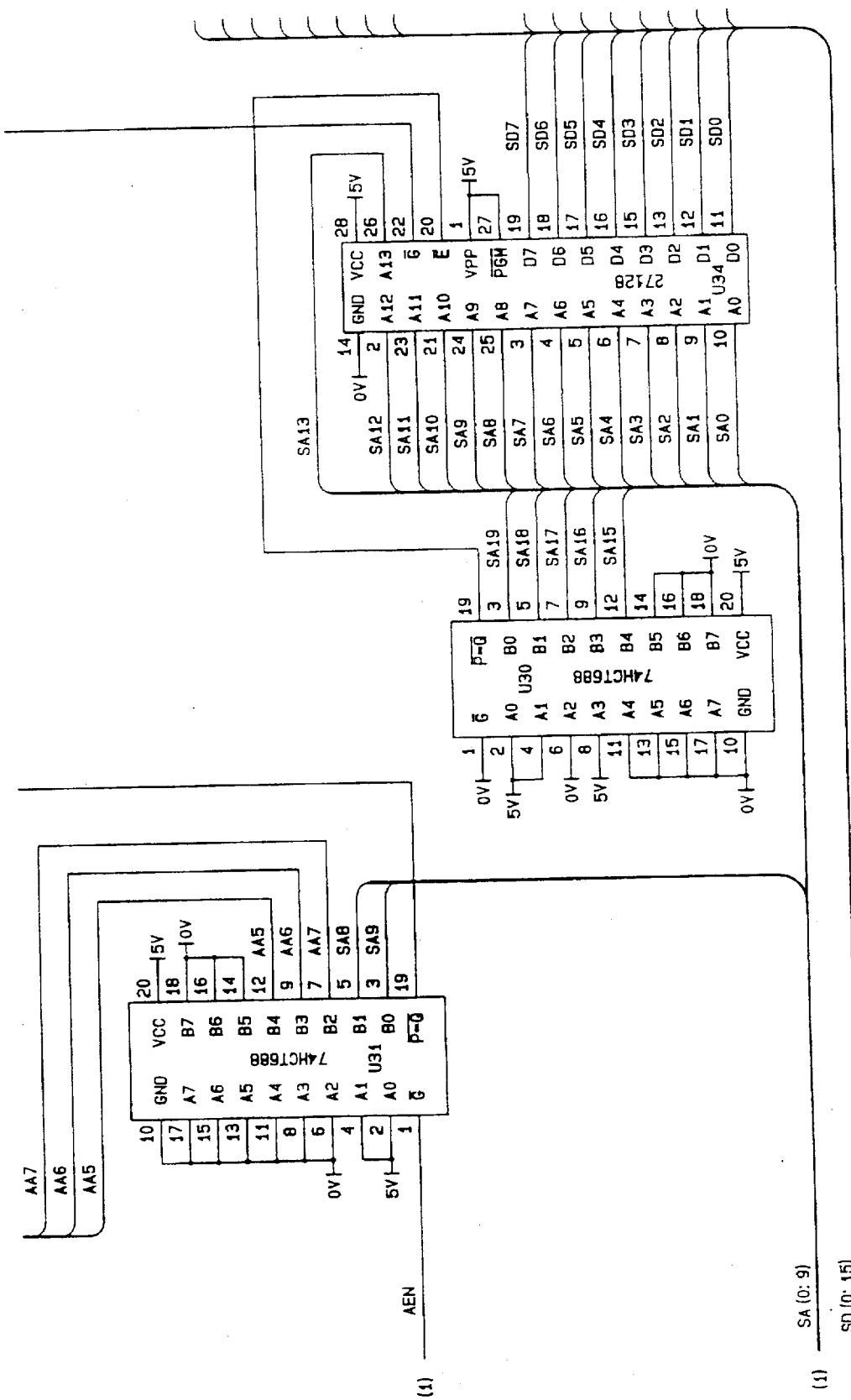
Figure 9E:
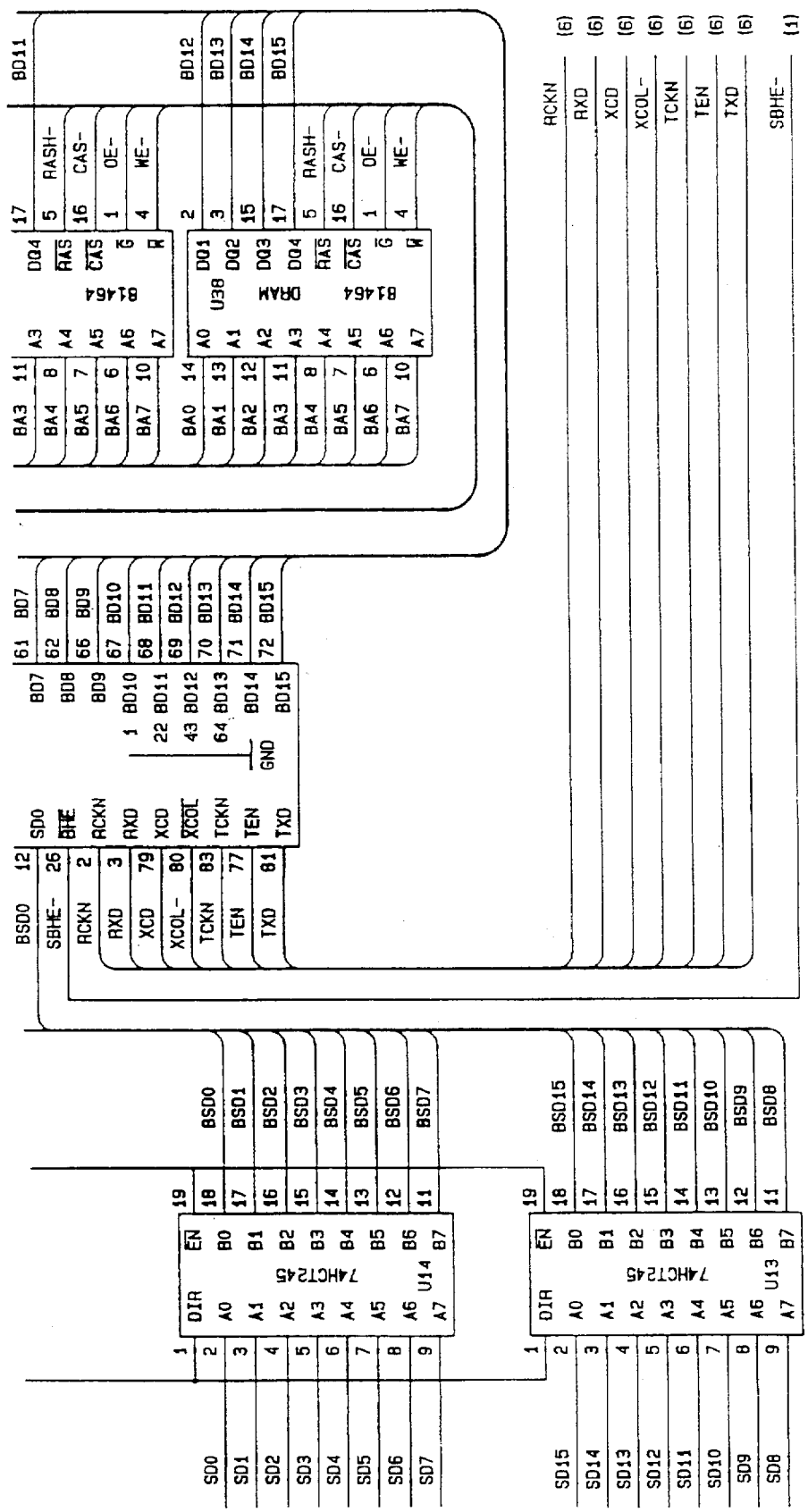
Figure 10A:
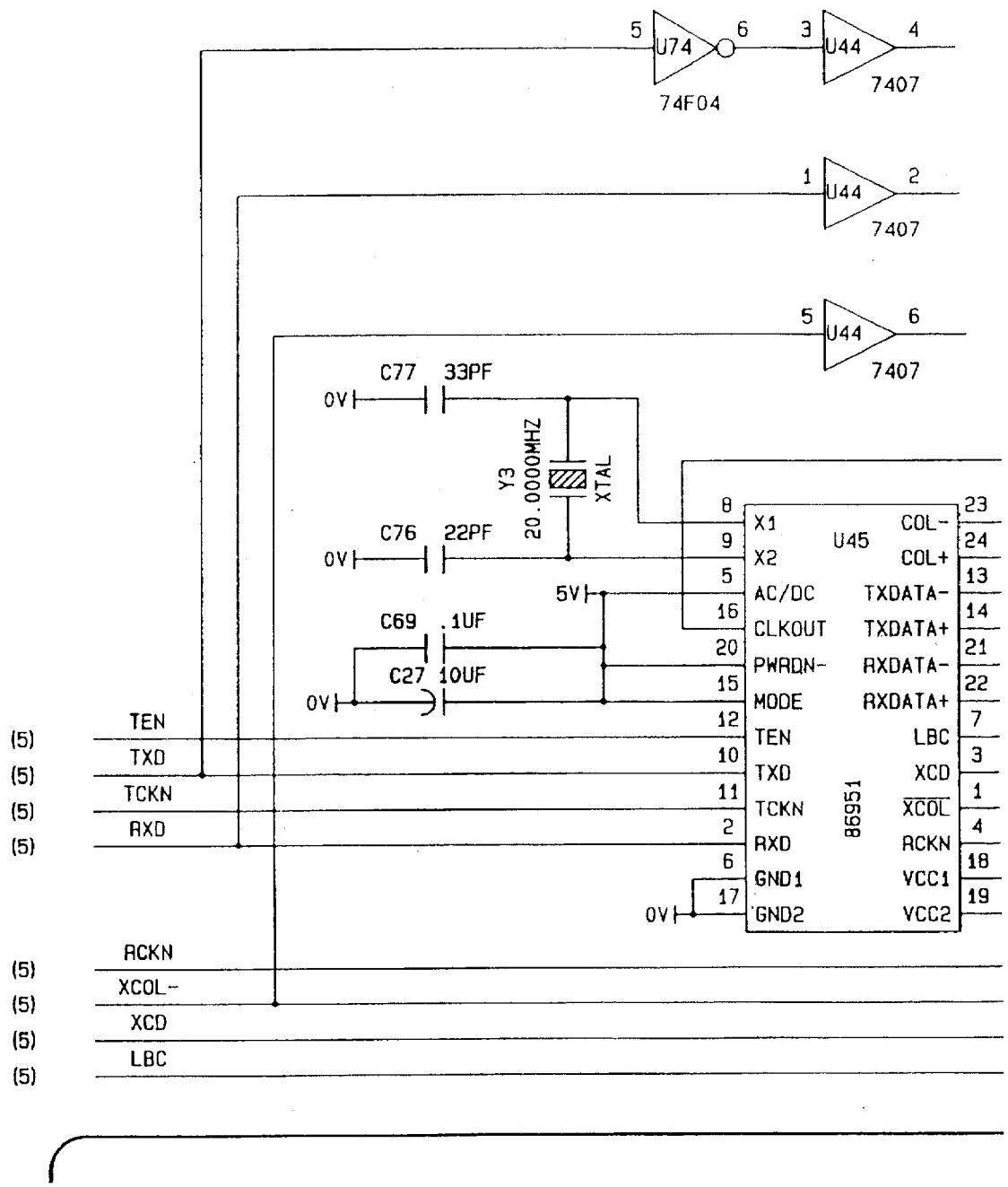
Figure 10C:
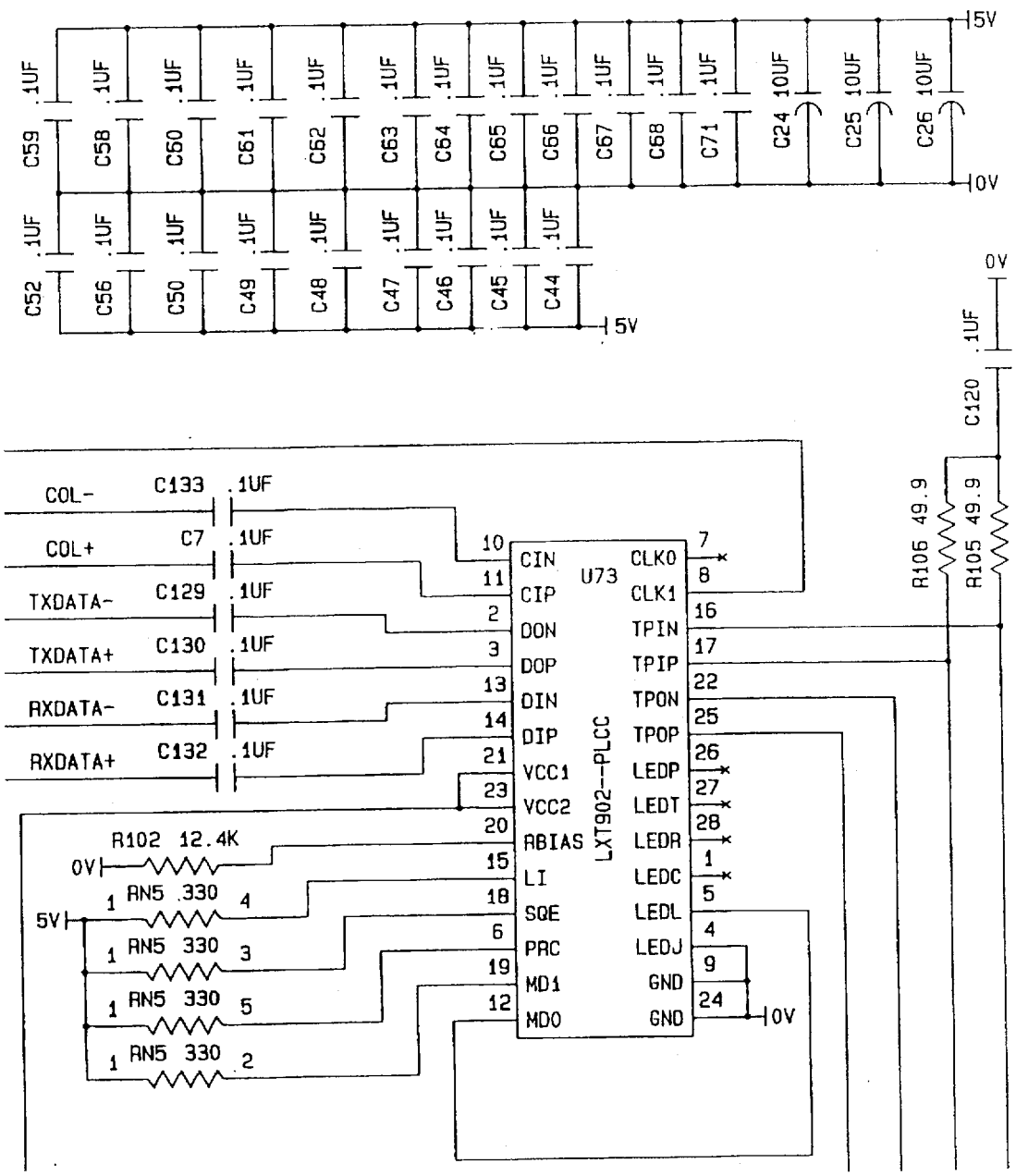
Figure 10D:
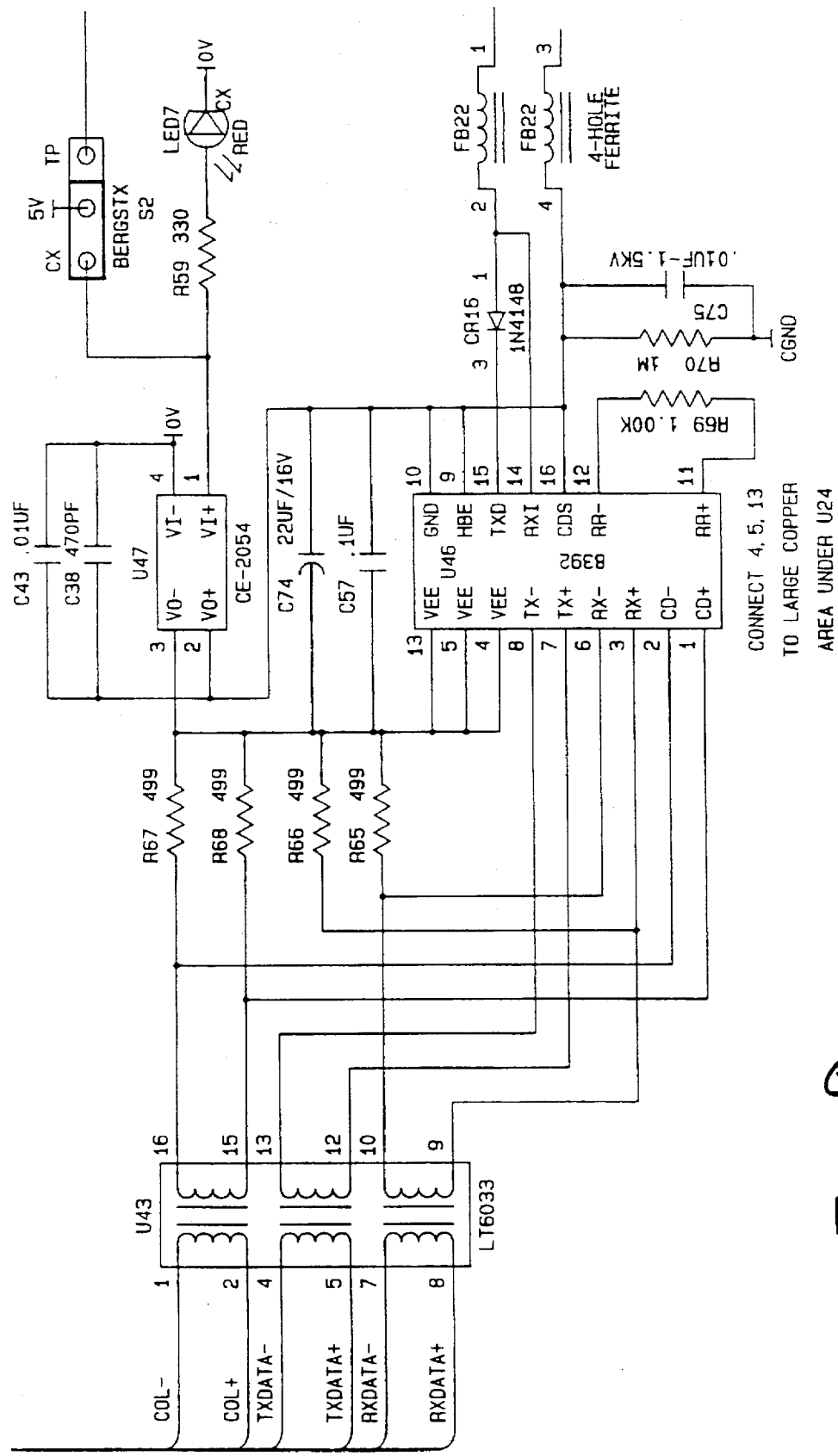
Figure 10E:
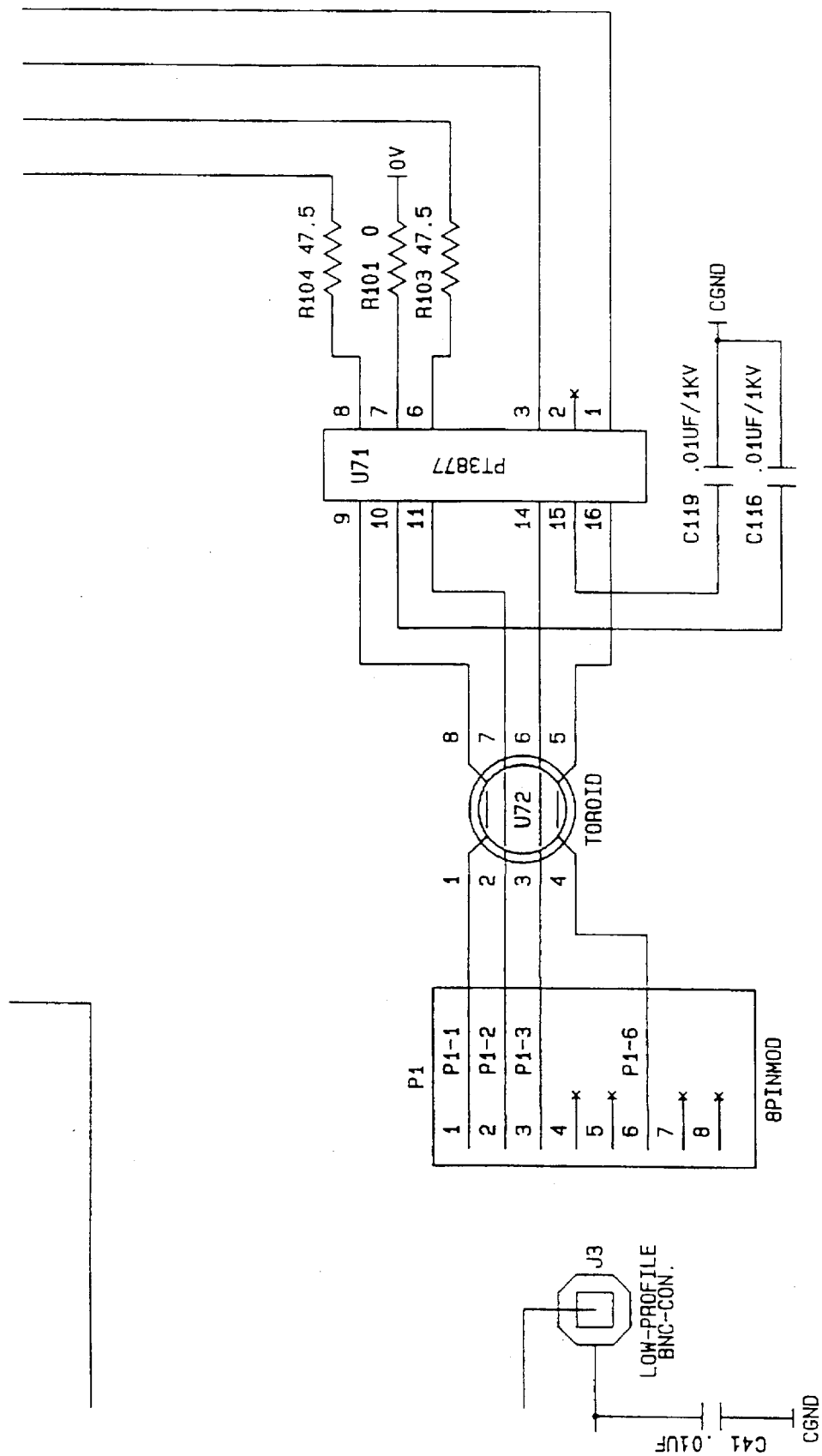
Figure 11:
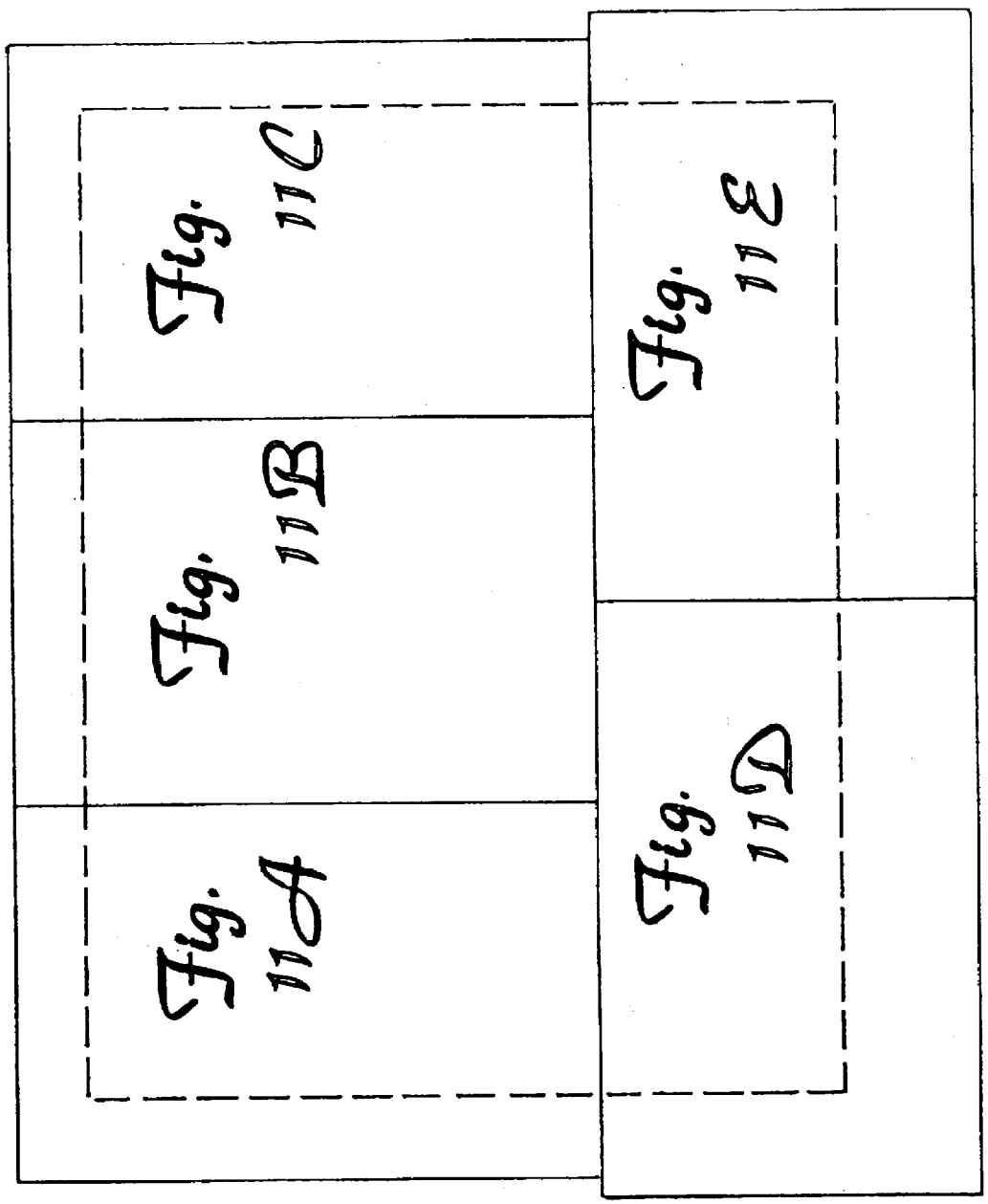
Figure 11A:
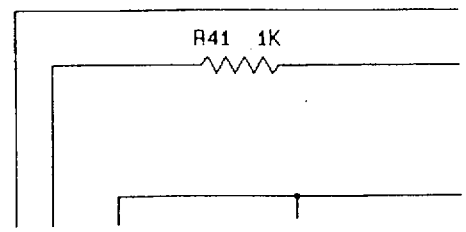
Figure 11B:
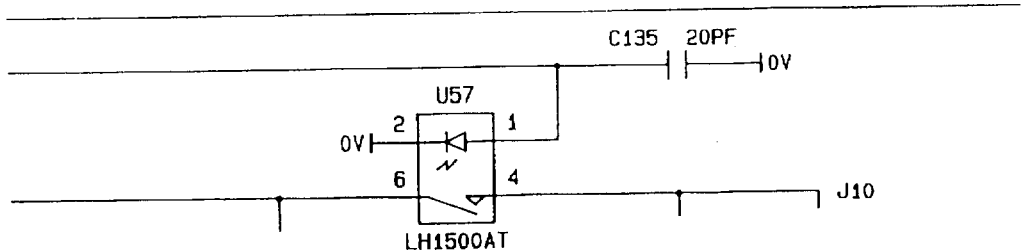
Figure 11C:
Figure 11D:
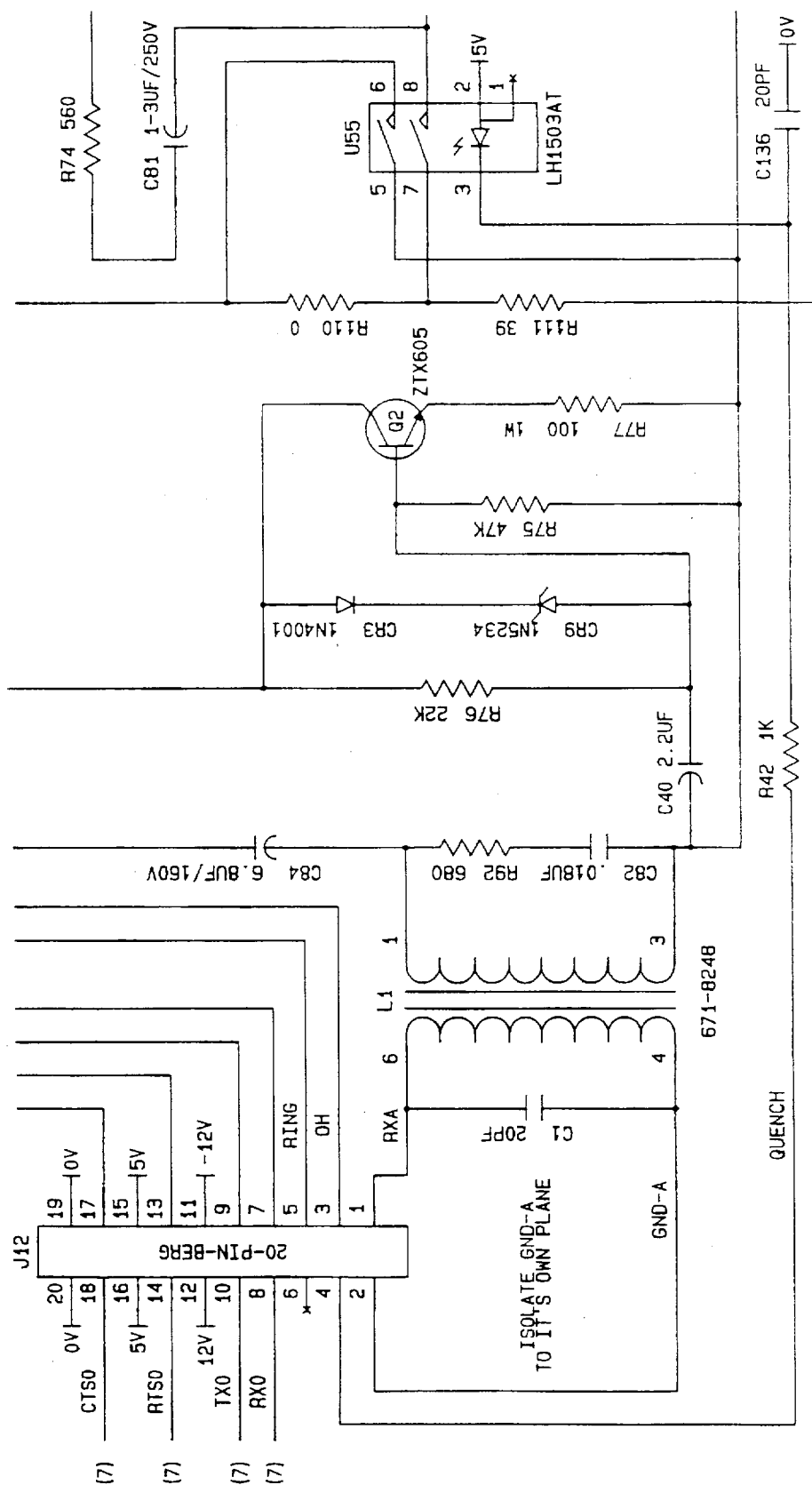
Figure 11E:
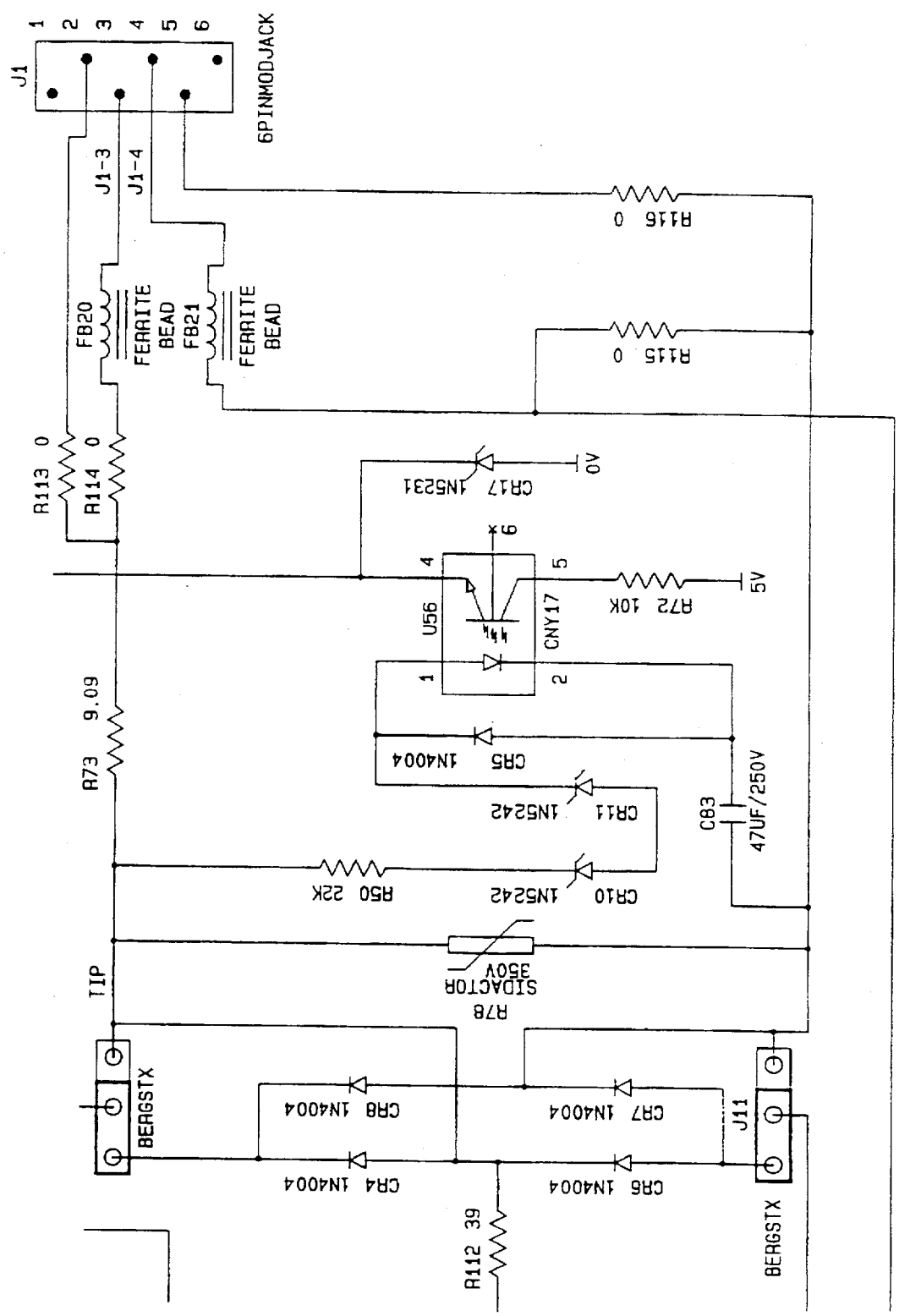
Figure 12A:
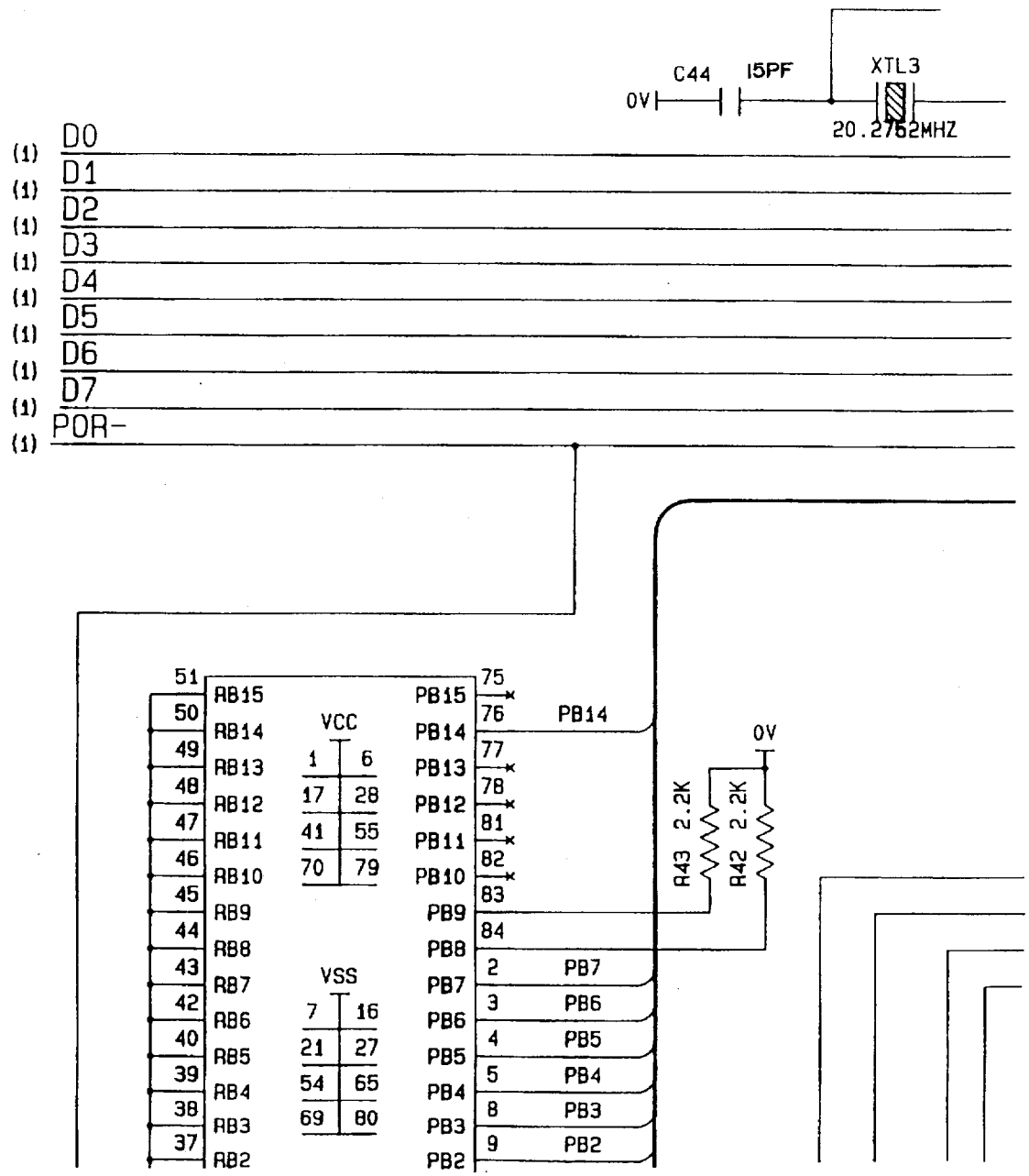
Figure 12B:
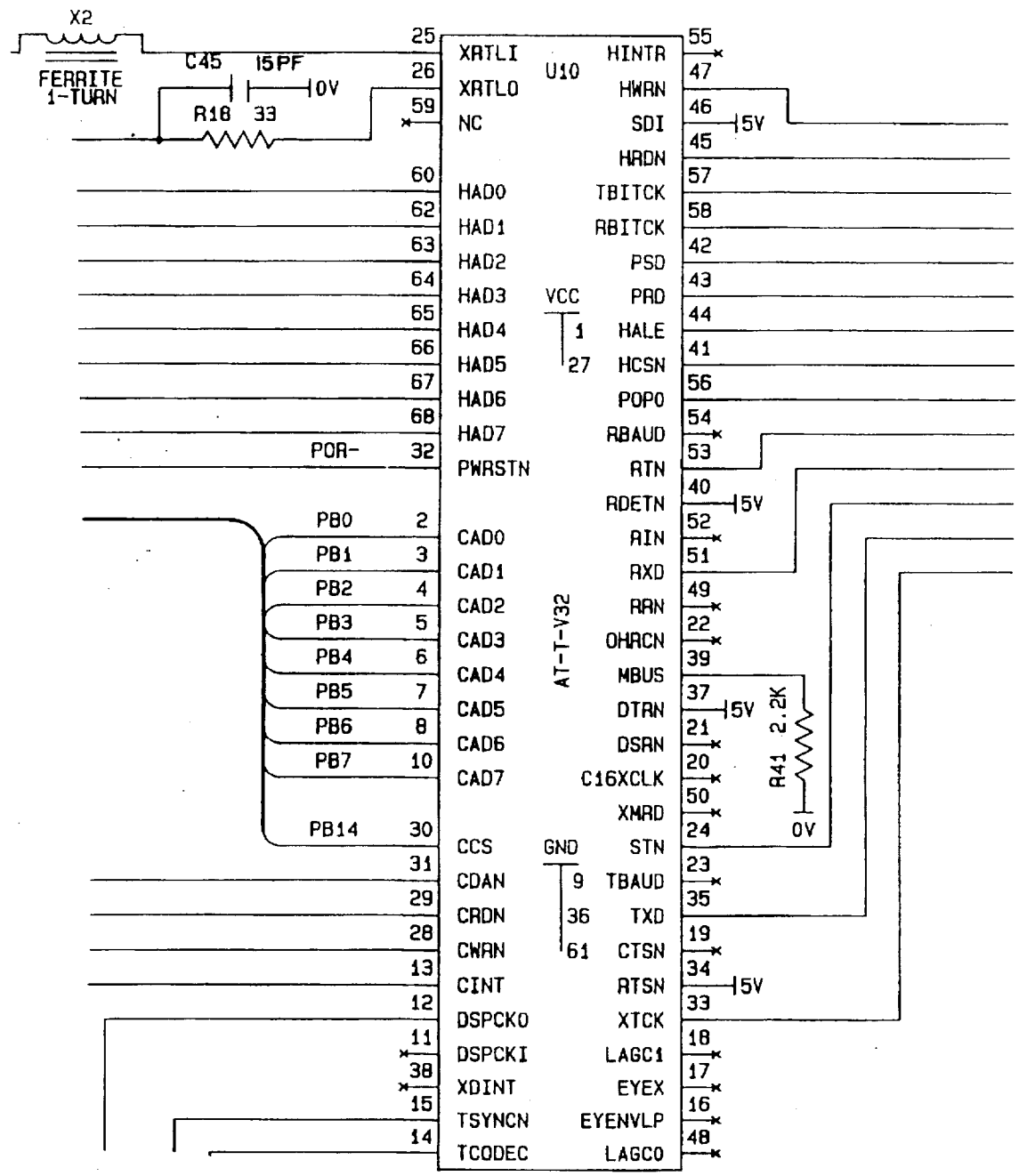
Figure 12D:
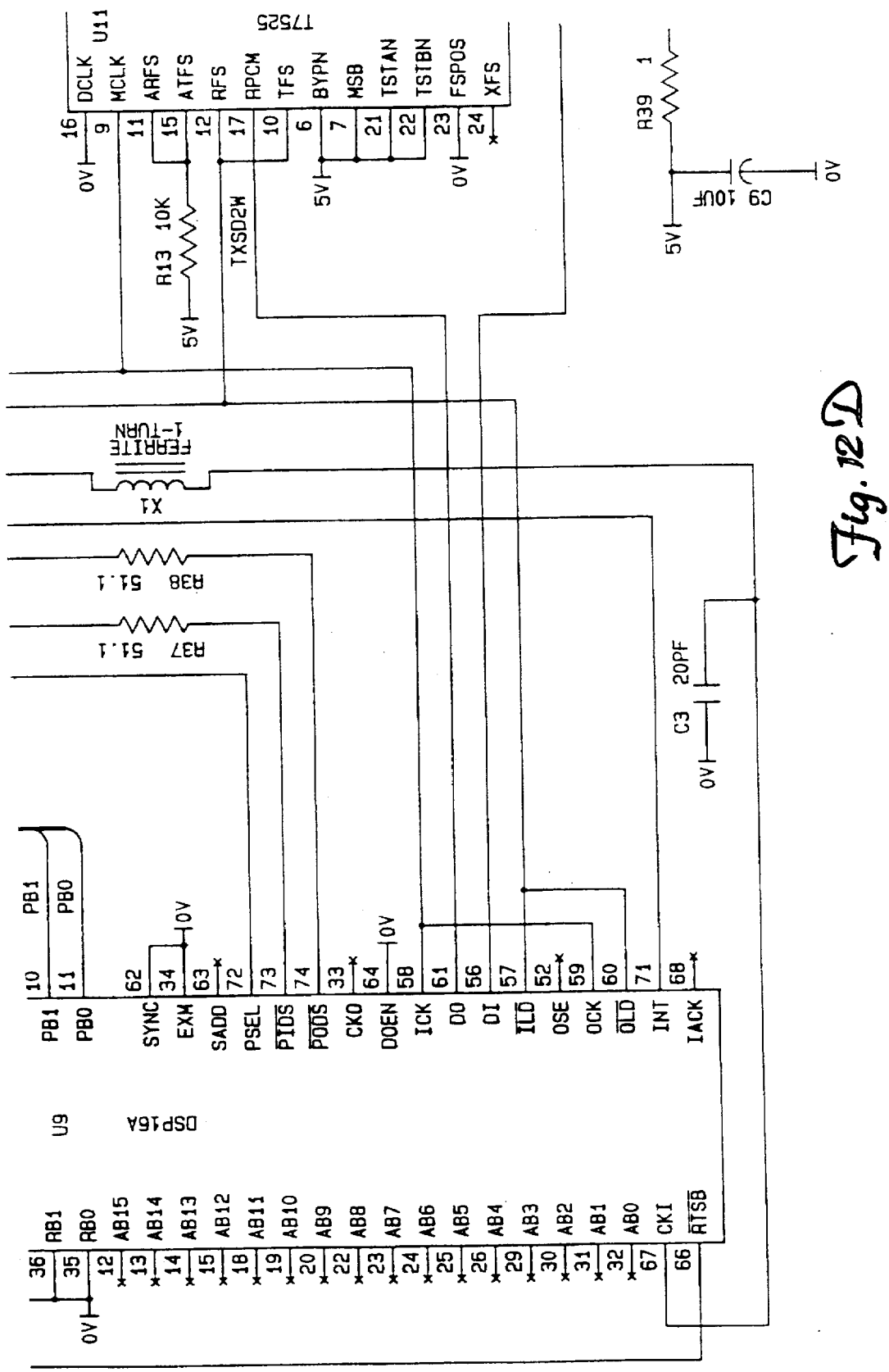
Figure 12E:
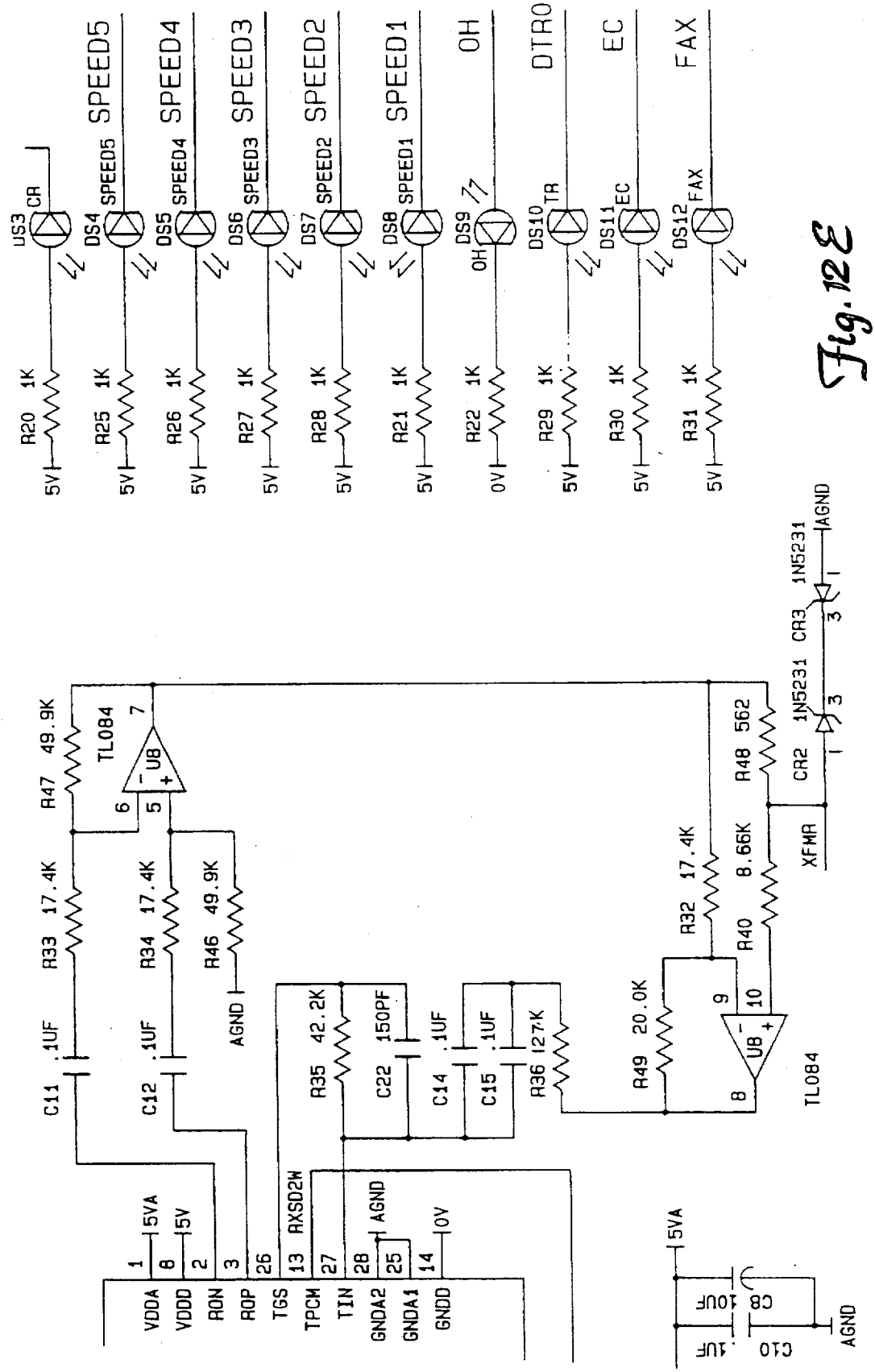
Figure 13A:
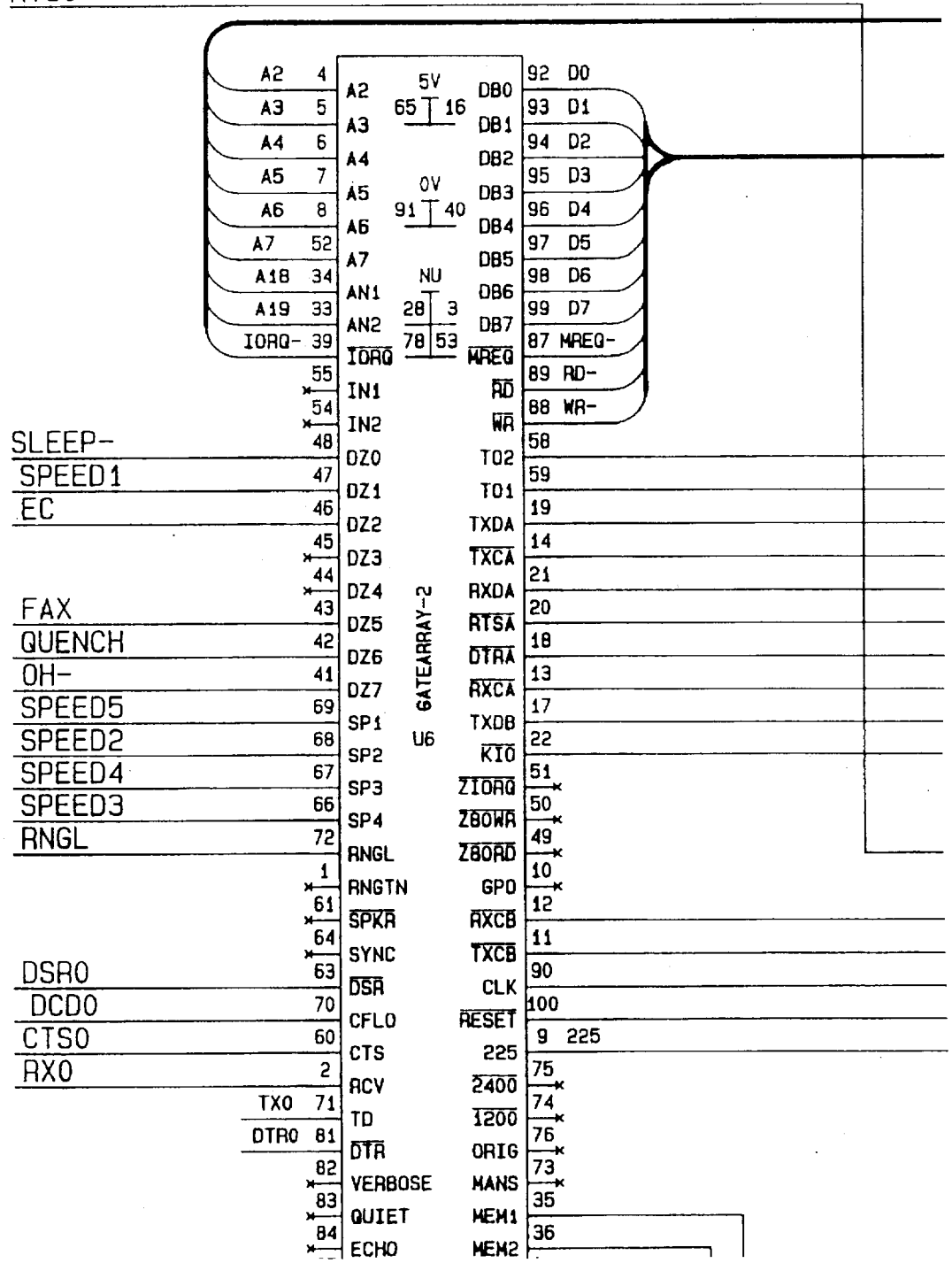
Figure 13B:
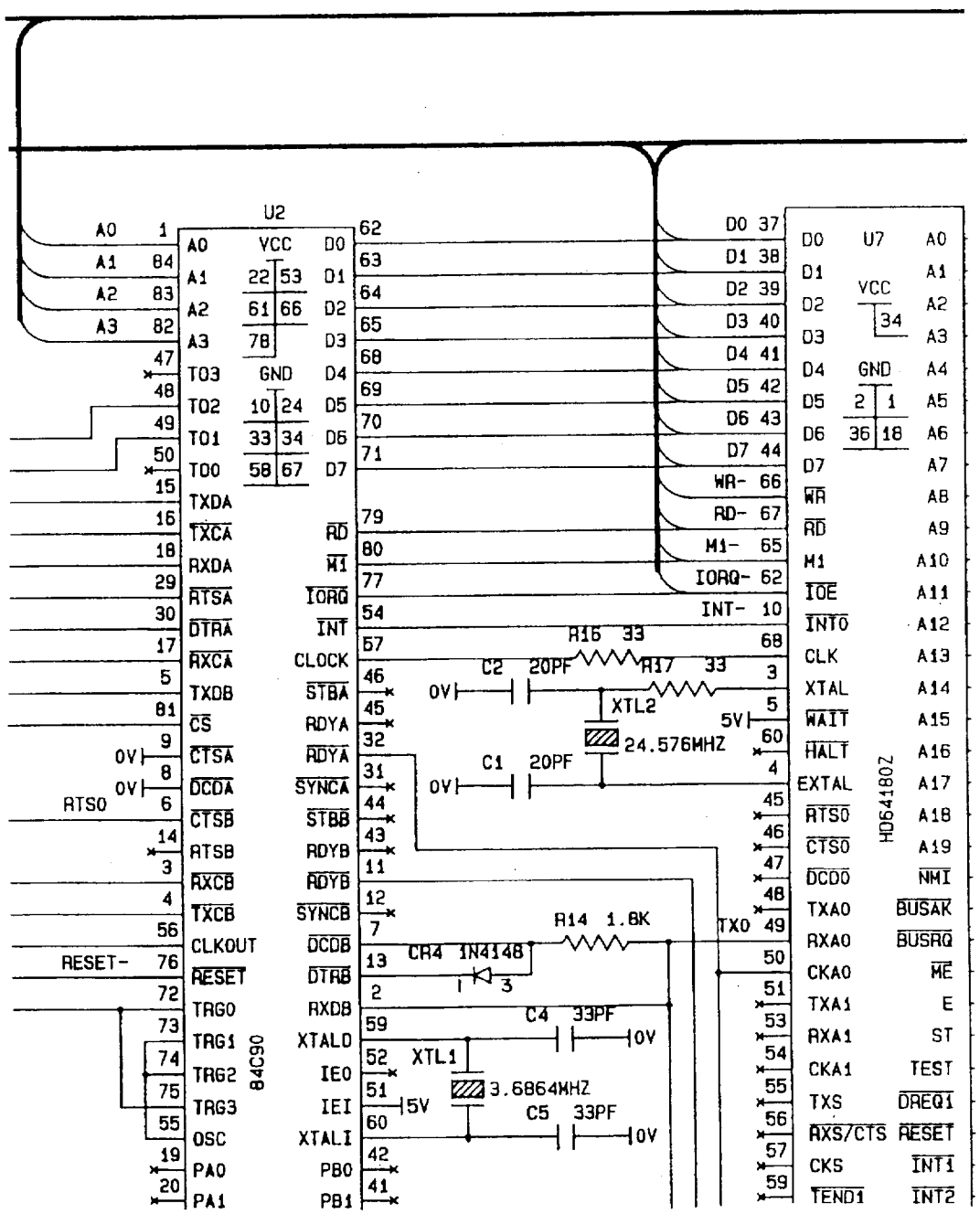
Figure 13C:
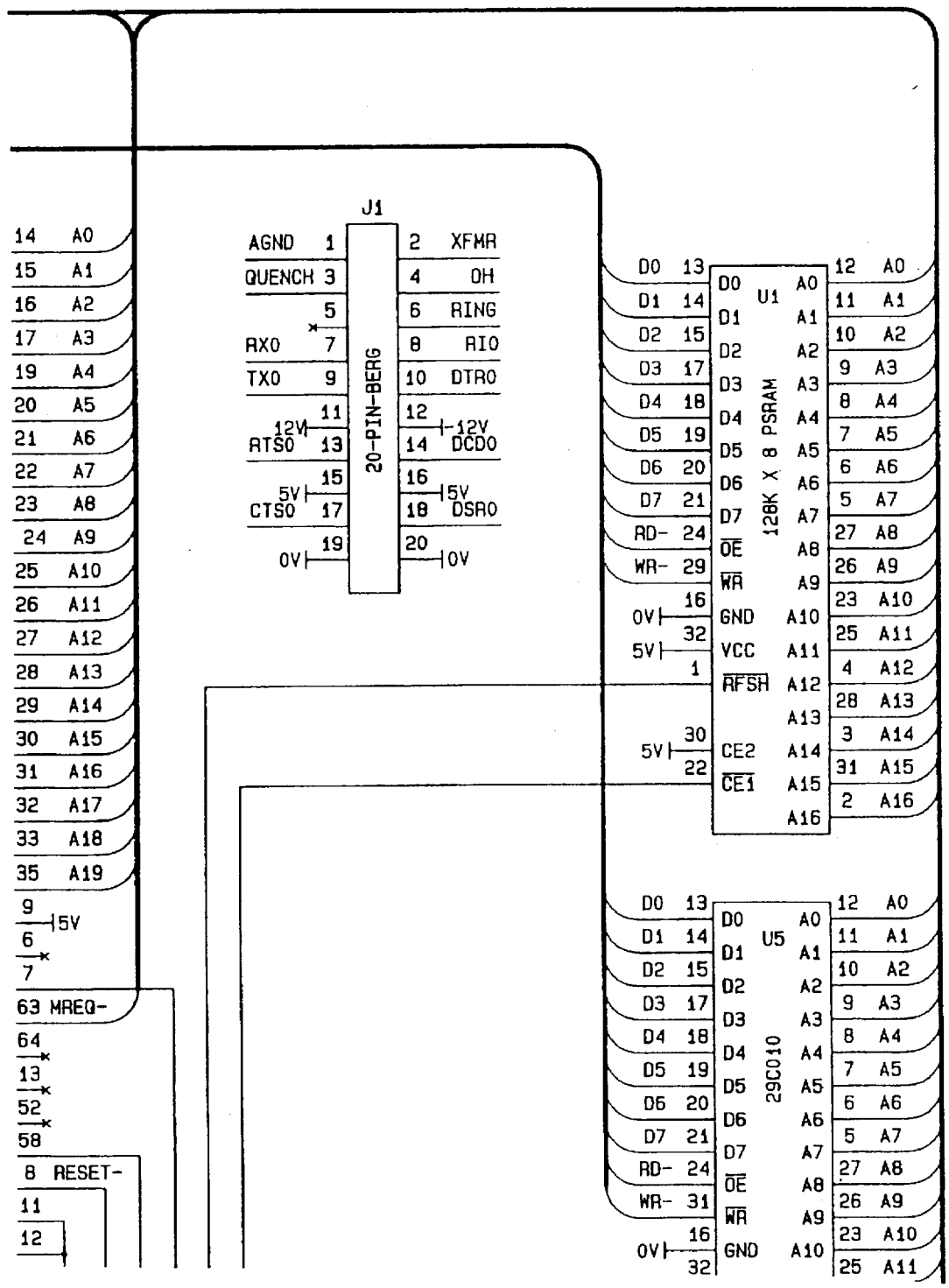
Figure 13D:
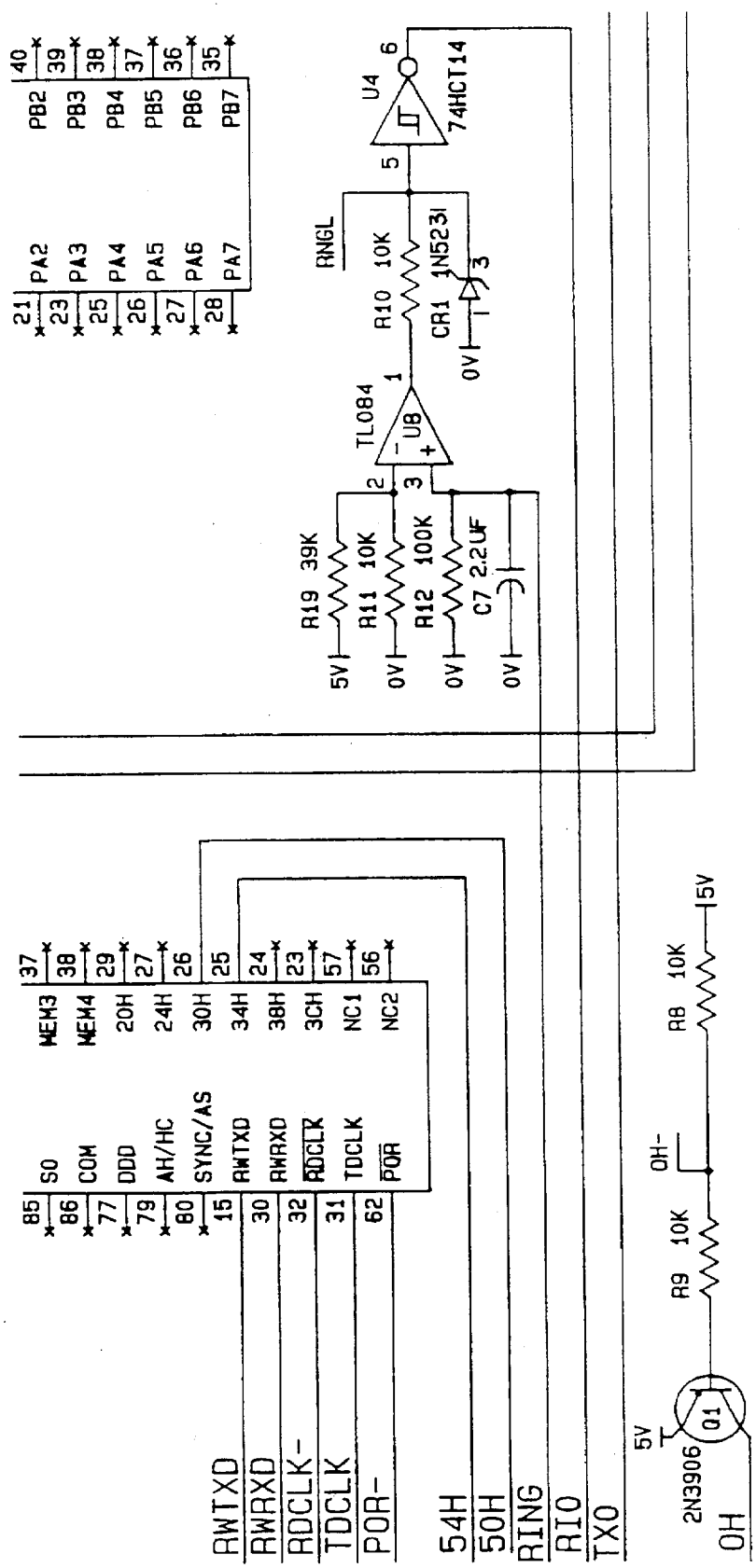
Figure 13E:
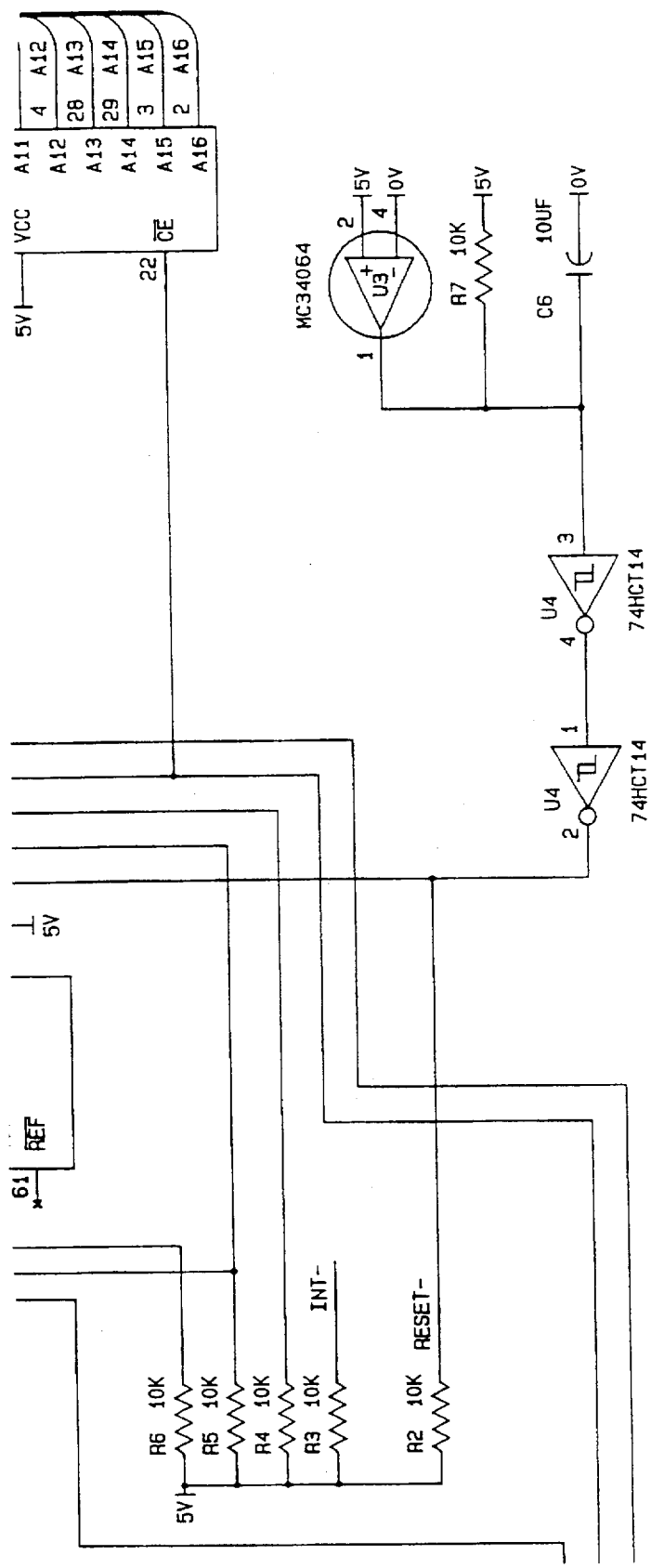

Detailed electrical schematic diagrams of the LAN modem node are shown in FIGS. 4–13. FIGS. 4–8 show main controller 200, FIGS. 9–10 show network interface circuitry 400 and FIGS. 11–13 show internal modem 300. The electrical connections between the electrical schematic diagrams are through the designators listed next to each wire. For example, electrical lines designated with symbols such as SCLK on the lower right-hand side of FIG. 4E may connect to other schematic diagrams using the same signal designator SCLK.

Referring now to FIGS. 4–8, detailed schematic diagrams of main controller 200 are shown. FIGS. 4A–4E shows the preferred controller circuitry including Intel 386SX microprocessor U62 and controller/bus interface U64, which in the preferred embodiment is an integrated chip available from Headland Technology, and described in the publication entitled "HT22 80386 SX/80286 Single Chip Data Sheet", dated September, 1991, which is incorporated herein by reference. Chip U64 integrates the majority of the main board logic required for a high performance PC AT-compatible computer based on an Intel 80386SX microprocessor. U64 performs all CPU and peripheral support functions in a single chip and requires minimal external support logic.

FIGS. 5A–5E shows DRAMs U2, U3, U4 and U5, keyboard controller U10 and system BIOS low level drivers U66, U65 and U9. FIGS. 6A–6E shows an AT standard bus compatible with the above described preferred PC chips. Bus drivers U11, U12, U18 and U19 and address latches U67 and U70 are shown. IBM-PC Edge Fingers and IBM-AT Edge Fingers are also included to provide expansion slots for additional cards if desired.

FIGS. 7A–7E shows the preferred video circuitry. VGA video controller U24 is preferably the 5320 CRT Enhanced VGA controller chip available from Cirrus Logic, which is described in detail in the Cirrus Logic publication entitled "CL-GD5320 Hardware Technical Reference Manual", 1990, which is incorporated herein by reference. This controller chip supports high resolution graphics and alphanumeric display modes for a variety of monochrome and color CRT monitors using an industry standard 16-pin analog interface connector J7.

FIGS. 8A–8E shows the two serial communication (COMM) ports and the associated interface circuitry connected according to well-known configuration. Also shown in FIG. 8A is connector J5 and associated filtering and power control circuitry through which power to the LAN modem node is obtained. External modem 500 connects through connector J4 which is a standard DB9 Cable. The EIA signals from external modem 500 go to chips U53 and U54 for filtering and application to the rest of the main controller 200.

Referring now to FIGS. 9–10, detailed schematic diagrams of network interface circuitry 400 are shown. FIGS. 9A–9E shows the Ethernet controller U39 and its associated support circuitry. Ethernet controller U39 is preferably part number MB86950, available from Fujitsu Microelectronics, Inc., and described in the Fujitsu publication entitled "MB86950 EtherStar™ Ethernet Controller Data Sheet", dated December 1989, which is incorporated herein by reference. U39 is a highly integrated, local area network controller that supports both IEEE 802.3 CSMA/CD 10 Mbps Ethernet and 1Mbps StarLAN protocols. It links the main controller bus to the LAN transceiver or drivers with a minimal amount of controlling software and host system-EtherStar interaction. The transfer of data to/from the main controller and to/from the LAN can occur simultaneously. Memory chips U35, U36, U37 and U38 operate in conjunction with Ethernet controller U39.

FIGS. 10A–10E show the circuitry through which the network interface circuitry connects directly to the network and to the external modem 500. The LAN comes into the network interface circuitry through connector J3 which is a standard low profile BNC connector. This network connection is physically isolated from the rest of the network interface circuit by transformers U43.

Referring now to FIGS. 11–13, detailed schematic diagrams of internal modem 300 are shown. A more detailed description of a modem such as the one described and shown in FIGS. 11–13 can be found in the copending and commonly assigned U.S. patent application entitled "COMPUTER-BASED MULTIFUNCTION PERSONAL COMMUNICATIONS SYSTEM", Ser. No. 08/002,467, filed Jan. 8, 1993, to Raghu Sharma et al., which is incorporated herein by reference.

FIGS. 11A–11E show the telephone interface circuitry of the internal modem 300. This circuitry can be customized to interface to the varying telephone standards used in the United States and in many different European countries. Connector J12 connects the telephone interface circuitry to the rest of the internal modem circuit shown in FIGS. 12 and 13.

Referring now to FIGS. 12A–12E, CODEC chip U11, interface chip U2, and digital signal processor (DSP) chip U9 comprise a data pump chip set manufactured and sold by AT&T Microelectronics. A detailed description of the operation of these three chips in direct connection and cooperation with one another is described in the publication entitled "AT&T V.32bis/V.32/FAX High-Speed Data Pump Chip Set Data Book" published by AT&T Microelectronics, December 1991, which is incorporated herein by reference. This AT&T data pump chip set comprises the core of an integrated, two-wire full duplex modem which is capable of operation over standard telephone lines or leased lines. The data pump chip set conforms to the telecommunications specifications in CCITT recommendations V.34, V.32bis, V.32, V.22bis, V.22, V.23, V.21 and is compatible with the Bell 212A and 103 modems. Speeds of 28,800, 14,400, 9600, 4800, 2400, 1200, 600 and 300 bits per second are supported.

Referring now to FIGS. 13A–13E, the modem controller U7 and associated circuitry is shown. Modem controller U7 is in the preferred implementation a Z80180 Z180 microprocessor, part number manufactured by Zilog, Inc. of Campbell, Calif. The detailed product description of the Z80180 Z180 MPU can be found in the Zilog 1991 "Intelligent Peripheral Controllers" databook, which is incorporated herein by reference.

The Z80180 microprocessor in microcontroller chip U7 is intimately connected to a serial/parallel I/O counter timer chip U2 which is, in the preferred embodiment, a Zilog 84C90 CMOS Z180 KIO serial/parallel/counter/timer integrated circuit available from Zilog, Inc. This multi-function I/O chip U2 combines the functions of a parallel input/output port, a serial input/output port, bus control circuitry, and a clock timer circuit in one chip. The Zilog Z84C90 product specification describes the detailed internal operations of this circuit in the above discussed Zilog 1991 "Intelligent Peripheral Controllers" databook available from Zilog, Inc., at pages 205–224.

The data and address buses shown in FIGS. 13A–13E connect the Z80180 microprocessor in microcontroller U7 with the Z180 KIO circuit U2 and a gate array circuit U6, and to other portions of the electrical schematic diagrams. Gate array U6 includes the "glue logic" used to support various functions in the hardware components of the LAN modem node. A detailed description of gate array U6 can be found in the aforementioned U.S. patent application "COMPUTER-BASED MULTIFUNCTION PERSONAL COMMUNICATIONS SYSTEM".

The memory chips which operate in conjunction with the Z180 microprocessor in a microcontroller chip U7 are also shown in FIGS. 13A–13E. Memory chip U5 is a read-only memory (ROM) chip which is electrically alterable in circuit. This programmable ROM, typically referred to as a flash PROM, holds the operating code and operating parameters for the internal modem in a non-volatile memory. Upon power-up, to microcontroller chip U7 executes the operating code stored in the flash PROM U5. PSRAM chip U1 is a pseudostatic RAM which is a dynamic RAM with a built-in refresh. Those skilled in the art will readily recognize that a wide variety of memory chips may be used and substituted for pseudo-static RAM U1 and flash PROM U5 without departing from the scope of the present invention.

FUNCTIONAL DESCRIPTION OF THE SOFTWARE COMPONENTS OF A PROTOCOL DEPENDENT LAN MODEM NODE

FIGS. 14A–14C are diagrammatic representations of the location of the relevant software modules of a protocol dependent embodiment of the LAN modem node. FIG. 14A shows the software modules of the LAN modem node, FIG. 14B shows the software modules of a network PC and FIG. 14C shows the software modules of a remote PC.

The modules located on LAN modem node as shown in FIG. 14A include at the lowest level the IPX/SPX protocol software necessary to create the IPX packets for communication over the LAN as described above. Although the embodiment described and shown herein is with respect to the IPX network protocol, it shall be understood that other network protocols could be substituted for the specific embodiment described without departing from the spirit and scope of the present invention.

LAN modem node 100 includes at the next level three control software modules responsible for controlling communication with the LAN modem node. The async server software module runs on the LAN modem node and allows network PCs to share the LAN modem node as a gateway to external devices such as mainframes, minicomputers, printers and public data networks such as are shown in FIG. 1. A remote control software module also runs on the LAN modem node and controls remote PC communication with the LAN modem node for access to network resources such as word processing, electronic mail, compilers or other network applications.

On the same level as the async server and remote control software is inter-module control software which enables the async server and remote control software modules to coexist peacefully within the main controller 200. Inter-module control software is a coordination interface between the async server and remote control software modules allowing them to share the LAN modem node resources e.g., the connections to the internal and external modems and to the network. Finally, at the highest software level of the LAN modem node resides the application software programs, such as word processing, electronic mail, compilers, etc.

Referring now to FIG. 14B, the software modules of a network PC are shown. At the lowest level resides the network PC side of the IPX/SPX network communications protocol. At the next level is an async communications software module which allows the network PC to communicate with the async server software module located in the LAN modem node using the special LAN modem node packet protocol described below. At the highest software level in a network PC is a network communications application, such as PROCOMM® PLUS Network Version, available from DataStorm Technologies, Inc., which allows a network PC to communicate with other network PCs or other devices on the LAN.

Referring now to FIG. 14C, the software modules of a remote PC are shown. Each remote PC includes a remote control software module which, in conjunction with the remote control software module located in the LAN modem node, allows a remote PC to use the LAN modem node to access network resources. The preferred remote control software executed and stored in LAN modem node and in each remote PC is the MultiExpress II communications software package available from Multi-Tech Systems, Inc., the assignee of the present invention. A detailed description of this communications software package is given in the 1993 Multi-Tech Systems, Inc. publication entitled "Multi-Express II Software Manual", which is incorporated herein by reference. Remote control software allows a remote PC to call into the network via the LAN modem node, thus giving the remote PC has access to network applications. When a remote control session between a remote PC and a LAN modem node is established, the applications residing in the network are run on the LAN modem node and controlled by the user from the remote PC.

DETAILED DESCRIPTION OF THE COMMUNICATION PROTOCOL BETWEEN THE ASYNC SERVER SOFTWARE MODULE AND NETWORK PCS

A detailed description of the packet protocol and control flow for communication between network PCs and the async server software module located in the main controller of the LAN modem node (hereinafter referenced to as the "async server") will now be given. FIGS. 15A-15J show detailed flow diagrams of this communication protocol between the network PCs and the async server.

Figure 15A:
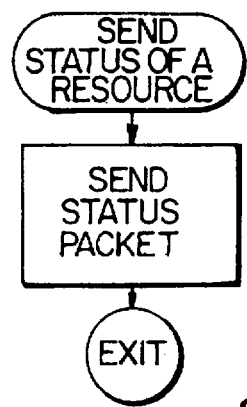
FIG. 15A–15J show diagrams of the communication protocol between a network PC and the local area network modem node.

FIG. 15A shows the protocol by which the async server communicates the status of the async server resources (e.g. the external devices connected to the LAN modem node) to the network PCs. The async server sends a STATUS packet when, for example, a status change for a particular async server resource. For example, if a particular resource was busy and then goes free, the async server will send an updated STATUS packet for that resource to inform the network PCs that the resource is now available. The STATUS packet is formatted as follows:

Packet Name: STATUS PACKET
Direction: From async server to network PCs
Description: Gives information about the resources available at the server.
The fields in the packet are:

| Off-set | Field Name | Type | Description |
| --- | --- | --- | --- |
| 0 | Resource Status | BYTE | Status of the resources (FREE, BUSY etc.) |
| 1 | Resource Class | BYTE | Class of resource generic serial device printer/plotter |
| 2 | Access Rights | BYTE | Whether user is allowed to use resource |
| 3 | General Name | BYTE[9] | General network name of the resource |
| 12 | Specific Name | BYTE[15] | Specific network name of the resource |
| 27 | Resource Owner | BYTE[17] | Current owner of the resource |
| 44-49 | Parameters | BYTE[5] | Current operating parameters of the resource |

The Resource Status field of the STATUS packet is a one byte field which indicates the status of the resource, e.g. FREE, BUSY, etc. Resource class field is also one byte in the length which gives the class of the resource, such as a serial printer, serial plotter, etc. The one byte access rights field indicates whether a particular user on a network PC is permitted access to the resource. General and specific name fields are 9 and 15 byte fields respectively, which indicate the general and specific network name of the resource. The general name may be used for example, to refer to a group of LAN modem nodes on the network. For example, if many LAN modem nodes are present on a particular LAN, a group of them may be referred together by the same general, or group, name. The specific name refers to a particular LAN modem node within the group. The 17 byte resource owner field contains the name of the current owner of the resource, if any. Finally, the current operating parameters, such as the baud rate, data bit, parity, etc., are contained in the 5 byte parameters field. Sending the status packet completes the STATUS PACKET control flow shown in FIG. 15A.

Figure 15B:
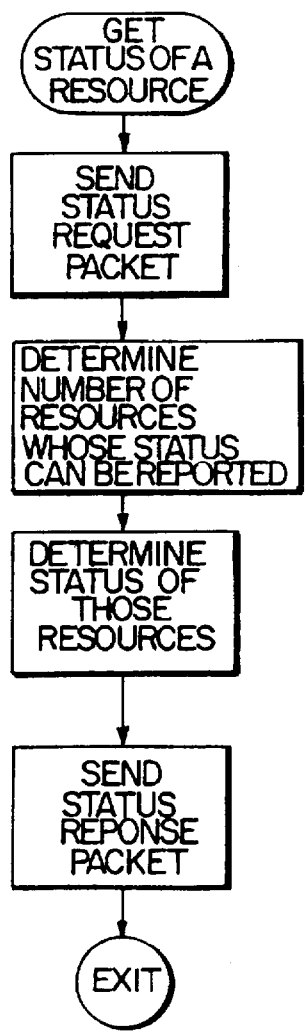

FIG. 15B shows the control flow which allows a network PC to poll the async server for the status of the async server resources. While the STATUS packet and associated protocol described above with respect to FIG. 15A is a status report sent out independently by the async server and contains status information for only one resource, the communication protocol shown in FIG. 15B allows a network PC to request and obtain a status report on all async server resources. To do so, the network PC sends a STATUS REQUEST packet as shown in FIG. 15B.

The format of the STATUS REQUEST packet is shown below:

Packet Name: STATUS REQUEST PACKET

Direction: From network PCs to async server

Description: This is a request to the server to send the status of all its resources The fields in the packet are:

| Offset | Field Name | Type | Description |
| --- | --- | --- | --- |
| 0 | Packet Type | BYTE | Identifies the packet |
| 1 | User Name | BYTE[17] | Name of the user |

The STATUS REQUEST packet includes a one byte packet type field and a 17 byte user name field.

Once the STATUS REQUEST packet is received by the async server, the async server responds with a STATUS RESPONSE packet, whose format is shown below:

Packet Name: STATUS RESPONSE PACKET

Direction: From async server to network PCs

Description: This contains the response dispatched by the async server for status requests from network PCs The fields of the packet are:

| Offset | Field Name | Type | Description |
| --- | --- | --- | --- |
| 0 | Packet type | BYTE | Identifies the packet |
| 1 | #resources | BYTE | Total number of resources available at the server |
| 2 | Count | BYTE | Number of resources whose status is being returned in this packet |
| 3–53 | Status 1 | BYTE[50] | Status of the first resource |
| 51 | Status 2 | BYTE[50] | Status of the second resource. See the STATUS packet for the definition of the status fields |

The STATUS RESPONSE packet includes a one byte packet type field, and a one byte # resources field which gives the total number of resources available at the async server. A one byte count field indicates the number of status reports which will be reported in the STATUS RESPONSE packet. Under normal circumstances, the value of the # resources field and the count field should be identical, meaning that the STATUS RESPONSE packet contains a status report on all of the async server resources. However, in certain situations the async server may not be able to report on a certain resource, such as if the connection between the resource and the async server is down. In that case, the value of the count field would be lower than the value of the # resources field.

STATUS RESPONSE packet also contains the actual status fields, each corresponding to the status of an async server resource. Each status field is 50 bytes in length and is identical in format to the STATUS packet format described above.

Figure 15C:
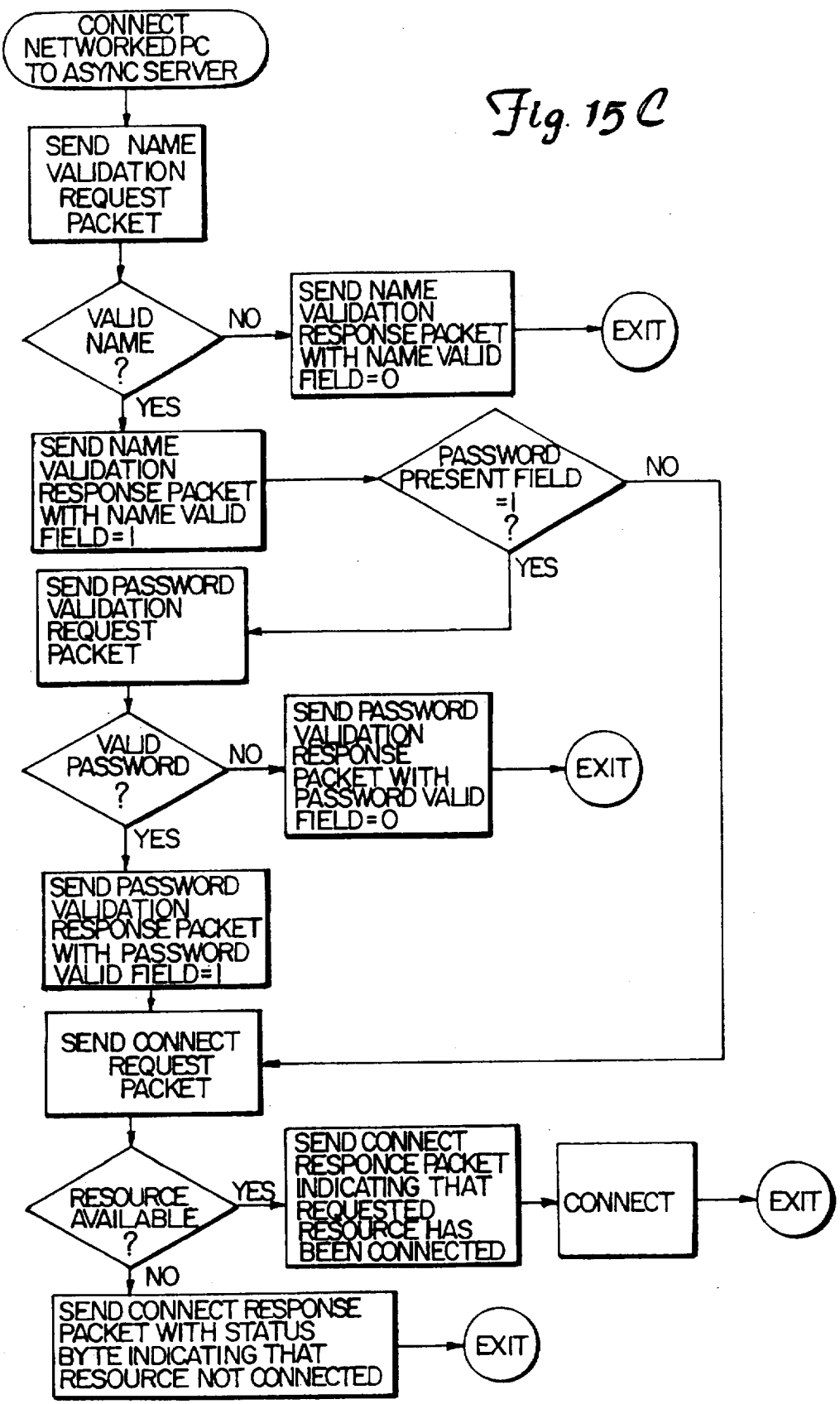

FIG. 15C shows the communication protocol for when a network PC requests a connection to the async server. When a network PC wants to login to the async server, the network PC sends a NAME VALIDATION REQUEST packet to the async server. The format of the NAME VALIDATION REQUEST packet is as follows:

Packet Name: NAME VALIDATION REQUEST PACKET

Direction: From network PC to async server

Description: This is a request for validation of the name of a user trying to login to the async server The fields in the packet are:

| Offset | Field Name | Type | Description |
| --- | --- | --- | --- |
| 0 | Packet Type | BYTE | Identifies the packet |
| 1–17 | User name | BYTE[17] | Name of the user |

The NAME VALIDATION REQUEST packet includes a one byte packet type field and a 17 byte user name field. The user name is associated with a particular user of a network PC. Referring again to FIG. 15C, once the NAME VALIDATION REQUEST packet is received by the async server, the async server determines whether the user name is valid (e.g., whether that user is allowed access to the async server). If it is not a valid user name, a NAME VALIDATION RESPONSE packet is sent from the async server to the network PC indicating that the user name is not valid. The format of the NAME VALIDATION RESPONSE packet is as follows:

Packet Name: NAME VALIDATION RESPONSE PACKET

Direction: From async server to network PCs

Description: This contains the response dispatched by the async server for name validation requests from network PC The fields in the packet are:

| Offset | Field Name | Type | Description |
| --- | --- | --- | --- |
| 0 | Packet type | BYTE | Identifies the packet |
| 1 | Name Valid | BYTE | Set to 1 if name is valid; 0 if invalid |
| 2 | Password Present | BYTE | Set to 1 if password is present |

The NAME VALIDATION RESPONSE packet includes a one byte packet type field and a one byte name field valid field which is set to 1 if the user name of the NAME VALIDATION REQUEST packet contains a valid user name. This control sequence is shown in FIG. 15C. The NAME VALIDATION RESPONSE packet also includes a one byte password present field which is set to 1 if the user name has a password associated with it. If there is no password, the communications protocol shown in FIG. 15C skips the password validation protocol and proceeds with a connect request, described below.

Referring again to FIG. 15C, if a password for the user is required the connect control flow continues after the user name is validated with the network PC sending a PASSWORD VALIDATION REQUEST packet to the async server.

This packet has the following format:

Packet Name: PASSWORD VALIDATION REQUEST PACKET

Direction: From network PCs to async server

Description: This is a request for validation of the password of a user trying to login to the async server The fields in the packet are:

| Offset | Field Name | Type | Description |
| --- | --- | --- | --- |
| 0 | Packet type | BYTE | Identifies the packet |
| 1 | User name | BYTE[17] | Name of the user |
| 18–34 | Password | BYTE[17] | Password of the user |

The PASSWORD VALIDATION REQUEST packet contains a one byte packet type field, a 17 byte user name and the associated 17 byte user password. Upon receipt of this packet, the async server determines whether the password is valid and returns a PASSWORD VALIDATION RESPONSE packet in the following format:
Packet Name: PASSWORD VALIDATION RESPONSE PACKET
Direction: From async server to network PCs
Description: This contains the response dispatched by the async server for password validation requests from network PCs
The fields in the packet are:

| Offset | Field Name | Type | Description |
| --- | --- | --- | --- |
| 0 | Packet type | BYTE | Identifies the packet |
| 1 | Password Valid | BYTE | Set to 1 if password is valid; 0 if invalid |

The PASSWORD VALIDATION RESPONSE packet includes a one byte packet type field and a one byte password valid byte. FIG. 15C shows that if the async server determines that the password is not valid, the password valid field in the PASSWORD VALIDATION RESPONSE packet is 0. This means that the user has given the wrong password and is therefore not allowed access to the async server.

If the async server determines that the password is valid, the async server sends the PASSWORD VALIDATION RESPONSE packet with the password valid field equal to 1. This means that the user is approved for connection to the async server. The network PC may then send a CONNECT REQUEST packet as shown in the flow diagram in FIG. 15C. The CONNECT REQUEST packet has the following format:
Packet Name: CONNECT REQUEST PACKET
Direction: From network PCs to async server
Description: This is a request for allocating the specified resource at the server
The fields in the packet are:

| Offset | Field Name | Type | Description |
| --- | --- | --- | --- |
| 0 | Packet type | BYTE | Identifies the packet |
| 1 | User name | BYTE[17] | Name of the user |
| 18 | General Name | BYTE[9] | General network name of the resource |
| 27 | Specific Name | BYTE[15] | Specific network name of the resource |
| 42 | Connection Type | BYTE | Whether the resource is to be used in inbound or outbound mode |

The CONNECT REQUEST packet includes a one byte packet type field and the 17 byte user name. This packet also includes the general and specific name fields of the resource described above with respect to the STATUS packet. The one byte connection type field indicates whether the specified resource is to be used in inbound or outbound mode. This connection type field refers to whether the network PC will be calling out to a resource (outbound mode) or a resource will be calling in to a network PC (inbound mode).

Referring again to FIG. 15C, the async server, upon receipt of the CONNECT REQUEST packet, determines whether the specified resource designated in the general and specific name fields of the CONNECT REQUEST packet is available. The async server then responds with a CONNECT RESPONSE packet in the following format:
Packet Name: CONNECT RESPONSE PACKET
Direction: From async server to network PCs
Description: This contains the response dispatched by the async server for connection requests from network PCs
The fields in this packet are:

| Offset | Field Name | Type | Description |
| --- | --- | --- | --- |
| 0 | Packet type | BYTE | Identifies the packet |
| 1 | General Name | BYTE[9] | General network name of the resource |
| 10 | Specific Name | BYTE[15] | Specific network name of the resource |
| 25 | Channel Number | BYTE | Logical resource number at server |
| 26 | Status | BYTE | Whether resource allocated or not |
| 27 | Hardware Status | BYTE | Status of the hardware signals |
| 28–38 | Parameters | BYTE[11] | Current operating parameters of the resource |

The CONNECT RESPONSE packet includes a one byte packet type field and the resource general and specific names. The CONNECT RESPONSE packet also includes a one byte channel number which indicates the logical number of the specified resource at the async server. In one embodiment of the LAN modem node, this will be either a 1 or a 2 depending on which modem the connection between the network PC and the resource will be made through. As shown in FIG. 15C, the one byte status field is set to indicate whether the specified resource has been allocated to the requesting network PC. At that point the connection is established and the control routine exits. If the resource or one of the internal or external modems on the LAN modem node are not available, the status field in the CONNECT RESPONSE packet so indicates and the program exits without making the requested connection.

Figure 15D:
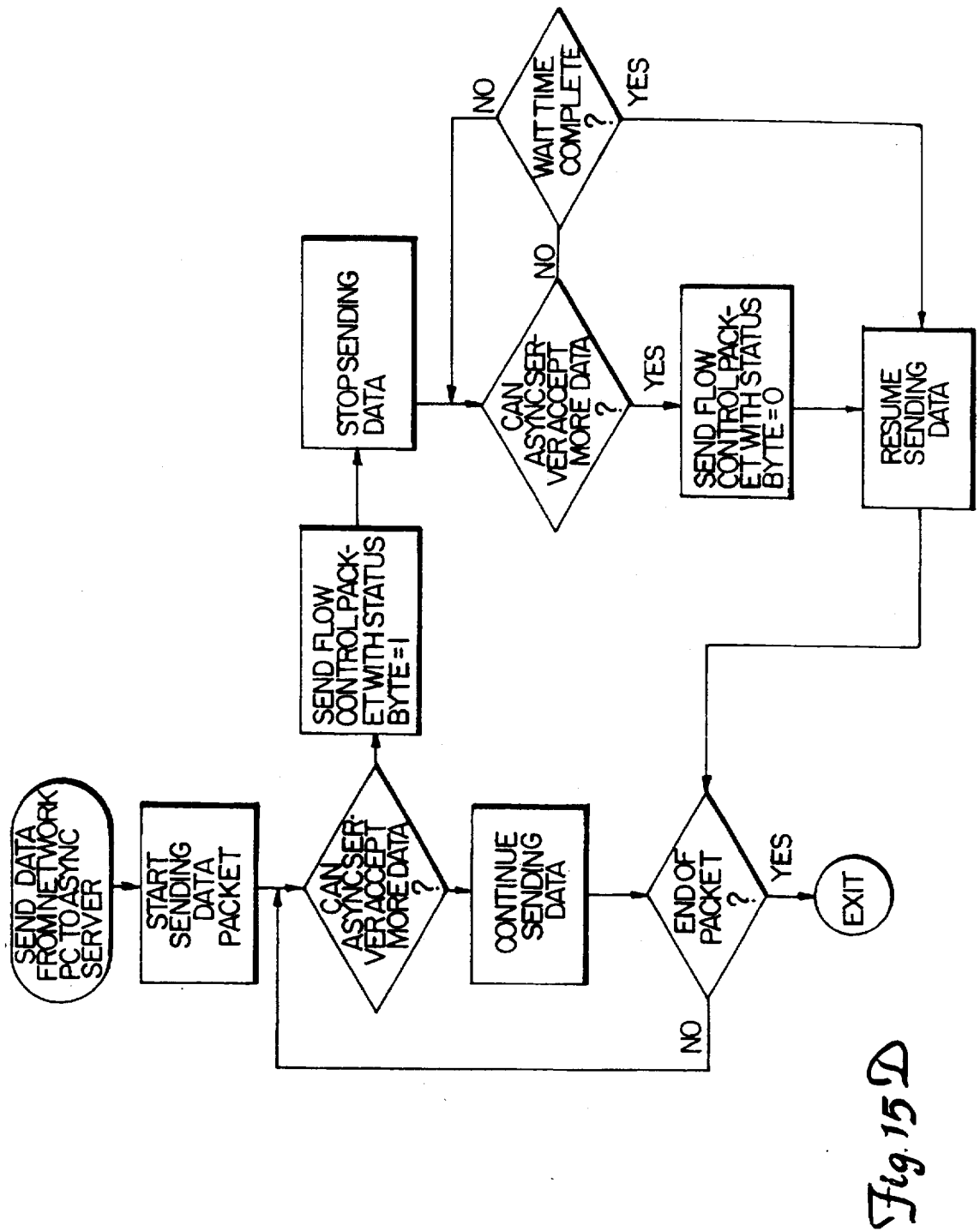

FIG. 15D shows the communication protocol for sending data from a network PC to the async server to be sent out to a designated resource. This protocol begins with the network PC sending a DATA packet to the async server in the following format:
Packet Name: DATA PACKET
Direction: Both from async server to network PCs and from network PCs to async server
Description: This packet contains the data to be sent out from the server or data received by the server
The fields in the packet are:

| Offset | Field Name | Type | Description |
| --- | --- | --- | --- |
| 0 | Packet type | BYTE | Identifies the packet |
| 1 | Channel Number | BYTE | Logical resource number at server |
| 2 | Packet size | WORD | Size of the packet |
| 3-[size +3] | Data | BYTE[size] | Actual data |

The DATA packet contains a one byte packet type field and a one byte channel number which contains the logical number of the server resource to which the data should be sent. A one word packet size field indicates the total number of data bytes which are included in the packet. Finally, the DATA packet includes the actual data bytes.

As shown in FIG. 15D, a mechanism is provided through the communication protocol which affords the async server some control over the transmission of DATA packets from the network PC. If at any time after the network PC begins sending a DATA packet the async server cannot accept any more data, the async server sends a FLOW CONTROL packet to the network PC in the following format:
Packet Name: FLOW CONTROL PACKET
Direction: From async server to network PCs
Description: This packet is dispatched by the async server when it cannot accept any more data from the network PC and when it is ready to accept more data
The fields in the packet are:

| Offset | Field Name | Type | Description |
| --- | --- | --- | --- |
| 0 | Packet type | BYTE | Identifies the packet |
| 1 | Status | BYTE | 1 - Stop sending data  0 - Can resume sending data |
| 2 | Wait time | WORD | Approximate time in units of 50 ms before the server will start accepting further data |

The FLOW CONTROL packet includes a one byte packet type field and a one byte status field. This status byte is set to 1 if the async server cannot currently accept any more data. The protocol is shown in FIG. 15D. As long as the async server is able to accept more data, the network PC continues to send the data bytes in the DATA packet until the end of the packet is reached. If at any time the async server sends a FLOW CONTROL packet with the status byte set to 1, the network PC stops sending the data bytes in the DATA packet. The CONTROL FLOW packet includes a one word wait time field which indicates the time (in units of 50 ms) after which the async server will be ready to accept more data. After this time has elapsed, the network PC resumes sending the remaining data bytes in the DATA packet. Otherwise, if the async server is ready to accept more data before the time indicated in the wait time field of the FLOW CONTROL packet, the async server sends another FLOW CONTROL packet with the status field set to 0 to indicate that it is ready to accept more data. When the end of the packet is reached, the routine exits.

Figure 15E:
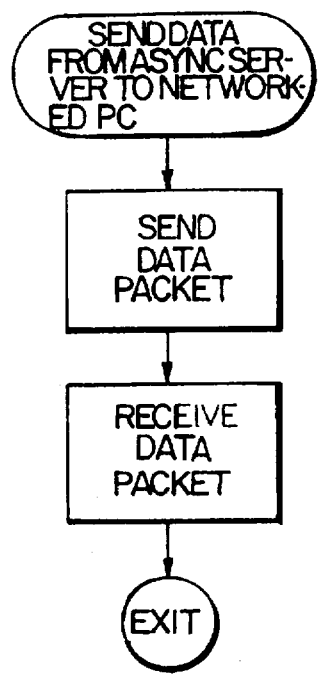

FIG. 15E shows the control protocol for the transmission of data from the async server to a network PC. The async server sends a DATA packet in the format shown and described above. The network PC receives the DATA packet, with no control over its transmission from the async server.

Figure 15F:
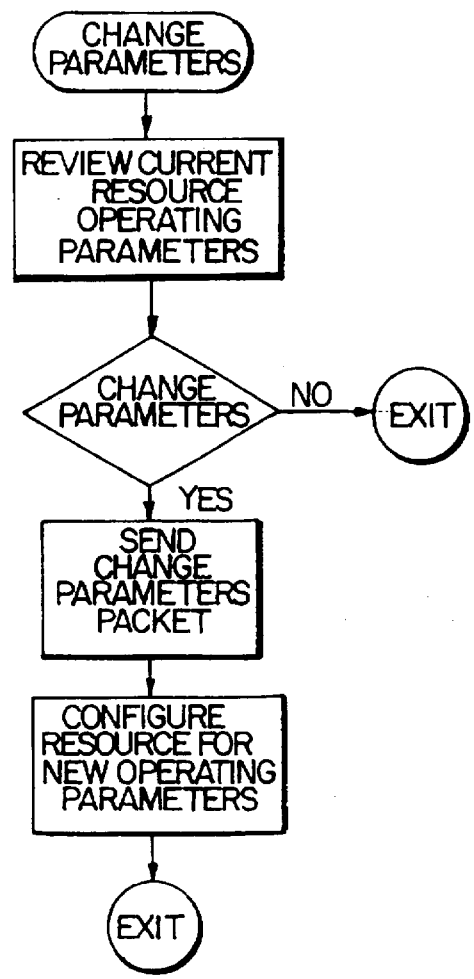

FIG. 15F shows the communication protocol which allows a network PC to change the operating parameters of the resource. For example, if at any time the network PC needs to change the baud rate at which it communicates with a resource, it can do so by sending a CHANGE PARAMETERS packet.

The CHANGE PARAMETERS packet can be issued at any time during connection to a resource whenever an operating parameter change is necessary or desirable. As shown in FIG. 15F, if the network PC reviews the current operating parameters and determines that they should be changed, the network PC sends a CHANGE PARAMETERS packet to the async server, which has the following format:
Packet Name: CHANGE PARAMETERS PACKET
Direction: From network PCs to async server
Description: This is a request to the server to change the operating parameters of the resource The fields in the packet are:

| Offset | Field Name | Type | Description |
| --- | --- | --- | --- |
| 0 | Packet type | BYTE | Identifies the packet |
| 1 | Channel Number | BYTE | Logical resource number at server |
| 2-12 | Parameters | BYTE[11] | New operating parameters of the resource |

The CHANGE PARAMETERS packet includes a one byte packet type field and a one byte channel number. Next, the network PC designates the new operating parameters of the connected resource by placing them in the 11 byte parameter field of the CHANGE PARAMETERS packet. Upon receipt, the async server configures the resource communications for the new parameters requested by the network PC.

Figure 15G:
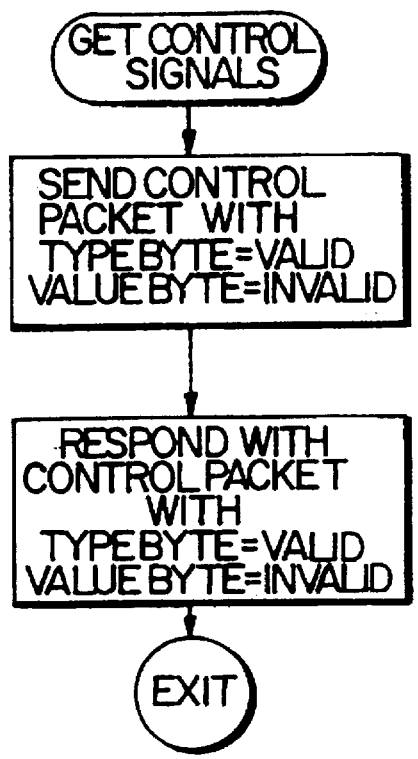
Figure 15H:
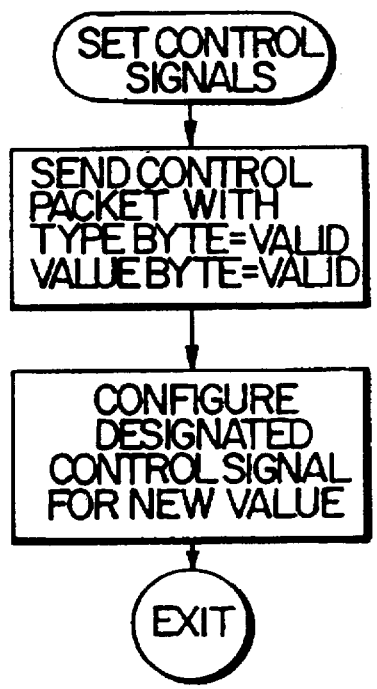
Figure 15:
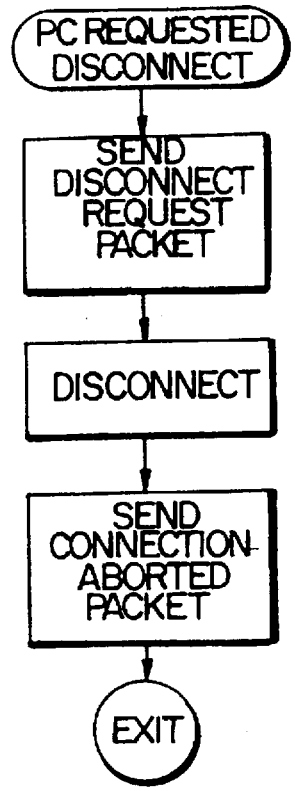
Figure 15:
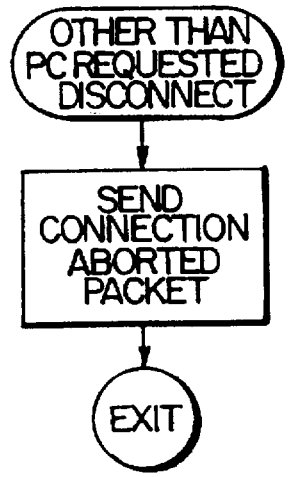

FIG. 15H shows the communication protocol through which either a network PC or the async server may set or get the status of certain control signals from each other. The CONTROL packet can be issued by the async server to a network PC or by a network PC to the async server, and has the following format:
Packet Name: CONTROL PACKET
Direction: Both from async server to network PCs and from network PCs to async server
Description: This packet contains the setting and getting hardware status information about the resource
The fields in the packet are:

| Offset | Field Name | Type | Description |
| --- | --- | --- | --- |
| 0 | Packet type | BYTE | Identifies the packet |
| 1 | Channel number | BYTE | Logical resource number at server |
| 2 | Control Type | BYTE | Identifies the type of control signal(s) |
| 3 | Control value | BYTE | State of the control signal(s) |

The CONTROL packet includes a one byte packet type field and a one byte channel number. The particular type of control signal or signals are identified in the one byte control type field. These can include, but are not limited to, a break, the standard EIA signals (RING, RTS, D, etc.). These control signals give hardware status information and control hardware functioning.

The async server or a network PC can both use the CONTROL packet to either set or get control signal information from the other. FIG. 15G shows the protocol for getting the current state of a particular control signal. The async server or a network PC sends a CONTROL packet to the other. The control type field indicates for which control signal the state is being requested. Because the issuing device does not know the current state of that control signal, the information in the control value field of the CONTROL packet in the get control signal protocol of FIG. 15G is invalid.

Once the CONTROL packet is received by the receiving device, another CONTROL packet is returned to the issuing device in which the current state of the designated control signal is returned in the control value field.

FIG. 15H shows the protocol for setting a control signal. First, the async server or network PC sends a CONTROL packet in the format described above. In the set control signal protocol both the control type field and the value field contain valid data. This is because the issuing device places the desired control signal value into the control value field. When the receiving device receives the CONTROL packet, it configures the designated control signal to the value requested by the issuing device in the control value field. Thus, this control protocol allows both the async server and the network PCs to set and get hardware status information about the resource.

FIG. 15I shows the control protocol for a network PC requested disconnect from the async server. To request a disconnect, the network PC sends a DISCONNECT REQUEST packet to the async server. The DISCONNECT REQUEST packet has the following format:
Packet Name: DISCONNECT REQUEST PACKET
Direction: From network PCs to async server
Description: This is a request to the server to free an allocated resource
The fields in the packet are:

| Offset | Field Name | Type | Description |
| --- | --- | --- | --- |
| 0 | Packet type | BYTE | Identifies the packet |
| 1 | Channel Number | BYTE | Logical resource number at server |

The DISCONNECT REQUEST packet includes a one byte packet type field and a one byte channel number to indicate the logical number of the resource at the async server from which the network PC desires to disconnect. As shown in FIG. 15I, upon receipt of the DISCONNECT REQUEST packet, the async server performs the requested disconnect and sends a CONNECTION ABORTED packet to the requesting network PC in the following format:
Packet Name: CONNECTION ABORTED PACKET
Direction: From async server to network PCs
Description: This packet is dispatched by the async server when a connection with a resource is aborted
The fields in the packet are:

| Offset | Field Name | Type | Description |
| --- | --- | --- | --- |
| 0 | Packet type | BYTE | Identifies the packet |
| 1 | Channel Number | BYTE | Logical resource number at server |
| 2 | Abort Reason | BYTE | Reason the connection was aborted |

The CONNECTION ABORTED packet includes a one byte packet type field, the one byte channel number field and a one byte abort reason field. The abort reason field contains the reason for which the connection was terminated. In the case of a network PC requested disconnect, this reason is BY REQUEST.

FIG. 15J shows the control protocol for a disconnect other than one requested by a network PC. The protocol shown in FIG. 15J is generally used when the async server must for some reason terminate the connection without warning or knowledge of the network PC. In such a case, the async server simply sends a CONNECTION ABORTED packet to the network PC with the reason for the termination in the abort reason field. Some possible reasons for such a disconnect include a network failure, communication between the modem and the async server is down or other type of failure or error.

DETAILED DESCRIPTION OF THE INTER-MODULE CONTROL SOFTWARE

Figure 16A:
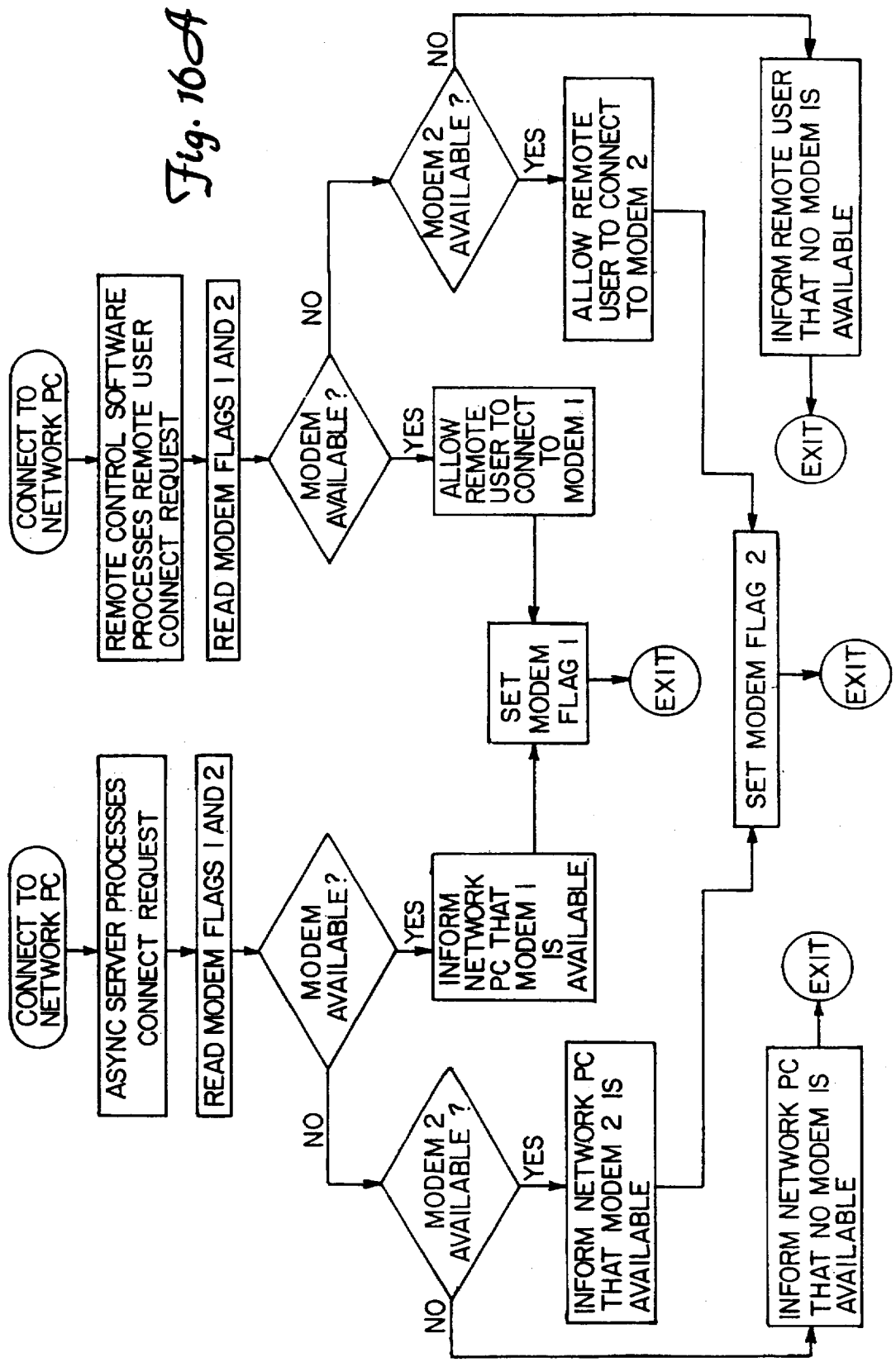
FIGS. 16A–16B show diagrams of the inter-module control routine between the async server and the remote control software modules.
Figure 16B:
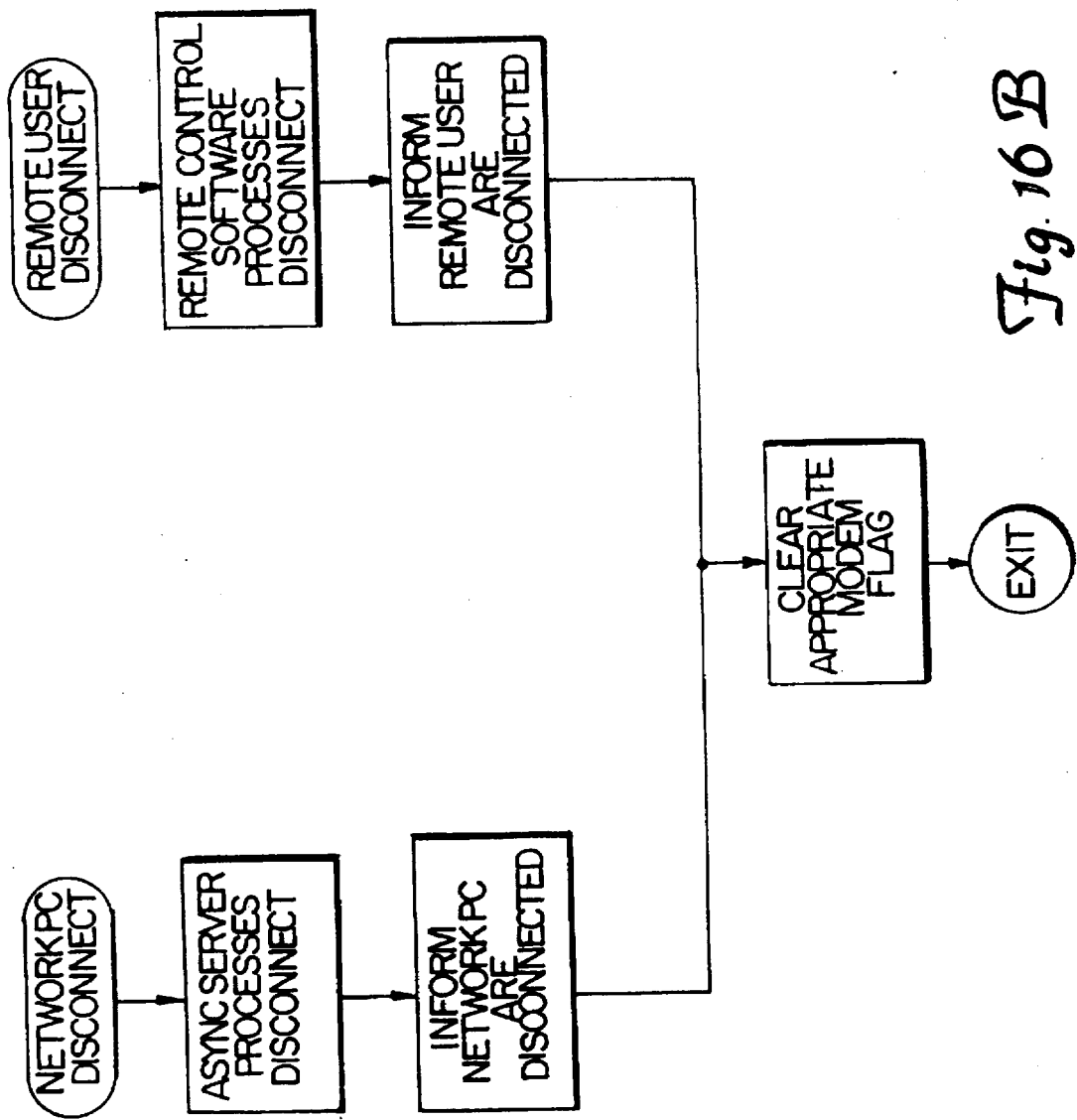

FIGS. 16A and 16B show detailed flow diagrams of the inter-module control software which runs on the LAN modem node and which allows the async server and remote control software modules to function simultaneously in the LAN modem node in a manner such that they may peacefully share the LAN modem node.

To accomplish this, the LAN modem node includes two software settable modem status flags, one corresponding to the internal modem and one corresponding to the external modem, both of which are readable and settable by the remote control and async server software modules to indicate whether the respective modem is currently in use. A modem status flag is set whenever either the async server or a remote user request and make a connection to one of the modems. The modem status flag is then cleared when the connection is terminated. Through use of the modem status flags, the async server and remote control software modules are able to effectively share the LAN modem node modem resources without undue contention. Each modem status flag is preferably one byte in length and is encoded to indicate whether the associated modem is currently in use and whether the async server or the remote control software module is the current owner of that modem.

FIG. 16A shows the flow control and cooperation between the async server and the remote control software this is enabled by the inter-module control software which occurs when either a network PC or a remote user requests connection to the LAN modem node. As shown on the left hand side of FIG. 16A, when a network PC requests connection to the LAN modem node, the async server processes the request according to the communication protocol shown and described above with respect to the FIGS. 15A–15J.

Before the async server will fulfill the request, the async server reads the modem status flags to determine whether either the internal or external modems are available. If the first modem status flag is not set, then the modem associated with that flag is available and the network PC is so informed according to the communication protocol described above. Once the connection is made, the appropriate modem status flag is set to indicate that the async server is using the modem.

If the first modem status flag is set, then the async server checks the other modem status flag. If that modem status flag is not set, the network PC is informed that the associated modem is available, the connection is made and the modem status flag is set to indicate that the async server is using the modem. If both modem status flags are set, the async server informs the network PC that no modems are available.

As shown in the right hand side of FIG. 16A, when a remote user requests connect to the LAN modem node, the remote control software running in the LAN modem mode processes the request. The remote control software then reads the modem status flags to determine whether a modem is available. If the first modem status flag is not set, then the modem associated with that flag is available and the remote user is allowed access to the LAN modem node. Once the connection is made, the modem status flag is set to indicate that the remote control software is using the modem.

If the first modem status flag is set, the remote control software checks the second modem status flag. If that modem status flag is not set, the remote user is allowed access to the LAN modem node over the associated modem. The second modem status flag is set to indicate that the remote control software is using the modem. If both modem status flags are set, the remote control software informs the remote user that no modems are available.

The modem status flags must also be cleared whenever one of the modems in the LAN modem node becomes available. The control routine for clearing the modem status flags is shown in FIG. 16B. When a network PC is disconnected from the async server (either by request or for any other reason) the async server processes the disconnect according to the communication protocol describe and shown above with respect to FIG. 15I and 15J, and informs the network PC that the connection has been aborted. The async server then clears the appropriate modem status flag to indicate that the associated modem is now available.

When a remote user requests a disconnect from the LAN modem node, as shown on the right hand side of FIG. 16B, the remote control software processes the request and informs the remote user that the connection has been aborted. The remote control software then clears the appropriate modem status flag to indicate that the associated modem is available.

DETAILED DESCRIPTION OF A BRIDGE SYSTEM UTILIZING A PROTOCOL INDEPENDENT LAN MODEM NODE

A second embodiment of the LAN modem node is a protocol independent LAN modem node which is used to provide a bridge system for transferring packetized data between two independent networks. Each LAN modem node has at least two common channels and data compression may be selected to increase the throughput between the LAN modem nodes. The data is distributed over the channels by a system called "load balancing". In one embodiment, load balancing is performed by transferring packets over the first available channel. Alternate embodiments provide a user-defined channel preference as preprogrammed by a system administrator. Use of the channels is restricted by filtering packet information by a number of parameters, including packet source address and packet destination address. Packet transmissions may also be denied access to the bridge based on source address and destination address. There is also a Learn Table filtering mode to prevent packets with local destinations from unnecessarily crossing the bridge.

Figure 17:
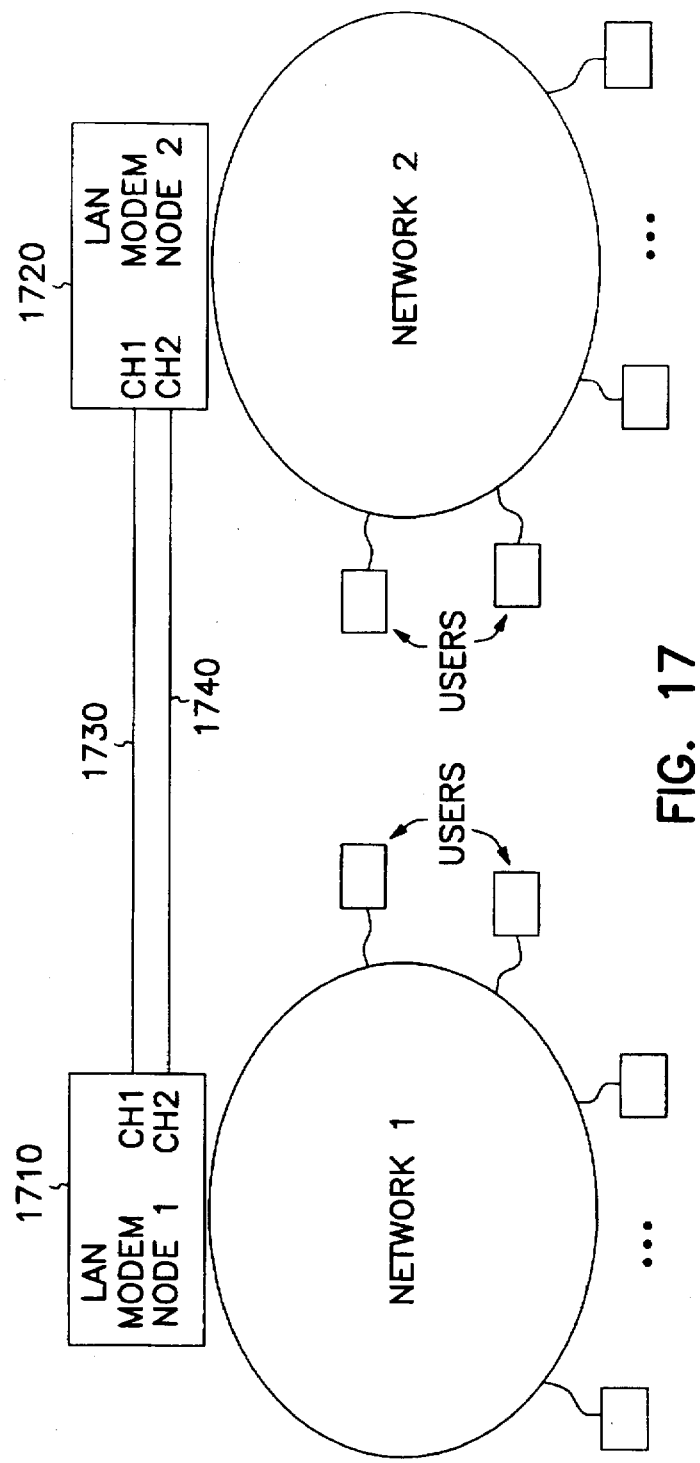
FIG. 17 shows a block diagram of one embodiment of a bridge system utilizing two LAN modem nodes.

Referring now to FIG. 17, two LAN modem nodes 1710 and 1720 are connected over channels 1730 and 1740 to communicate packet information between different network users on network1 and network2. The hardware of each LAN modem was described in detail in the sections entitled "Functional Description of the Hardware Components" and "Detailed Electrical Schematic Diagrams".

The bridge system software for each of the LAN modem nodes is executed by main controller 200 of FIG. 3. Internal modem 300 and external modem 500 provide the two channels for each LAN modem node (Ch1 and Ch2) as shown in FIG. 17. Those skilled in the art will readily recognize that additional modems could be added to each node of the bridge system without departing from the spirit and scope of the present invention.

BRIDGE SYSTEM SOFTWARE—PACKET DRIVER LAYER

Figure 18:
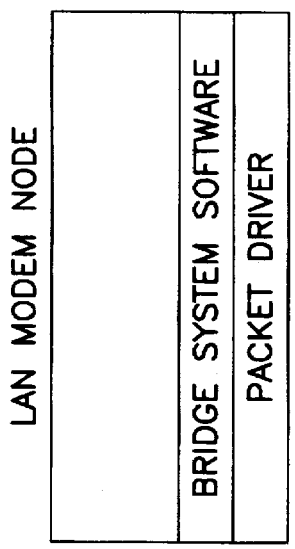
FIG. 18 shows a block diagram overview of the software components of a bridge system.

FIG. 18 shows a block diagram overview of the software components of the present bridge system. Each LAN modem node includes a bridge system software layer and a packet driver layer. The packet driver layer is any standard packet driver program for generating packets, such as Packet Driver Interface Revision 1.11 by FTP Software (a public domain program). Those skilled in the art will readily recognize that other packet driver programs may be employed without departing from the scope and spirit of the present invention.

BRIDGE SYSTEM SOFTWARE LAYER

Each LAN modem node includes a bridge system software layer (FIG. 18). The software is configured by the system administrator, and the bridge system is activated to perform packet compression and filtering functions according to the programmed filter databases. The filter performs source and destination filtering using preprogrammed Source Address and Destination Address Filter Tables. The filter also performs filtering to deny bridge access to packets with local destinations, decreasing unnecessary bridge traffic. A Learned Address Filter Table is dynamically constructed as the bridge operates to restrict locally destined packets from crossing the bridge. The software also provides further bridge transparency by automatically redialing and reanswering when modem connections are broken to reestablish contact without direct attention by the system administrator.

BRIDGE SYSTEM CONFIGURATION

The bridge system software is configured by the system administrator to preprogram the operation of the bridge system. In one embodiment of the bridge software, the bridge system is configured for:

bridge password,
bridge default operation,
compression type used,
bridge local or not local console
bridge dialing and answering functions,
serial channel configuration & modem setup, and
filtering.

These configurations are defined in the following subsections:

Bridge Password

The bridge can receive a name and password. The password is used to restrict access to the bridge system from a remote console. (The bridge can be operated locally or from a remote console, as described below.)

Bridge Default Operation

As stated earlier, the bridge system is configurable for filtering packet data transmitted to the bridge. The packet data which is not filtered receives default treatment as configured by the system administrator. For example, the system administrator programs a default operation of sending the packet through channel 1, sending the packet through channel 2, sending the packet through either channel 1 or channel 2, or dropping the packet (denying access across the bridge). The default mode of operation is explained further below.

Compression Type

In this embodiment of the bridge system software four compression types are available:

RLE (run length encoding),
LZW (Lampel-Ziv-Welch Algorithm),
RLE followed by LZW, and
LZW followed by RLE.

These data compression algorithms are used to facilitate data transmission between networks. The compression type used by the bridge is encoded onto the packets traveling from one LAN modem node to the next LAN modem node. Those skilled in the art will readily recognize that other compression algorithms may be used without departing from the scope and spirit of the present invention.

Bridge Local or Not Local Console

This function tells the bridge system whether the LAN modem nodes will be configured locally or remotely. Remote communications with the LAN modem node are performed using the network protocol and the network interface of the LAN modem node as described above in the sections entitled "Functional Description of the Hardware Components" and "Detailed Electrical Schematic Diagrams".

Bridge Dialing and Answering

The present bridge system provides that one modem is configured for dialing and the counterpart modem is configured for answering so that communication initiation is pre-established. Therefore, there are four permutations possible (below) for this embodiment of the bridge system using two channels per LAN modem node, as shown in FIG. 17:

| LAN Modem Node1 | | LAN Modem Node2 | |
| --- | --- | --- | --- |
| Ch1 | Ch2 | Ch1 | Ch2 |
| dialing | dialing | answering | answering |
| dialing | answering | answering | dialing |
| answering | dialing | dialing | answering |
| answering | answering | dialing | dialing |

If communications are interrupted, the bridge system can re-establish connections transparently using these dialing and answering configurations.

Serial Channel Configuration & Modem Setup

Each channel of the LAN modem node must be configured for: baud rate, channel enabled/disabled, data, parity and stop bits, flow control, break length, modem type, phone number, dial timeout, IRQ level, and base address.

Those skilled in the art will readily recognize that other parameters may be added or substituted for the parameters given herein and that these parameters are demonstrative and not intended in an exclusive or limiting sense.

Filtering Description

The Source Address, Destination Address, and Learned Address filter table sizes are preprogrammed by the system administrator. The system administrator can also preprogram the Source Address and Destination Address filter tables. Further details of the filtering operation are given below in the section entitled "Detailed Description of the Filtering System".

DETAILED DESCRIPTION OF THE FILTERING SYSTEM

Figure 19A:
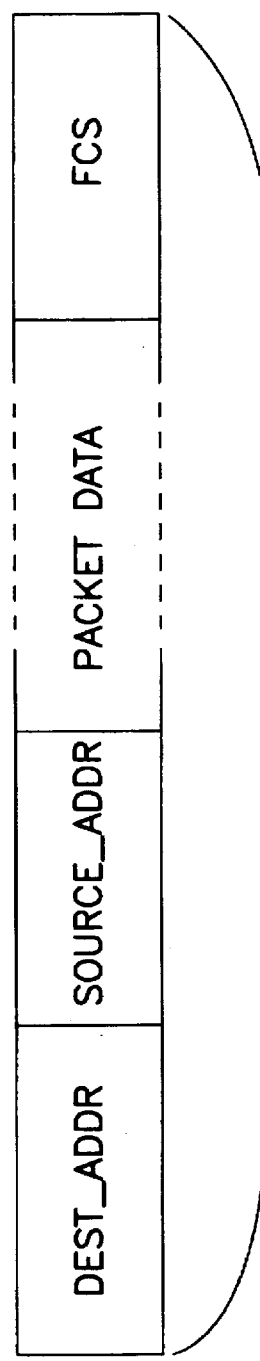
FIG. 19A shows a packet format for packets transmitted on a local area network.

Filtering of packets reaching the LAN modem node from the network is performed using parameters encoded onto the packets. FIG. 19A illustrates one example of a packet 1910 arriving at the LAN modem node from the network side of the bridge system. One example of the "network side of the bridge" is demonstrated as packets arriving at LAN modem1 1710 from network1 of FIG. 17. Note that the packet 1910 contains a destination address "DEST_ADDR" defining the destination node of the packet, source address (or origination address) "SOURCE_ADDR" defining the node where the packet was created, packet data, and frame check sequence "FCS" for detection of errors during transmission. This packet 1910 protocol is found on Ethernet LANs, however, any packet protocol may be utilized as long as it contains all of the parameters needed for filtering the packets. Therefore, one skilled in the art will appreciate that this packet protocol is not exclusive or limiting and that other standard packet protocols may be utilized without departing from the scope and spirit of the present invention.

Figure 19B:
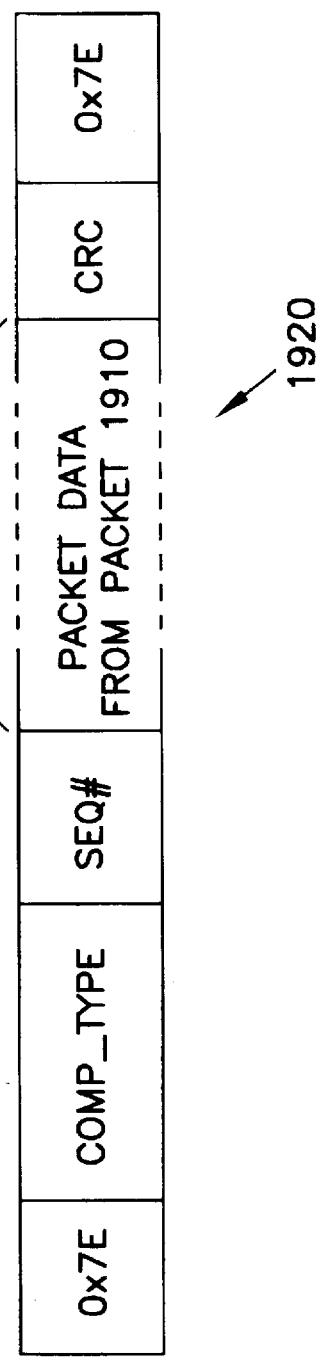
FIG. 19B shows a serial packet format for packets transmitted between two LAN modem nodes in a bridge system.

FIG. 19B shows one example of a serial packet format 1920 used to transmit packets from one LAN modem node, over the communications link, to the next LAN modem node. One example of "over the communications link" is in packets transmitted from LAN modem node1 1710 over channels 1730 and 1740 to LAN modem node2 1720, as shown in FIG. 17. The serial packet format of FIG. 19B includes a header flag "0×7E", compression type "COMP_TYPE", sequence number "SEQ#" (described below), all of the packet data of the network packet received by the LAN modem (for instance, all of the packet 1910 of FIG. 19A), error correction code "CRC" and ending flag "0×7E".

In this embodiment, the serial packet 1920 is encoded with the information necessary to uncompress the packet when it is received by another LAN modem node (as it crosses over the bridge) and to maintain proper order of the transmissions, as described below. The CRC error correction code is used to ensure that the packet is not corrupted during transmission. In one embodiment, all of the fields of serial packet 1920 except the heading and ending flags are used to generate the CRC code. Other error detection codes may be used without departing from the scope and spirit of the present invention. The serial protocol is further defined in the section "Bridge System and Packet Handling" below.

In this embodiment of the bridge system, three separate filtering systems are employed. Filtering may be performed by creating a Source Address Filtering Table, Destination Address Filtering Table, and Learned Address Filtering Table ("Learn Table").

Learn Table Address Filtering

A Learn Table is a record of all source addresses received by the LAN modem node from LAN-side packet transmitters. It is used by the LAN modem node as a filter to prevent packets from passing over the bridge if their destination is local to the LAN.

Figures 20A, 20B, 20C:
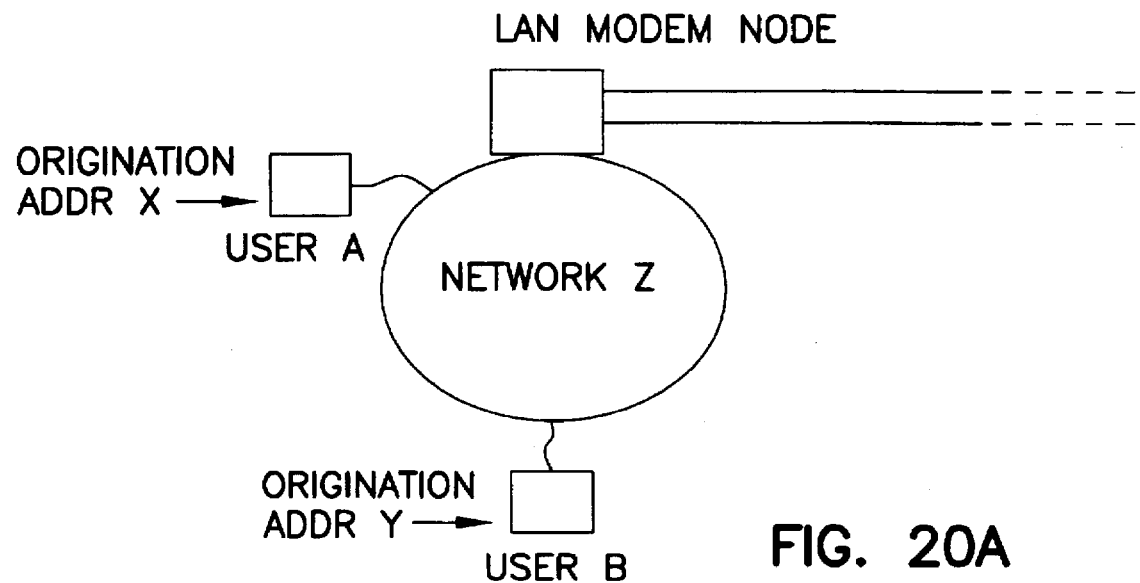
FIGS. 20A, 20B, and 20C show an example of a dynamically constructed learn table according to one embodiment of the present bridge system.

For example, refer to FIG. 20A which shows only one LAN modem node for network z. As user A transmits a packet, the source address of user A is recorded on the Learn Table, as shown in FIG. 20B. The Learn Table is updated when at a later time user B transmits a packet. This is shown as user B's source address ADDRY in FIG. 20C. One benefit in recording the source addresses is observed if user A tries to send a packet to user B. The LAN modem node will automatically consult its Learn Table to discover that the destination address ADDRY (for user B) is native to the LAN. Therefore, the LAN modem node will deny access to user A's transmission over the bridge system, since user B is native to the LAN. The Learn Table is automatically constructed and updated as the bridge software is in use.

Source & Destination Address Filtering

Prior to operation of the bridge system, the system administrator constructs a Source Address Table and a Destination Address Table for each node of the bridge system. The system administrator programs operations for a particular address or range of addresses. The operations include: sending the packet through channel 1, sending the packet through channel 2, sending the packet through either channel 1 or channel 2, or dropping the packet (denying access across the bridge).

This feature provides the system administrator with flexibility in assigning channels to certain favored users and restricting access to the bridge for users without the privilege. For example, suppose the bridge contains a very fast channel, such as Ch1 and a relatively slow channel, such as Ch2. The system administrator can provide a much quicker link for a special user, U, by assigning a Ch1 preference to any packets originating from U's node on the LAN. Additionally, the system administrator has the option to give Ch1 preference to any other user whose packet is destined to reach U, thereby increasing U's access to other networks connected via the bridge system. Another application of source and destination filtering is in excluding limited users from crossing the bridge. For example, if visitors to the network1 are restricted from accessing network2, the system administrator can program the bridge system to drop any packets with the visitor's source address so that they cannot cross the bridge.

As packets reach one of the LAN modem nodes, their source addresses and destination addresses are decoded for purposes of Source Address and Destination Address Filtering. Those skilled in the art will readily recognize that other parameters may be utilized to filter the packets without departing from the scope and spirit of the present invention. As stated above, packets which are not filtered by either Learn, Destination, or Source Table Filtering will be handled using the default mode described earlier. Examples of the Learn Table, Source Address Table, and Destination Address Table are provided in FIGS. 21A, 21B, and 21C, respectively.

FIG. 22 demonstrates the packet filtering steps described above. A packet received by the LAN modem node from its attached network is added to the Learn Table if its source address is not already entered 2202. If the destination address of the packet is native to the LAN, then the packet is not transmitted over the bridge and dropped (2204, 2206), else Source and Destination Filter Tables are consulted to determine what action should be taken with the packet of interest. If the packet is not in either database, then the default action preprogrammed by the system administrator is performed on the packet (2210), but if the packet is in either database (2212), then the action is performed according to steps 2214 (send on Ch1), 2216 (send on Ch2), 2218 (send on any channel), or 2206 (drop the packet).

An example of the filtering process further clarifies packet filtering. Referring to FIGS. 21A, 21B and 21C, the following examples illustrate how the filtering operation is performed.

FILTERING EXAMPLE 1

Consider the arrival of the following packet from the network to the LAN modem node:

| Packet destination node address | 123456 |
|---|---|
| Packet source node address | 212200 |

Filtering Actions:

1. Add the source address 212200 to the Learn Table. The next time a packet is sent with destination address 212200 it will not be allowed access across the bridge, since it is a local node.

2. If the destination node address 123456 is present in the Learn Table (FIG. 21A), then drop the packet. Since this destination address is entered into the Learn Table, the action for the packet is to drop it (refuse access to the bridge).

3. Final action is DROP-PACKET.

FILTERING EXAMPLE 2

Consider the arrival of the following packet from the network to the LAN modem node:

| Packet destination node address | 313131 |
|---|---|
| Packet source node address | 212221 |

Filtering Actions:

1. Add the source address 212221 to the Learn Table. The next time a packet is sent with destination address 212221 it will not be allowed access across the bridge, since it is a local node.

2. If the destination node address 313131 is present in the Learn Table (FIG. 21A), then drop the packet. Since this destination address is not entered into the Learn Table, the packet must be further processed.

3. Search the source address 212221 in the Source Address Table (FIG. 21B). It is present and the associated action is send packet on Ch1.

4. Search the destination address 313131 in the Destination Address Table (FIG. 21C). It is not present.

5. Therefore, the final action is to send packet on Ch1.

FILTERING EXAMPLE 3

Consider the arrival of the following packet from the network to the LAN modem node:

| Packet destination node address | 332123 |
|---|---|
| Packet source node address | 212321 |

Filtering Actions:

1. Add the source address 212321 to the Learn Table. The next time a packet is sent with destination address 212321 it will not be allowed access across the bridge, since it is a local node.

2. If the destination node address 332123 is present in the Learn Table (FIG. 21A), then drop the packet. Since this destination address is not entered into the Learn Table, the packet must be further processed.

3. Search the source address 212321 in the Source Address Table (FIG. 21B). It is present and the associated action is drop packet.

4. Search the destination address 332123 in the Destination Address Table (FIG. 21C). It is not present.

5. Therefore, the final action is to drop packet.

FILTERING EXAMPLE 4

Consider the arrival of the following packet from the network to the LAN modem node:

| Packet destination node address | 332122 |
|---|---|
| Packet source node address | 212221 |

Filtering Actions:

1. Add the source address 212221 to the Learn Table. The next time a packet is sent with destination address 212221 it will not be allowed access across the bridge, since it is a local node.

2. If the destination node address 332122 is present in the Learn Table (FIG. 21A), then drop the packet. Since this destination address is not entered into the Learn Table, the packet must be further processed.

3. Search the source address 212221 in the Source Address Table (FIG. 21B). It is present and the associated action is to send the packet on Ch1.

4. Search the destination address 332122 in the Destination Address Table (FIG. 21C). It is present and the associated action is to send the packet on Ch2.

5. Therefore, the final action is the logical or of the two functions which is to send the packet on channel 1 or send the packet on channel 2. This equates to sending the packet on any channel according to the following algorithms presented in the next section entitled "Bridge System and Packet Handling."

FILTERING EXAMPLE 5

Consider the arrival of the following packet from the network to the LAN modem node:

| Packet destination node address | 565656 |
|---|---|
| Packet source node address | 222222 |

Filtering Actions:

1. Add the source address 222222 to the Learn Table. The next time a packet is sent with destination address 222222 it will not be allowed access across the bridge, since it is a local node.

2. If the destination node address 565656 is present in the Learn Table (FIG. 21A), then drop the packet. Since this destination address is not entered into the Learn Table, the packet must be further processed.

3. Search the source address 222222 in the Source Address Table (FIG. 21B). It is not present.

4. Search the destination address 565656 in the Destination Address Table (FIG. 21C). It is not present.

5. Therefore, the final action is the default action preprogrammed by the system administrator during configuration of the bridge system software.

Bridge System and Packet Handling

Figure 27:
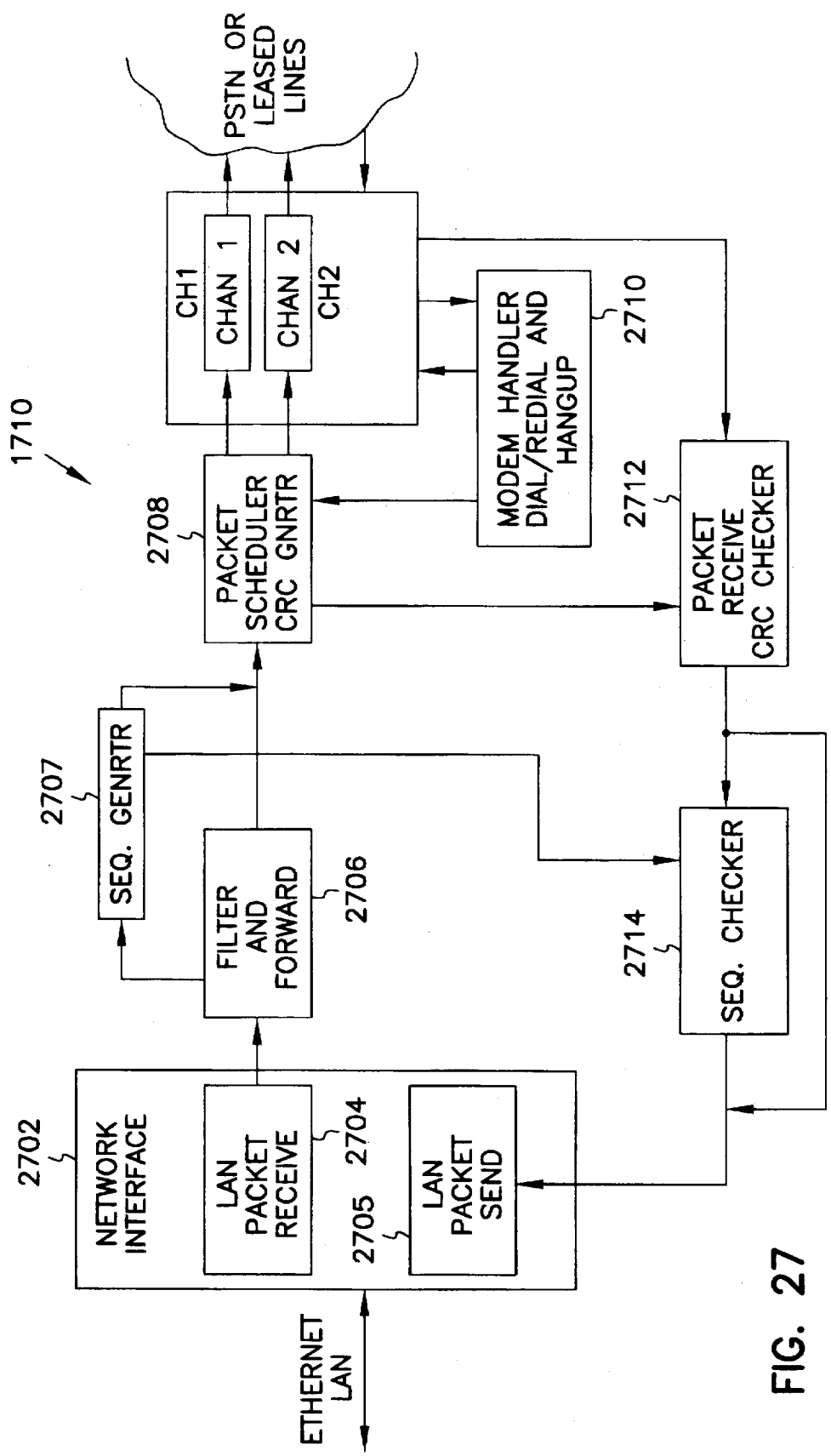
FIG. 27 shows a block diagram of the modules of the LAN modem node according to one embodiment of the present invention.

FIG. 27 is a flow diagram of one embodiment of the present LAN modem node 1710 illustrating the interconnection of the different software modules. Network interface 2702 includes receive buffer 2704 and send buffer 2705. Packets from the LAN are received by receive buffer 2704 and then filtered by filter module 2706. Sequence codes are generated by sequence generator 2707. Packets are error coded and scheduled by packet scheduler 2708 and load balancing is performed prior to transmission by channels Ch1 and Ch2 to the PSTN or leased lines. Connections are established using modem handler/dialer 2710. Received packets are error checked by CRC checker 2712 and sent to sequencer 2714 before sent to the LAN from send buffer 2705. Operation of these modules is explained in further detail below.

Figure 23:
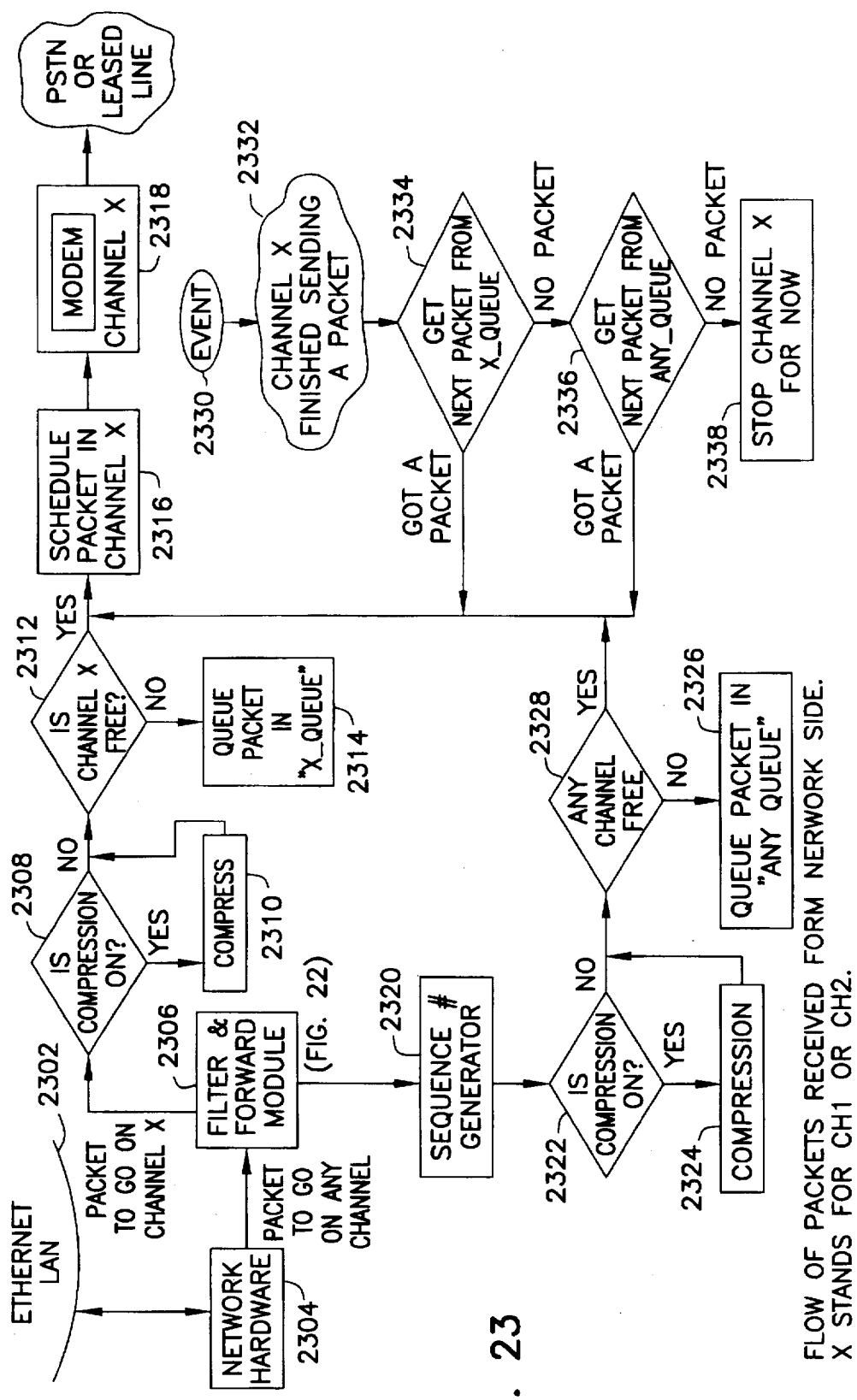
FIG. 23 is a flow diagram showing packet handling by one embodiment of the LAN modem node where the packets originate at a local area network and are transmitted to the PSTN or leased line.

FIG. 23 shows the packet flow from the LAN-side to the LAN modem node (for example, from network1 to LAN modem node1 1710 of FIG. 17), which incorporates the filtering of FIG. 22 as step 2306. Packets 1910 are received by the network hardware 2304 from LAN 2302 and then proceed to the filtering step 2306. If the packet 1910 is not dropped in the filtering 2306, then the action associated with the packet 1910 is either to send it on Ch1, send it on Ch2, or send it on either channel.

Since the process for sending on Ch1 and Ch2 is identical the flow diagram was simplified by using the notation Channel X to signify Ch1 when send on Ch1 is the action or Ch2 when send on Ch2 is the action. If the action is send on Ch1, then the data is compressed using the compression algorithm specified by the system administrator in the setup of the LAN modem node (detailed above) 2308, 2310. The compression algorithm used will be encoded onto the serial packet 1920 as described above (COMP_TYPE) to notify the receiving LAN modem node of the compression type used.

The bridge system then checks whether Ch1 is free 2312. If Ch1 is busy, then the packet is queued on the Ch1 queue and awaits transmission by Ch1. If Ch1 is free, then the packet is scheduled for transmission by Ch1 2316 and sent to the PSTN or leased line over modem 2318. In one embodiment a special sequence code of 255 is encoded on serial packet 1920 (SEQ#) to signal that an unsequenced packet was sent on Ch1. If Ch1 completes sending a packet 2330, 2332 then Ch1 searches the Ch1 queue for another packet to send 2334, else Ch1 searches the any_packet queue for a packet to send 2336. If neither packet is available, then Ch1 stops until more traffic is scheduled 2338.

If the action is to send on Ch2, then the analogous process occurs for Ch2 packets, except the queues filled and searched are Ch2 queues (steps 2314 and 2334, respectively).

If the action is to send on any free channel, then a sequence number (SEQ#) is generated and encoded onto the packet to ensure that packets are received in order by the second LAN modem node 2320 (for example, packets sent by LAN modem node1 1710 to second LAN modem node2 1720 in FIG. 17).

In one embodiment of the present bridge system, the serial packet 1920 is coded with a 255 SEQ# code if the packet was sent unsequenced on Ch1, a 254 SEQ# code if the packet was sent unsequenced on Ch2, and a 0–15 SEQ# code if sequenced on either channel. This allows the receiving LAN modem node to determine the correct packet sequence for each received packet. If the 255 or 254 codes are received, then the receiving node knows that no sequencing was performed and also knows what channel was used to send the packet. Those skilled in the art will readily recognize that other codes may be employed without departing from the scope and spirit of the present invention. Additionally, other serial packet protocols may be employed without departing from the scope and spirit of the present invention.

If the bridge system software for this particular node is programmed for a particular compression type, then apply the appropriate compression algorithm 2322, 2324. If not, proceed directly to poll whether either Ch1 or Ch2 is free 2328. If neither is free, then queue the packet in any_queue (a special queue which is polled by either Ch1 or Ch2 in step 2336 as needed) 2326. If either Ch1 or Ch2 is free, then schedule the packet in the free channel 2316 and transfer the packet to the PSTN or leased line using the free modem 2318.

Figure 24:
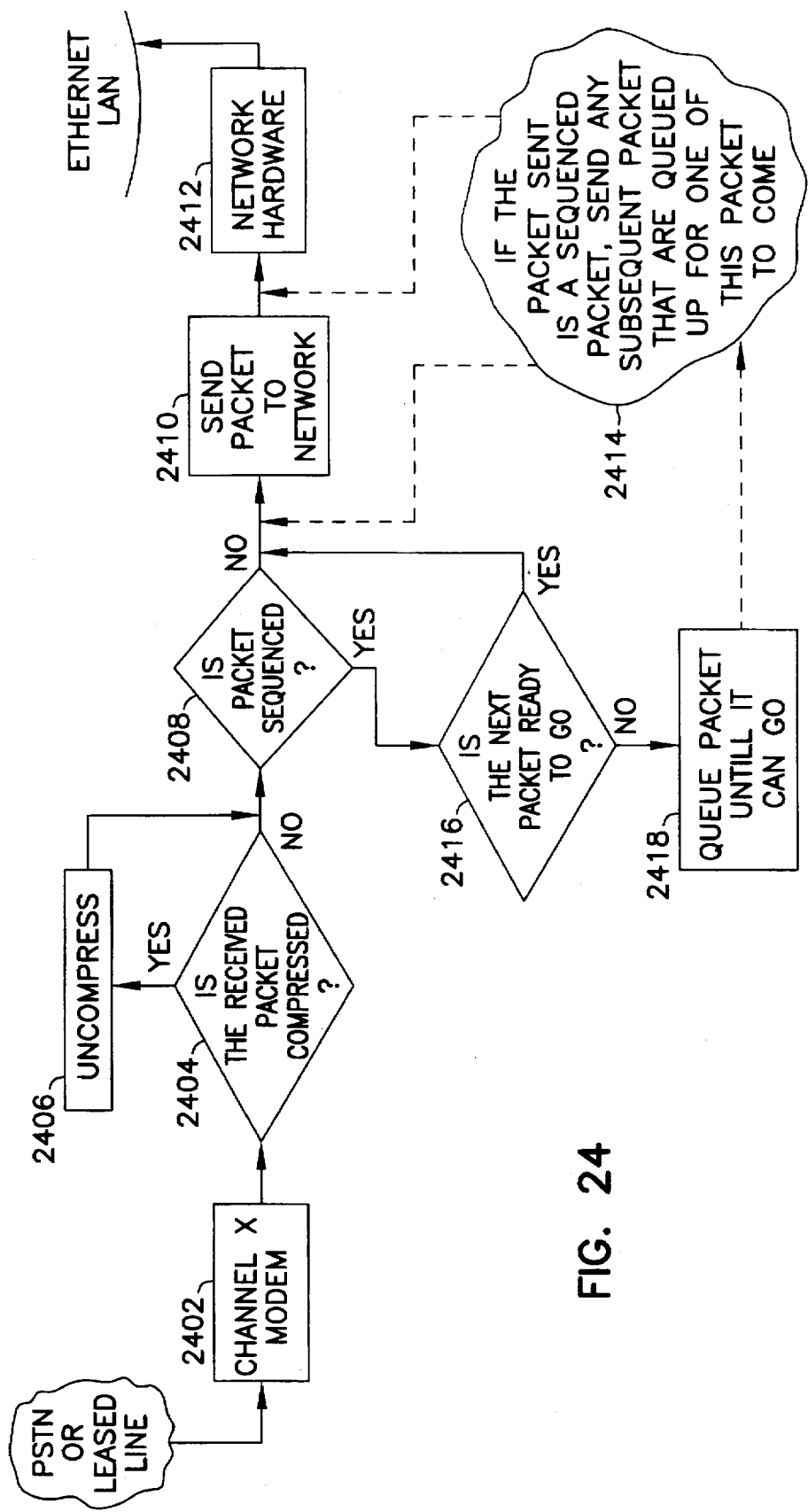
FIG. 24 is a flow diagram showing packet reception by a LAN modem node from the PSTN or leased line and subsequent retransmission to the remote LAN.

FIG. 24 shows the receiving function of the LAN modem node whereby serial packets 1920 are received over the PSTN or leased line by either Ch1 modem or Ch2 modem 2402. If compression was applied to the packet by the transmitting LAN modem node, then uncompress the packet according to its compression algorithm 2406, as identified by COMP_TYPE compression codes in serial packet 1920.

Next, the packet is checked for proper sequencing 2408 by decoding SEQ# of serial packet 1920. If the packet is sequenced, then the packets are queued up in order until the proper sequence is achieved (2414, 2416, and 2418). If the packets are properly sequenced (or not sequenced as signaled by a 255 or 254 SEQ# code) then transmit the packet data to the network using network hardware such as network interface circuitry 400 of FIG. 3 (2410, 2412). The packet transmitted to the network will only have the data format of packet 1910 so that the operation of the bridge system will be entirely transparent to the interconnected networks. The receiving network need not know the packets were sent over the bridge. Therefore, the bridge system is protocol independent, since the data is transferred unaltered after crossing the bridge.

In one embodiment, sequenced packets are buffered and rearranged to be sent to the remote LAN by the receiving LAN modem node in their original sequence. This method can present difficulties if packets are lost in sequence, since the controller at the receiving LAN modem will never have the entire sequence of packets. Alternate embodiments feature a timer to transmit the sequenced packets should one of the packets be lost in transmission.

Packet sequencing is particularly important when the communication channels have differing baud rates, since in any_channel mode the packets may be sent on either Ch1 or Ch2. It is necessary to sequence them properly at the receiving LAN modem node according to the sequence numbers generated by the transmitting LAN modem node. For instance, suppose three packets, PACKET1, PACKET2, and PACKET3, arrive at a first LAN modem node in a very short time span. The appropriate action for each is transmission over any channel (any_channel mode). Suppose further that Ch1 has a higher baud rate than Ch2. If PACKET1 is scheduled on Ch1 and PACKET2 is scheduled on Ch2, then PACKET2 will reach a second LAN modem node after PACKET1. Additionally, Ch1 may send PACKET3 before PACKET2 is completely sent. Without sequencing, the receiving LAN modem node would sequence the packets as: PACKET1, PACKET3, and PACKET2. With sequencing, the receiving LAN modem node determines that the sequence numbers are 1, 3, and 2, and can rearrange the packets such that the correct order is preserved. This is not an issue for packets traveling solely on one channel. Sequencing problems occur when packet size or channel speed are differing.

Figure 26:
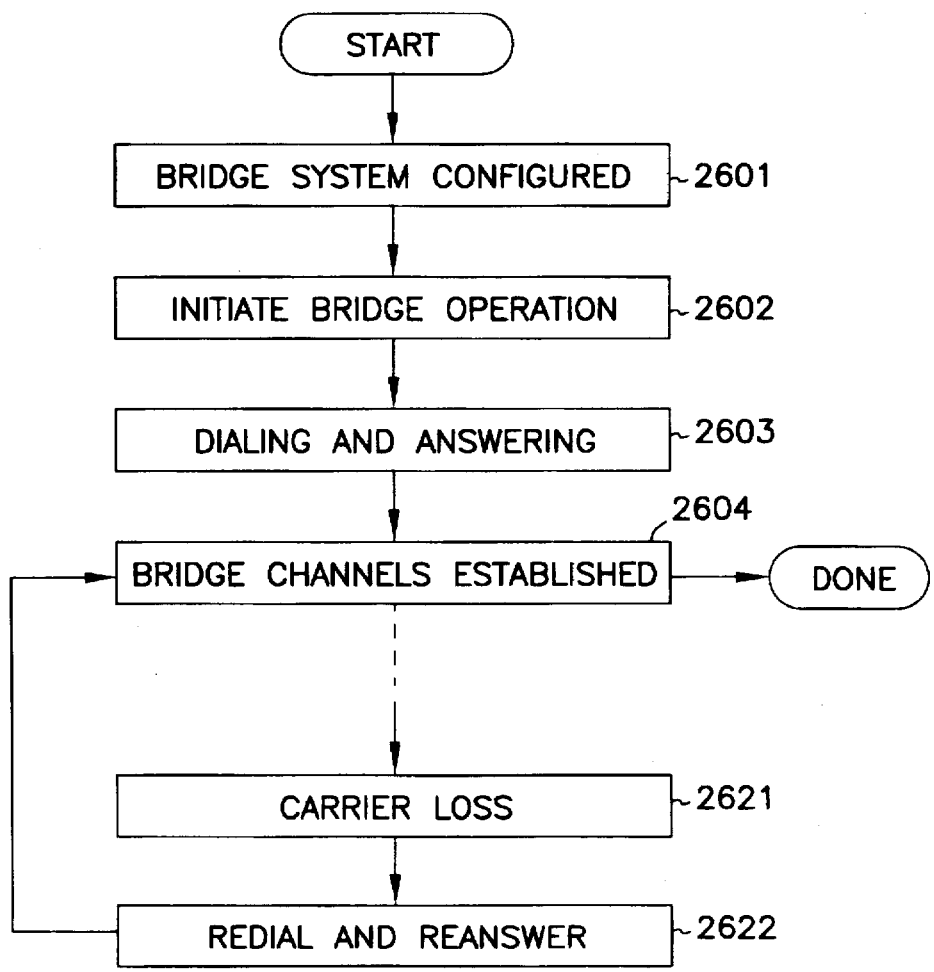
FIG. 26 shows a flow diagram of the redialing feature of one embodiment of the present invention.

The present bridge system also features automatic redialing for dialup lines in the event that the links between the LAN modem nodes are lost. Referring now to FIG. 26, the bridge system is configured and the LAN modem nodes are pre-programmed for dialing and answering 2601. The bridge system is activated 2602 and the communications channels are established (2603 and 2604). If one of the modems detects a lost carrier 2621, then the transmission will be interrupted until redialing and reconnection takes place 2622. This may occur automatically, since both LAN modem nodes are pre-programmed for dialing and answering functions. The bridge system can re-establish communications without the network users' attention. Redialing is transparent to the users.

Alternate embodiments of the present bridge system track the number of packets filtered by the different filtering methods and present the statistical information to the system administrator to provide a metric of bridge utilization. The not local console feature enables a system administrator to monitor the functionality of each LAN modem node individually and remotely.

Figure 25:
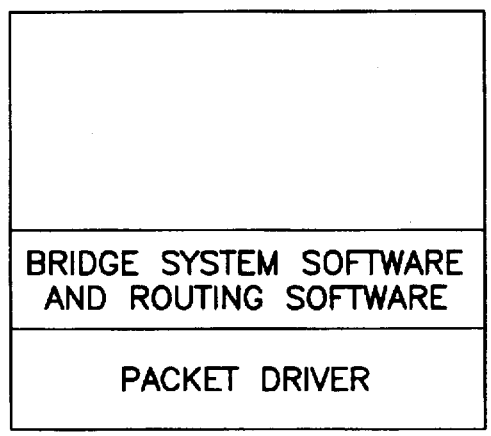
FIG. 25 shows a block diagram overview of the software components of a bridge/router system.

Additional embodiments include the addition of a packet router, such as the Novell IPX packet router to be used in combination with the bridge system. FIG. 25 illustrates how the IPX packet router software is combined with the present bridge software to offer both bridge and routing functions. Addition of this router provides IPX and IP packet protocol compatibility. Those skilled in the art will readily appreciated that other packet routers may be combined without departing from the scope and spirit of the present invention.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those of skill in the electrical, computer and telecommunications arts will readily appreciate that the present invention may be implemented in a very wide variety of embodiments. This application is intended to cover any adaptations or variations of the preferred embodiment discussed herein. Therefore, it is manifestly intended that this invention be limited only by the claims and the equivalents thereof.

We claim:

1. A modem node, comprising:

a controller for controlling data flow and processing within the modem node;

a network interface, interconnecting the controller and a network, for interfacing the modem node to the network; and a modem, interconnecting the controller to a plurality of data links, the modem having a plurality of channels;

the controller including a filter for filtering data received from the network to control access to the plurality of data links and the modem node programmable for performing data balancing on the plurality of data links.

2. The modem node of claim 1 wherein the controller further comprises a data compressor for compressing data before transmitting it to the plurality of data links.

3. The modem node of claim 1 wherein the controller further comprises a data decompressor for uncompressing data received from the plurality of data links.

4. The modem node of claim 1 wherein the controller further comprises a router for routing data transferred between the network and the plurality of links.

5. The modem node of claim 1 wherein the controller further comprises a redialing device to re-establish communications at least one link of the plurality of data links.

6. A method for transmitting packetized data, comprising the steps of:

preprogramming a filter in a first modem node having a first modem connected to a first network, the first modem node connected to a second modem at a second modem node via a plurality of channels;

compressing packetized data transferred over the plurality of channels; and distributing packetized data originating at the first network over the plurality of channels according to the filter.

7. The method of claim 6 wherein the step of preprogramming comprises the steps of:

designating a preferred channel for a first range of source addresses; and prohibiting transmission for a second range or source addresses.

8. The method of claim 6 wherein the step of preprogramming comprises the steps of:

designating a preferred channel for a first range of destination addresses; and prohibiting transmission for a second range of destination addresses.

9. The method of claim 6 further comprising the steps of:

dynamically constructing a local user table; and prohibiting transmission of packets destined for addresses found in the local user table.

10. A bridge system comprising:

a first network comprising a first modem and a second modem;

a second network comprising a third modem and a fourth modem;

first channel means connecting the first modem to the third modem;

second channel means connecting the second modem to the fourth modem;

compression means for compressing data;

uncompression means for uncompressing data; and filter means for load balancing and restricting access to the first channel means and second channel means.

11. The bridge system of claim 10 wherein the filter means comprises source filtering means for load balancing according to packet source address.

12. The bridge system of claim 10 wherein the filter means comprises destination filtering means for load balancing according to packet destination address.

13. The bridge system of claim 10 wherein the filter means comprises learn table filtering means for restricting native packet traffic to a local network.

* * * * *